US011771016B2

United States Patent
Khwaja et al.

(10) Patent No.: US 11,771,016 B2
(45) Date of Patent: Oct. 3, 2023

(54) SYSTEM AND METHOD FOR GROWING PLANTS AND MONITORING GROWTH OF PLANTS

(71) Applicant: 9282181 CANADA INC., Toronto (CA)

(72) Inventors: Aamar Khwaja, Toronto (CA); James Henderson, Gatineau (CA); Peter Cottreau, Ashton (CA); Matthew Bailey, Ottawa (CA)

(*) Notice: Subject to any disclaimer, the term of this patent is extended or adjusted under 35 U.S.C. 154(b) by 174 days.

(21) Appl. No.: 16/970,172

(22) PCT Filed: Feb. 15, 2019

(86) PCT No.: PCT/CA2019/050184
§ 371 (c)(1),
(2) Date: Aug. 14, 2020

(87) PCT Pub. No.: WO2019/157598
PCT Pub. Date: Aug. 22, 2019

(65) Prior Publication Data
US 2021/0100173 A1    Apr. 8, 2021

Related U.S. Application Data

(60) Provisional application No. 62/710,424, filed on Feb. 16, 2018.

(51) Int. Cl.
*A01G 9/24* (2006.01)
*A01G 7/04* (2006.01)
(Continued)

(52) U.S. Cl.
CPC ............. *A01G 9/247* (2013.01); *A01G 7/045* (2013.01); *A01G 9/18* (2013.01); *A01G 9/249* (2019.05); *H05B 45/20* (2020.01); *H05B 47/11* (2020.01)

(58) Field of Classification Search
CPC .......... A01G 9/247; A01G 9/18; A01G 7/045; A01G 9/249
See application file for complete search history.

(56) References Cited

U.S. PATENT DOCUMENTS

D185,509 S    6/1959  Pedersen
D232,289 S    8/1974  Moretine
(Continued)

FOREIGN PATENT DOCUMENTS

CN    201884279 U    6/2011
CN    203327646 U    12/2013
CN    104686251 A    6/2015

OTHER PUBLICATIONS

WIPO, International Search Report for PCT Application No. PCT/CA2019/050184 dated.
(Continued)

*Primary Examiner* — Monica L Perry
(74) *Attorney, Agent, or Firm* — Norton Rose Fulbright Canada LLP

(57) ABSTRACT

A system for growing plants and monitoring the growth of plants, comprising a gardening system and a server. The gardening system comprises a frame that defines a housing for receiving a tray of plants. The gardening system also has a lighting subsystem and watering subsystem to provide light and water to the plants. Sensors and cameras of the gardening system may capture data corresponding to the conditions of the gardening system and health of the plant. Based on the captured data, the server may use machine learning to determine optimal plant growing thresholds, and may send a control command to a controller of the gardening system to change one or more conditions of the gardening system. The plants grown by the system may be nutritious, and the bioavailability of the nutrients of the plants may be increased.

20 Claims, 62 Drawing Sheets

(51) Int. Cl.
 *A01G 9/18* (2006.01)
 *H05B 45/20* (2020.01)
 *H05B 47/11* (2020.01)

(56) References Cited

U.S. PATENT DOCUMENTS

| | | | |
|---|---|---|---|
| D234,894 S | 4/1975 | Vandenbeuck | |
| D236,777 S | 11/1975 | Loomis | |
| 4,407,911 A | 10/1983 | Hooke | |
| D273,021 S | 3/1984 | Chalabian | |
| D306,106 S | 2/1990 | Bush et al. | |
| D316,873 S | 5/1991 | Merl | |
| 5,228,235 A | 7/1993 | Ishimoto | |
| 5,310,071 A | 5/1994 | Rivlin et al. | |
| D357,210 S | 4/1995 | Tomlinson et al. | |
| D490,616 S | 6/2004 | Ljahnicky et al. | |
| D553,393 S | 10/2007 | Cassel | |
| D600,944 S | 9/2009 | McConnell et al. | |
| D610,212 S | 2/2010 | Pedersen | |
| D616,044 S | 5/2010 | Tervo | |
| D616,045 S | 5/2010 | Tervo | |
| D623,443 S | 9/2010 | Zambelli | |
| D677,723 S | 3/2013 | Buel et al. | |
| D681,548 S | 5/2013 | Zhang et al. | |
| D695,350 S | 12/2013 | Doleshal | |
| D698,869 S | 2/2014 | Strzelewicz et al. | |
| D733,196 S | 6/2015 | Wolf et al. | |
| D745,903 S | 12/2015 | Armani | |
| D760,306 S | 6/2016 | Wolf | |
| D776,727 S | 1/2017 | Wolf | |
| D842,130 S | 3/2019 | Xiao | |
| D850,501 S | 6/2019 | Schmitt et al. | |
| 10,994,480 B2 | 5/2021 | Wolf | |
| 11,033,407 B2 | 6/2021 | Solorzano et al. | |
| 2010/0287830 A1 | 11/2010 | Chen et al. | |
| 2012/0279127 A1* | 11/2012 | Yusibov | A01G 31/06 47/65.5 |
| 2014/0318012 A1 | 10/2014 | Fujiyama | |
| 2016/0198651 A1 | 7/2016 | Ogata et al. | |
| 2016/0236408 A1 | 8/2016 | Wolf et al. | |
| 2016/0345518 A1* | 12/2016 | Collier | A01G 9/249 |
| 2019/0124866 A1* | 5/2019 | Maxwell | A01G 9/249 |
| 2019/0191643 A1* | 6/2019 | Chan | H05B 47/11 |
| 2020/0154660 A1* | 5/2020 | Cuello | A01G 7/045 |
| 2021/0185954 A1 | 6/2021 | Xie et al. | |
| 2021/0195847 A1* | 7/2021 | Cuello | A01G 9/249 |
| 2021/0259173 A1* | 8/2021 | Meeussen | A01G 9/0299 |

OTHER PUBLICATIONS

USPTO, Office Action for U.S. Appl. No. 29/651,222 dated Jul. 17, 2019.

USPTO, Office Action for U.S. Appl. No. 29/651,222 dated Oct. 28, 2019.

USPTO, Office Action for U.S. Appl. No. 29/736,371 dated Jan. 25, 2022.

* cited by examiner

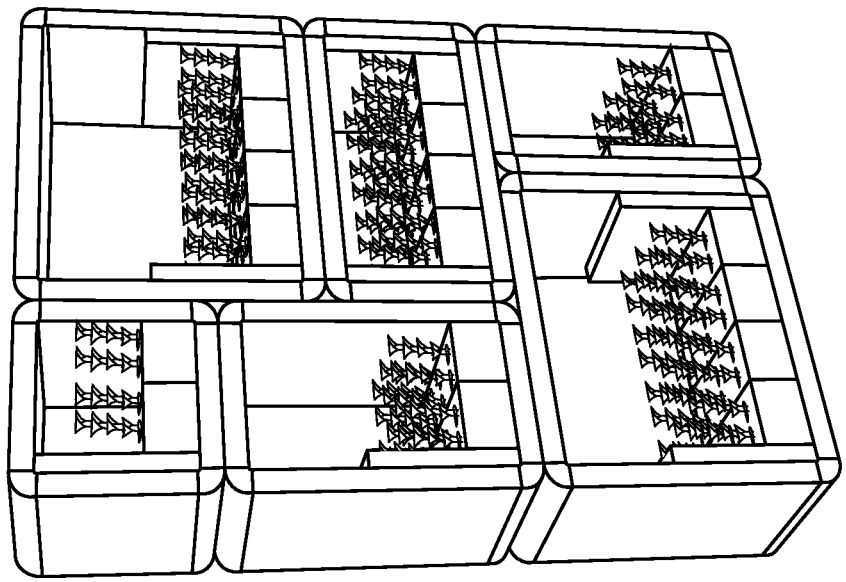
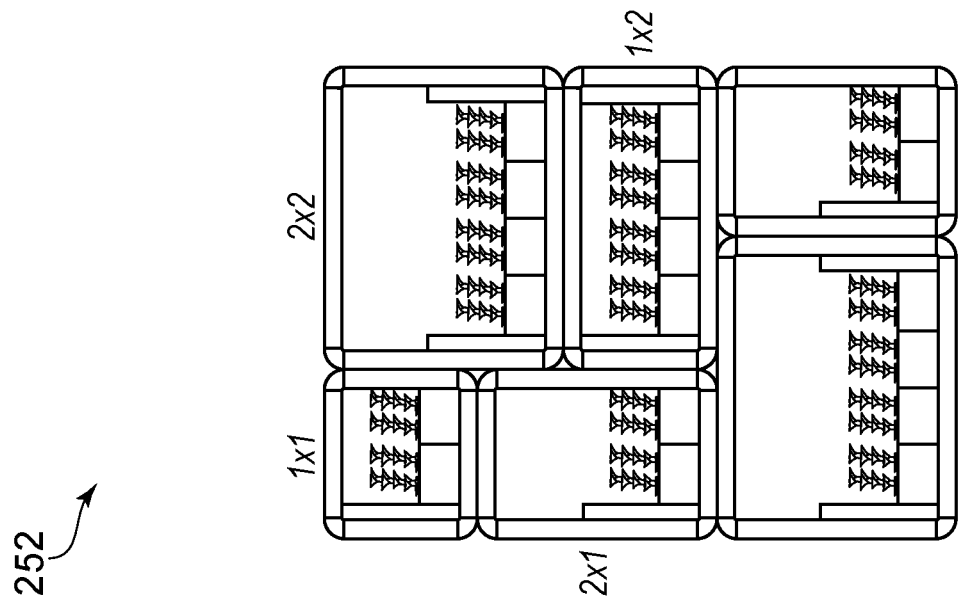
FIG. 36

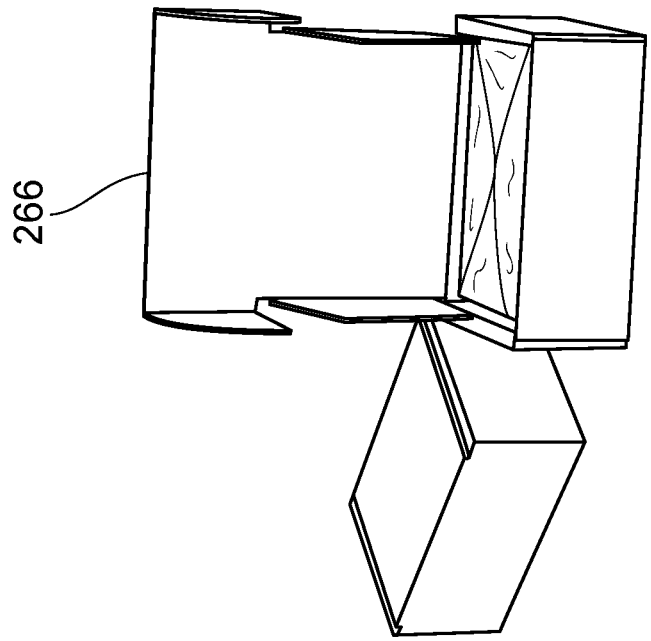
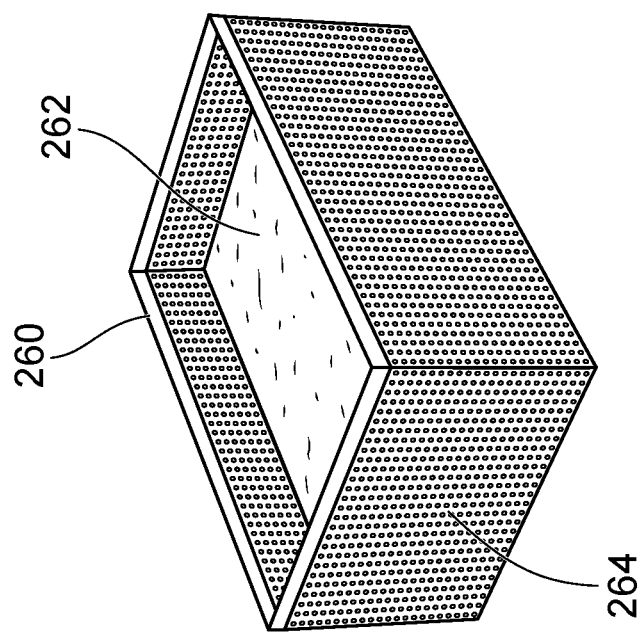
FIG. 37

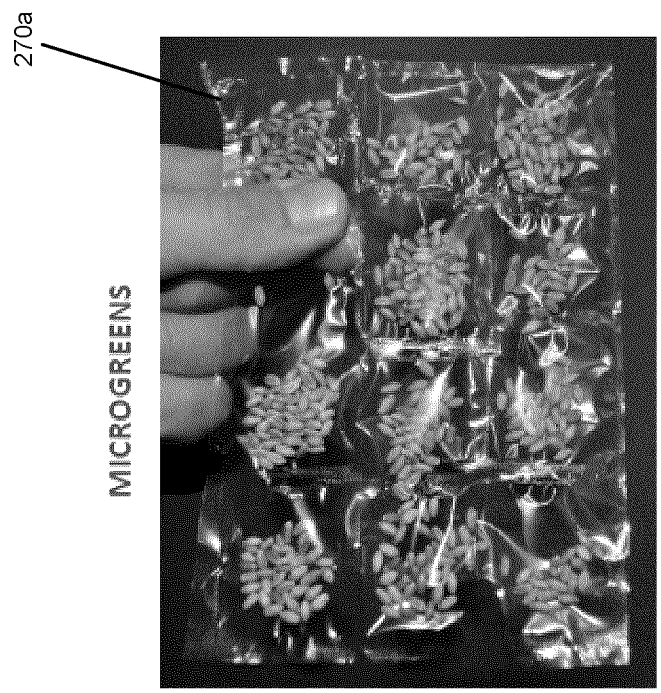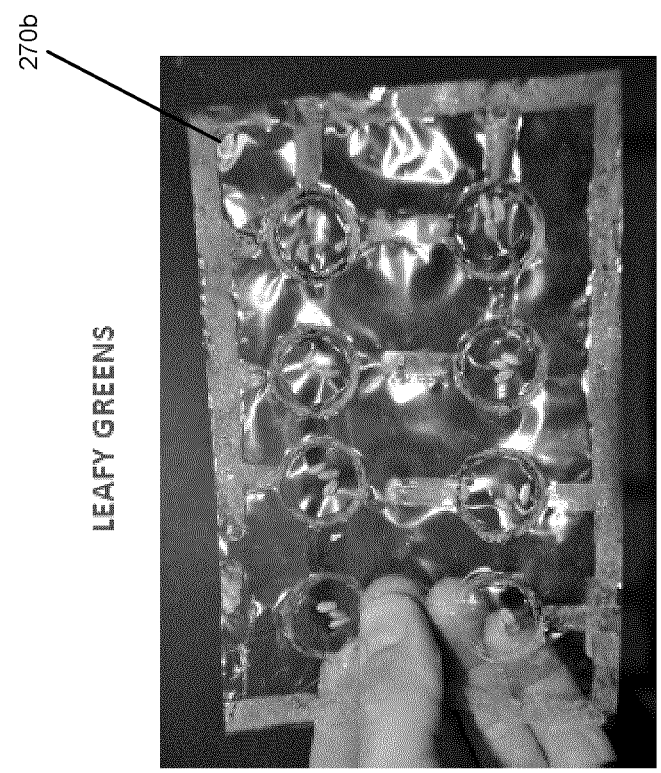
FIG. 39

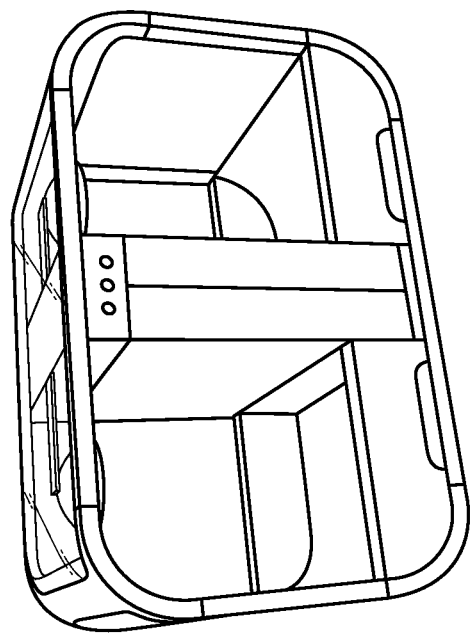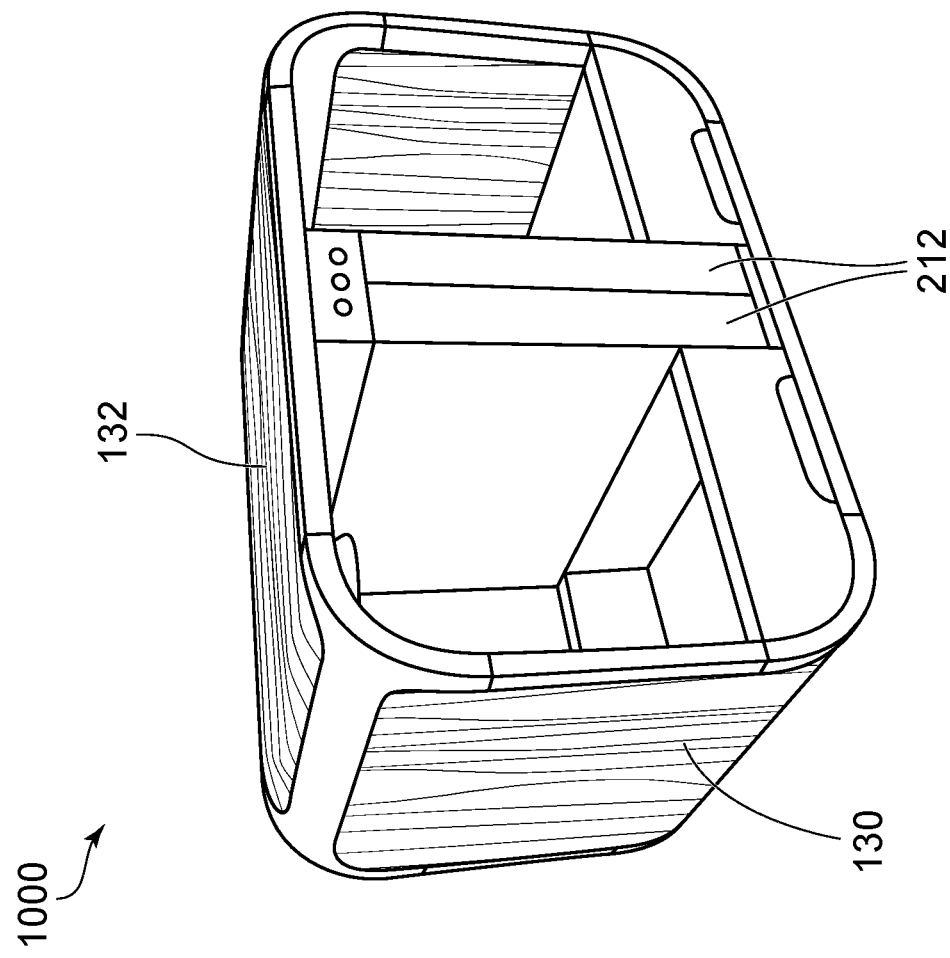
FIG. 48

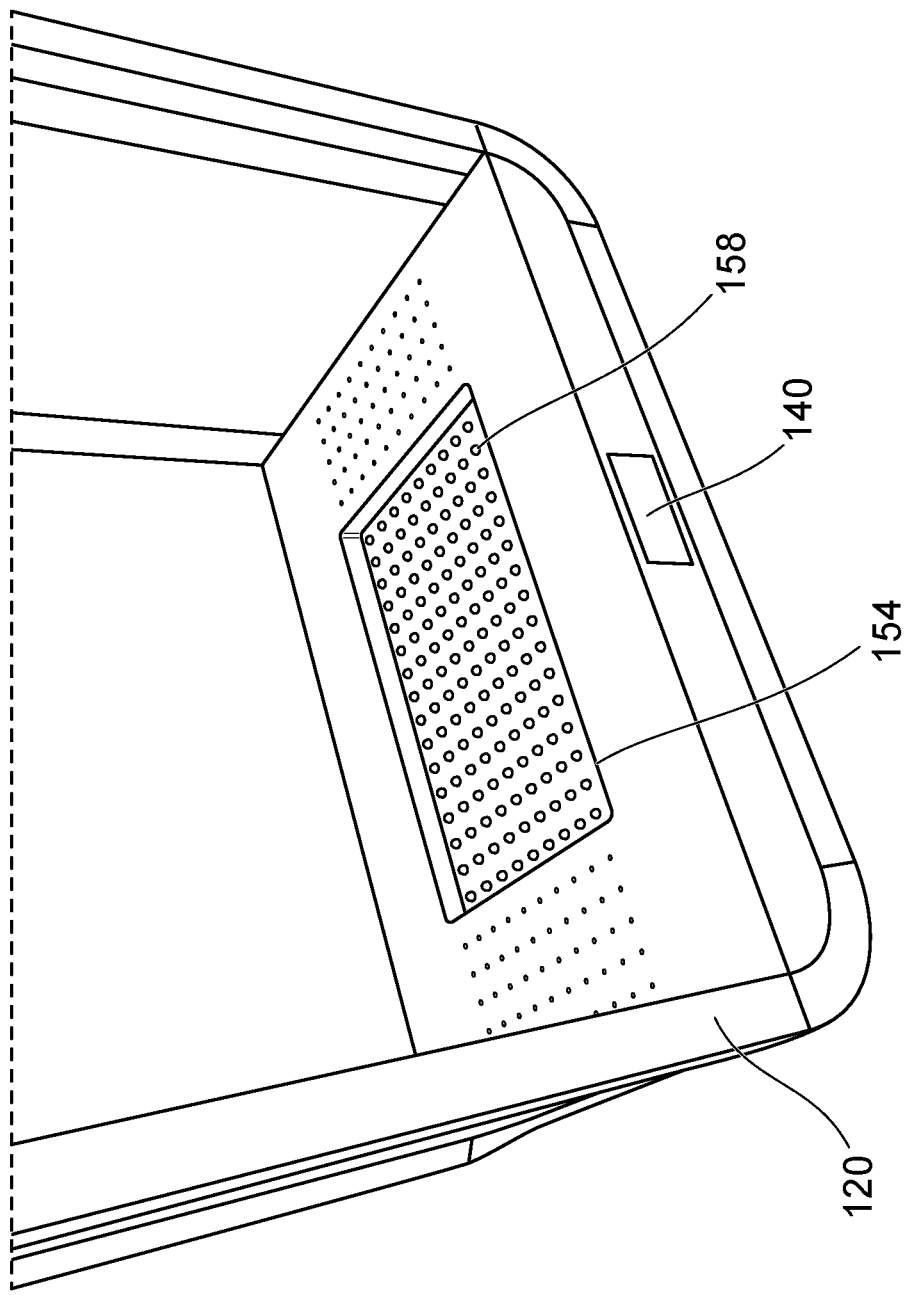

SYSTEM AND METHOD FOR GROWING PLANTS AND MONITORING GROWTH OF PLANTS

FIELD

The following application relates to growing plants, and in particular to systems and methods for growing plants and monitoring growth of plants for a vertical farming system.

BACKGROUND

To produce plants for consumption, agricultural techniques such as farming may be used. Seeds may be planted in soil over a large area of land. Over time, the seeds may grow into the plants, which may then be harvested and processed for consumption. During growth of the plants, additional systems may be used to control the conditions of the environment. For example, hydrology systems, lighting systems, pesticides, and protective structures may be used. The harvested and processed plants may be distributed to markets, some of which may be far from the farm, to be sold to consumers. The costs of these additional systems, the transportation costs, and the storage costs, and other costs of producing plants, may be reflected in the price of the plants sold to the consumers.

Various systems have been developed for reducing the amount of space and the cost of growing plants, such as vertical farming. Unfortunately, existing systems may require additional systems external to the existing systems to grow plants. Moreover, existing systems may not be able to accommodate plants of different sizes, thereby limiting the type of plants that may be grown. In addition, existing systems may not monitor the growth of plants, may not determine optimal plant growing thresholds, and build intelligence in regards to optimal plant growth, or alert a user if conditions of the existing systems need to be changed. Furthermore, existing systems may provide certain inputs for growing plants, such as water, minerals, sunlight, air, and the like, with the goal of growing the plant. However, the body and cells of the consumers of the plants, such as humans, need to intake and absorb the essentials (e.g. minerals, vitamins, proteins, carbohydrates, etc.) of the plants. While these essentials may be present in plants grown using existing systems, the plants may not provide the essentials into the human cell due to maltreatment or compromised conditions of the environment in which the plants are grown.

SUMMARY

Disclosed herein is a gardening system for growing plants and monitoring growth of the plants, comprising: a frame defining a housing for receiving a tray of plants; a lighting subsystem mounted to the frame for illuminating the housing; a water subsystem, comprising: a water reservoir mounted to the frame; a water distribution tray fluidly communicable with the water reservoir, the water distribution tray defining one or more channels for receiving water from the water reservoir; one or more sensors for capturing data corresponding to conditions of the housing; and a controller for selectively activating the lighting subsystem based on lighting conditions of the housing.

Disclosed herein is a system for growing plants and monitoring growth of the plants, comprising: a server; at least one network interface; wherein the server comprises at least one memory and at least one processor configured for: receiving sensor data from a vertical gardening system; based on the sensor data, determining optimal plant growing thresholds; receiving additional data from the vertical gardening system; comparing the additional data with the optimal plant growing thresholds; and based on the comparing, generating a control command corresponding to an optimization recommendation and transmitting the control command to a user device.

Many further features and combinations thereof concerning embodiments described herein will appear to those skilled in the art following a reading of the instant disclosure.

BRIEF DESCRIPTION OF DRAWINGS

In the figures which illustrate example embodiments:

FIG. 36 is a schematic of stacked gardening systems;

FIG. 37 is a schematic of a soil unit;

FIG. 39 is a schematic of seed sheets;

FIG. 48 is a schematic of another gardening system;

FIGS. 49-62 are schematics of another gardening system.

DETAILED DESCRIPTION

Figure 1:
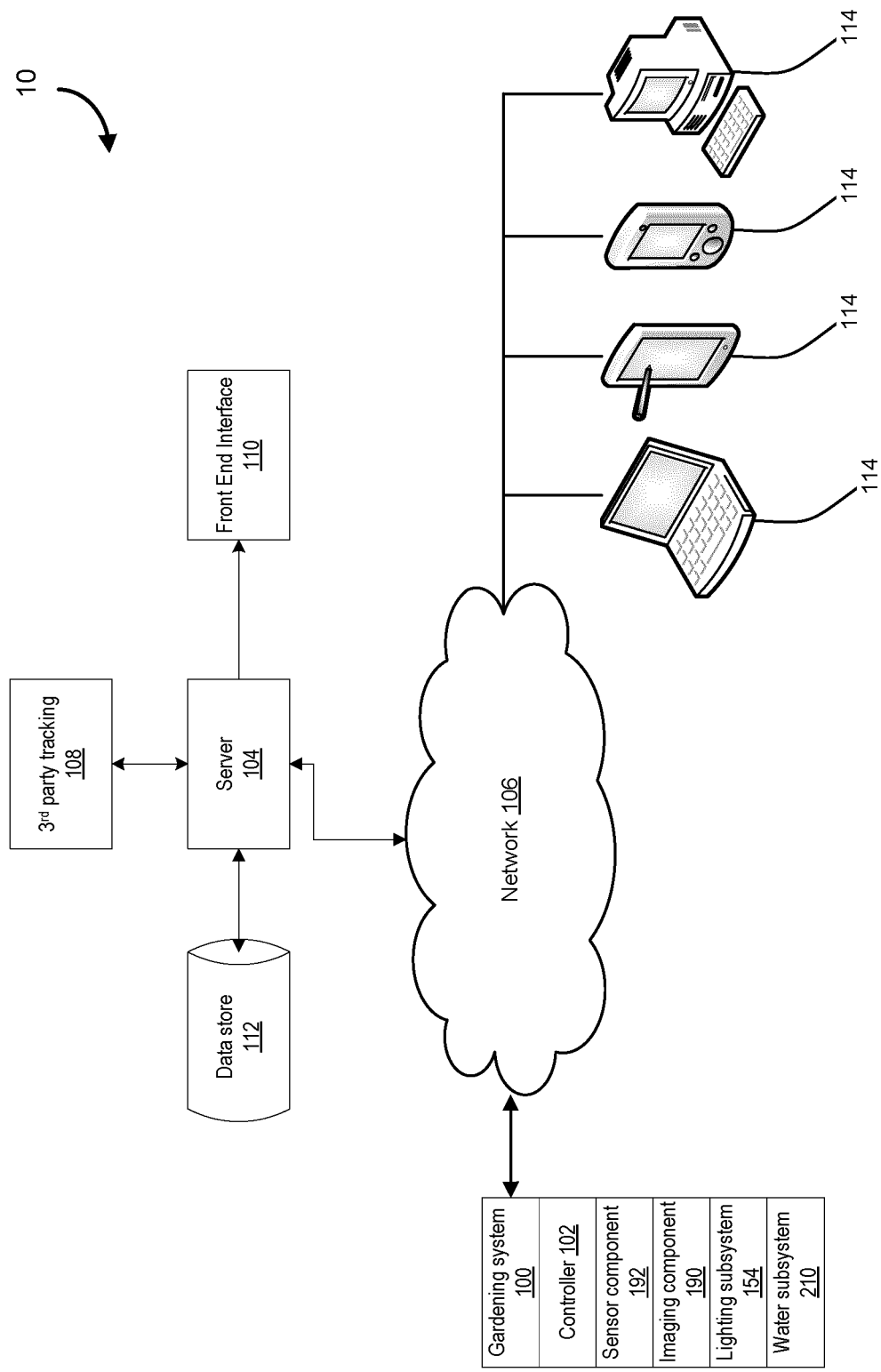
FIG. 1 is a block diagram of a system for growing plants and monitoring growth of plants.

A system for growing plants and monitoring the growth of plants and a method for its use are disclosed. The system may grow a variety of vegetables. The system may detect the conditions of the environment and monitor the plants to promote plant growth. The system may comprise a gardening system, a server, and one or more user devices in data communication via a network. The gardening system comprises a frame that supports a controller, a lighting system, a watering system, one or more cameras, and one or more sensors. The gardening system may receive a tray, which may house soil to grow plants.

The system may be self-contained, such that the system may comprise features and provide a suitable environment for plants to grow in the system without assistance from external systems.

The system may be modular, such that the gardening system may be stacked onto another gardening system. In addition, components of the gardening system may be added or removed to assemble a gardening system having a certain size, dimensions, or features to accommodate growth of certain plants, thereby increasing the number of types of plants that may be grown by the system.

Based on the data captured by sensors on the gardening system, the controller may monitor the conditions of the gardening system, such as water tank levels, humidity, progress of growth of the plants (e.g. photosynthesis activity, amount of chlorophyll, mineralization of the plant, etc.), light usage, and the like. The controller may be in data communication with a user device, such as a smart phone or a home monitoring system (e.g. Google Nest), or an application downloaded on a smart phone (e.g. Apple Health), and may send a control command to the user device to display a message on the display screen of the user device. The message may relate to the conditions of the gardening system.

The data captured by the sensors may be transmitted by the controller to the server via the network. The server may process the data captured by the sensors and determine optimal plant growing thresholds, and build intelligence in regards to optimal plant growth. The server may determine that a plant is growing sub-optimally, based on the intelligence that it has developed, and may send an alert to a user device with optimization recommendations. The control command may be sent to the user device to prompt a user to manually change the conditions of the gardening system. In some embodiments, the control command may be sent to the gardening system to automatically and dynamically change the conditions of the gardening system.

The system may be used to conveniently grow vegetables daily at the touch of a button. By controlling inputs for growing the plants, the plants grown by the system may be nutritious (e.g. vitamins, minerals, proteins, carbohydrates, fats, phytochemicals, enzymes, etc. that may prevent deficiency disease, and for processing food into tissues and energy), and the bioavailability of such nutrients may be increased, such that the absorption of the nutrients by the consumers of the plants may increase.

The health of a plant may be determined based on a number of factors, such as photosynthesis activity, greenness, its colour, chlorophyll levels, the inclusion or availability of certain materials, taste, and the like.

For a plant to be healthy, it may need certain inputs during its growth, such as water, minerals, sunlight, air, and the like, which may be found in the environment. The system as described herein may adjust these inputs manually or dynamically through machine learning based on data captured by sensors and cameras of the system. This may improve the health of the plants, provide increased amount of mineralization, and may make bioavailable to the consumer of the plants the essentials of the plants.

The essentials of a plant may be a mineral, vitamin, protein, carbohydrate, and the like. For example, the human body needs essentials, and a human may eat food, such as plants, to introduce these essentials to the body.

The health of the plant may be mineralization of cells, whether in a plant or in a living animal or human body.

The bioavailability of essentials may be the ability for the human body to use the essentials, absorb the essentials, or process the essentials, which may be measured at the cellular level of the consumer of the plants, such as at the cellular level of the human body. The bioavailability may be measured in a number of ways.

The sensors and cameras of the system may capture data (and may transfer the data into the cloud) to analyze the growth of the plant in order to optimize, through data analysis, the bioavailability of the essentials of the plant.

The system may dynamically or manually control the environment of a gardening system and may provide an increasing intelligent optimization of making bioavailable the essentials to the human cell, through the use of computer learning or adaptable artificial intelligence. The system may control inputs to the plants to enhance the growth of plants to be more nutritious.

The system may grow plants for optimal health to a human body, such as for nourishment, health, and bioavailability of essentials or minerals found in plants. To provide this nourishment, the system may provide conditions for growing the plants that may mimic nature, and may seek opportunities to enhance the conditions. The system may dynamically or automatically adjust inputs that may be provided to the plants. The system may continually, through the use of sensors and imaging components, automatically adjust the environment or send messages to a user to recommend manual adjustment of the environment.

In some embodiments, optimization of a plant may be on the basis of increasing bioavailability of essentials of minerals found in plants. In some embodiments, optimization may be on the basis of maximizing plant growth. Optimization may be defined by comparison to reference data of desired plant parameters. In an example, a plant that has grown well within a time window with a desired micronutrient profile, and has desired variables such as taste and texture, may be defined as an optimal plant and used as a reference and with reference to the growing conditions (e.g., temperature, humidity, light, soil) that lead to the optimal plant. In some embodiments, optimal characteristics of a plant may be defined by a predefined value.

FIG. 1 is a block diagram of a system 10 for growing plants and monitoring growth of plants. As depicted in FIG. 1, the system 10 may comprise a gardening system 100, a server 104, and one or more user devices 114 that may be communicable over a network 106. In some embodiments, the components of the system 10 may be directly communicable without the network 106. The gardening system 100 may comprise a controller 102, a sensor component 192, an imaging component 190, a lighting subsystem 154, and a water subsystem 210. Based on the data captured by the sensor component 192 and the imaging component 190 of the gardening system 100 or the growth of the plants, the controller 102 may process the data to monitor the conditions of the gardening system 100. Based on the data captured by the sensor component 192 and the imaging component 192, the controller 102 may transmit a message to a user device 114. The message displayed on the user device 114 may cause a user to change the conditions of the gardening system 100, such as increasing or decreasing the amount of available light, or filling up a water reservoir. In addition, the controller 102 may send the data captured by sensor component 192 and imaging component 190 to the server 104. The server 104 may process the data captured by the sensors 192 and determine optimal plant growing thresholds, and build intelligence in regards to optimal plant growth. As the controller 102 sends additional captured data to the server 104, the server 104 may compare the additional captured data with the optimal plant growing thresholds. Based on the comparison between the additional captured data with the optimal plant growing thresholds, the server 104 may generate a control command corresponding to an optimization recommendation and transmit the control command to a user device 114.

In some embodiments, the additional captured data to be compared with the optimal plant growing thresholds may be real time or near real time data captured by sensor component 192 and imaging component 190, or may be data that is stored in memory and processed by the server 104 at a later time.

In some embodiments, the controller 102, upon processing the captured data from the sensor component 192 and imaging component 192, may send a control command to a subsystem of the gardening system 100 (e.g. lighting subsystem 154) to change the conditions of the gardening system 100 to promote plant growth. In some embodiments, the server 104, upon processing the captured data from the sensor component 192 and imaging component 192, may send a control command to the controller 102 for sending control command to a subsystem of the gardening system 100 (e.g. lighting subsystem 154) to change the conditions of the gardening system 100 to promote plant growth. In such embodiments, the system 10 may automatically monitor the growth of plants and automatically change the conditions of the gardening system 100 to promote plant growth.

In some embodiments, when a user receives a message on a user device 114 from the controller 102 or server 104, the user may send a control command using the user device 114 (e.g. smart phone, laptop, desktop computer) such that the controller 102 may send control command to a subsystem of the gardening system 100 (e.g. lighting subsystem 154) to change the conditions of the gardening system 100 to promote plant growth. The user may also input a control command using a control panel on the gardening system 100. In such embodiments, a user may control the conditions of the gardening system 100 to promote plant growth.

In some embodiments, the processing of data captured by the sensor component 192 and imaging component 192 may be done by the controller 102, the server 104, or a combination thereof.

The data captured by the sensor component 192 and imaging component 192 corresponding to the growth of plants or conditions of the gardening system 100 may be used by a user or third parties for analyzing plant growth, predicting plant health, and so on. In some embodiments, the data captured by the sensor component 192 and imaging component 192 may be processed by the controller 102 or server 104 to optimize the composition of soil used in the gardening system 100 to grow plants.

Ongoing monitoring plant growth, analyzing plant growth, and predicting plant health may be a non-trivial task. Accurate tracking of the plants may increase the amount of nutrients in the plant, and may increase the amount of nutrients consumed by the user. Similarly, inaccurate tracking of the plants may decrease the amount of nutrients in the plant, and may decrease the amount of nutrients consumed by the user.

The system 10 may grow plants that may be nutritious to the human body as it relates to the human bioavailability of plant minerals to enable optimum human cellular health (e.g. high nourishment for the body). The system 10 may be driven by bio-inputs, such as microbial rich soil, sun mimicking LED lights, an infrared camera that captures photosynthesis to offer feedback to customers, sound waves that enhance plant growth, and bio geometric design.

One or more plant types may be grown at the same type using the system 10, such as greens, microgreens, herbs, root vegetables, and the like. The gardening system 100 may receive one or more trays that may hold one or more groups of soil that contain seeds of the plant to be grown. As a seed grows into plants, the plants may be harvested and other plant types may be grown. The characteristics of the plant types grown using the system 10 may be different. For example, different plant types may have different colours, size, root length, leaf type, degree of photosynthetic activity, water absorption, amount of carbon dioxide processed, amount of oxygen emitted, sound emitted by the plant or its roots or inaudible vibration by the plant or its roots, and the like. Similarly, variations within the same species of plant may have different characteristics.

Accordingly, a flexible implementation may be preferable so that a diverse range of plants may be grown using the system 10. In some embodiments, the system 10 may be configured for interoperation with a diverse range of plant types, and also to flexibly adapt in view of different plants that may be grown with the system 10. The system may not be "hard coded" to associate certain characteristics with the growth of certain plants, but rather, applies machine-learning to dynamically associate and create linkages as new plant types are introduced to the system 10. Interoperability may be beneficial where the system 10 may be used in different environments, such as different homes having different preferences for vegetables, different regions of a country or different countries altogether that grow different plants. In some embodiments, the system 10 may adapt flexibly in response to such differences (e.g., by changing the amount of light produced by the lighting system, changing the amount of oxygen or carbon dioxide in the housing of the gardening system 100, adapting defined feature recognition linkages, adapting imaging characteristics, image data processing steps, etc.).

In some embodiments, data corresponding to plant growth or conditions of the gardening system 100 may be collected using machine-vision capable sensors and other sensors (e.g. temperature, humidity, water level, light level) that may be mounted to the gardening system 100. These sensors monitor the housing of the gardening system 100 to determine the conditions of the gardening system 100 and growth of plants in the gardening system 100. Machine vision of the machine-vision capable sensors may include imaging in the visual spectrum, and may also include imaging in other frequency spectra, RADAR, SONAR, etc. Machine vision may include image processing techniques, such as filtering, registration, stitching, thresholding, pixel counting, segmentation, edge detection, optical character recognition, among others.

The system 10 may not have hard-coded reference libraries of the conditions of the gardening system 100 or the types of plants grown in the gardening system 100 or the characteristics of the types of plants grown in the gardening system, and instead, may be flexibly provisioned during calibration or use of the system 10 to build a reference library using captured real-world data (e.g. image data, sensor data) to train a base set of features. The system 10 may be used without prior knowledge of the types of plants to be grown in the gardening system 100.

As depicted in FIG. 1, the system 10 comprises one gardening system 100. In some embodiments, the system 10 may comprise more than one gardening system 100. Similarly, as depicted in FIG. 1, the system 10 comprises one server 104. In some embodiments, the system 10 may comprise more than one server 104.

The gardening system 100 may comprise the sensor component 192 and imaging component 190 for capturing data of the gardening system 100. The sensor component 192 and imaging component 190 may capture data corresponding to a housing of the gardening system 100. The controller 102 may process the data. A transceiver may transmit the captured data over a network to the server 104. The controller 102 may receive or transmit control commands.

The gardening system 100 may include components that may increase the accuracy of the sensor component 192 and imaging component 190 for capturing data of the gardening system 100. For example, the gardening system 100 may include light emitters that may emit light of certain wavelengths, such that said light may reflect from the plants grown in the gardening system 100 and may be detected by the imaging component 190.

The gardening system 100 may have one or more controllers 102 having computational capabilities directly built into the gardening system 100. In some embodiments, these computational capabilities provide for data pre-processing features that may be used to improve the efficiency (e.g., file-size, relevancy, redundancy, load balancing) of data ultimately provided to a backend for downstream processing (e.g. to server 104). The gardening system 100 or system 100 may include some storage features for maintaining past data and records. The pre-processing may aid in speeding up computation so that it may be conducted in a feasible manner in view of resource constraints.

In some embodiments, the gardening system 100 may contain multiple physical processors, each of the physical processors associated with a corresponding imaging component 190 or a sensor component 192. In such embodiments, the system 10 may have increased redundancy as the failure of a processor may not result in a failure of the entirety of plant growth monitoring capabilities, and the system 10 may also provide for load balancing across each of the physical processors, improving the efficiency of computations. Each imaging component 190 or sensor component 192 may be tracked, for example, using an individual processing thread.

The system 10 may comprise a server 104 with a processor coupled to a data store 112. The one or more gardening systems 100 may be in communication with the server 104 via the network 106.

The server 104 may process data captured by the sensor component 192 and imaging component 190 and received from the gardening system 100 over the network 106 to detect the conditions of the gardening system 100 and growth of the plants in the gardening system 100. The server 104 may transmit commands and data to the gardening system 100 or to other connected devices, such as user devices 114. The server 104 may process and transform the data captured at the gardening system 100 to determine optimal plant growing thresholds, and build intelligence in regards to optimal plant growth, and conduct other analysis. The server 104 may determine that a plant is growing sub-optimally, based on the intelligence that it has developed, and may send an alert to a user device 114 with optimization recommendations, or may send a control command to the gardening system 100 to change a condition of the gardening system 100.

In some embodiments, the server 104 may be implemented using one server. In other embodiments, the server 104 may include one or more computing devices connected together over a network. The computing devices may include central servers, distributed computing systems, or any number of processors, memories, or data storage devices in any physical or logical arrangement suitable to provide the functions of the server 104.

The system 10 may comprise a front end interface 110 to transmit processed data, and receive data from different interfaces. The front end interface 110 may reside on different types of devices, such as a computer, a personal digital assistant, a laptop, or a smart phone. The front end interface 110 may provide different reporting services and graphical renderings of processed data for user devices. Graphical renderings of processed data that was captured from the gardening system 100, may be used, for example, by various parties and/or stakeholders in analyzing growth of plants or health of plants grown in the gardening system 100.

The front end interface 110 may provide an interface to the server 104 for user devices and third-party systems 108. The front end interface 110 may generate, assemble and transmit interface screens as web-based configuration for cross-platform access. An example implementation may utilize Socket.io for fast data access and real-time data updates.

The front end interface 110 may assemble and generate a computing interface (e.g., a web-based interface). A user can use the computing interface to subscribe for real time event data feeds via the front end interface 110. The interface 110 may include a first webpage as a main dashboard where a user may see the plants grown in the gardening system 100 and processed data in real time, or near real time. The display may be updated in real-time or near real time.

The front end interface 110 may include a page where users may send control commands to the gardening system 100. For example, based on the graphics displayed on the front end interface 100 (e.g. the light is too bright), the user may send a control command from the front end interface 110 to the gardening system 100 for the controller 102 to send a control command to the lighting subsystem 154 to reduce the amount of light emitted by the lighting subsystem 154.

The front end interface 110 may include a historical data page, which may display historical data captured by the gardening system 100 and processed by the server 104.

The system may comprise one or more third party systems 108 for data exchange. For example, the third party system 108 may collect data captured by the gardening system 100 or data processed by the server 104.

The server 104 may be configured to access or otherwise obtain historical data, real time data, or near real time data from various data sources. The data sources may be sensor components and imaging components of one or more gardening systems 100. The server 104 may comprise a data interface for receiving the data from one or more gardening systems 100.

Figure 2:
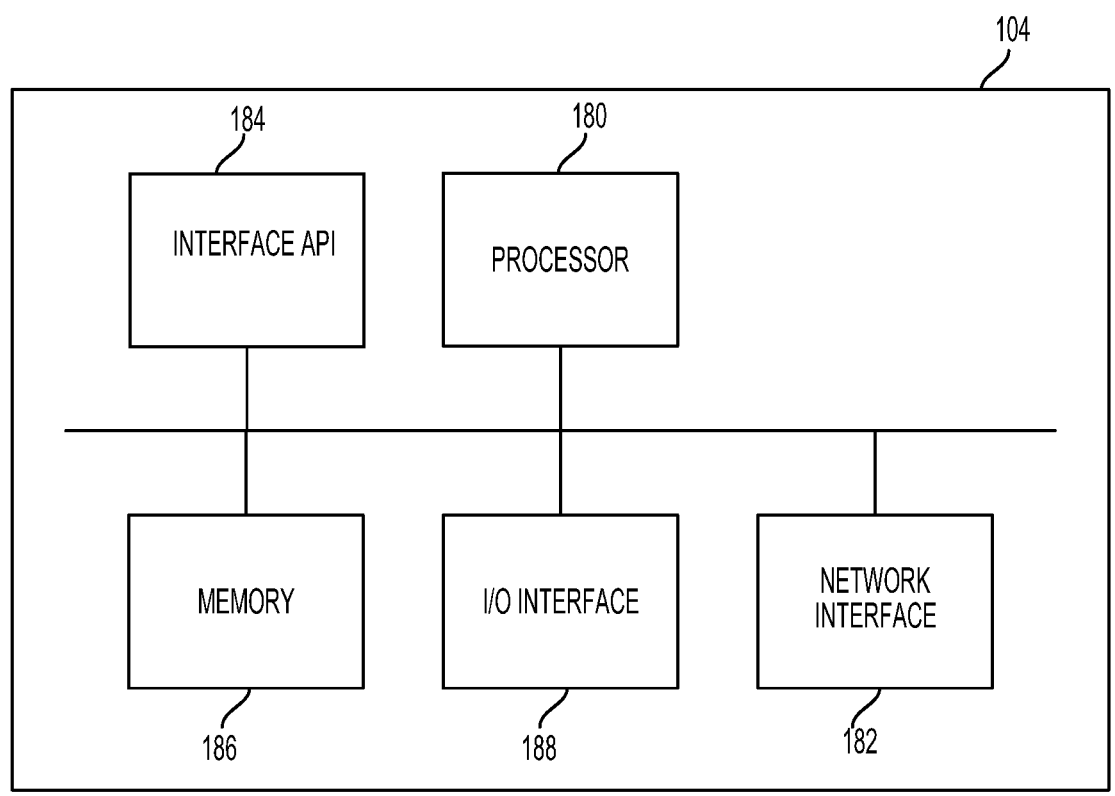
FIG. 2 is a schematic of a server of the system of FIG. 1.

FIG. 2 is a schematic of the server 104 of the system 10.

The server 104 may be configured to collect data captured from the sensor component 192 and imaging component 190 of the gardening system 100. The server 104 may process the data captured by the sensors and determine optimal plant growing thresholds, and build intelligence in regards to optimal plant growth.

For simplicity, only one server 104 is depicted in FIG. 1, but the system 10 may include more servers 104. The server 104 may include at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, or computing devices capable of being configured to carry out the methods described herein.

As depicted in FIG. 2, the server 104 may include at least one processor 180, an interface API 184, memory 186, at least one I/O interface 188, and at least one network interface 182.

The processor 180 may process the data from the gardening system 100, which may include image data or sensor data, and so on, as described herein. Each processor 180 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 186 may include a suitable combination of computer memory that may be located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 188 enables the processor 180 to interconnect with one or more input devices, such as a keyboard, mouse, camera, touch screen and a microphone, or with one or more output devices such as a display screen and a speaker.

Each network interface 182 enables the processor 180 to communicate with other components, to exchange data with other components, to access and connect to network resources, to serve applications, and perform other computing applications by connecting to a network 116 (or multiple networks) capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Application programming interface (API) 184 is configured to connect with front end interface 110 to provide interface services as described herein.

The processor 180 may be operable to register and authenticate user and user devices (using a login, unique identifier, and password for example) prior to providing access to applications, network resources, and data. The processor 180 may serve one user/customer or multiple users/customers.

The server 104 may be configured to identify optimal plant growing thresholds by continually capturing data to build intelligence using artificial intelligence or machine learning. Upon identifying the optimal plant growing thresholds, the server 104 may compare additional data, such as newly captured data from the gardening system 100, determine optimization recommendations for optimizing the health of the plant or growth of the plant to improve the bioavailability of the essentials of the plant. The server 104 may send a control command to the gardening system 100 to automatically change a condition of the gardening system 100, or may send a control command corresponding to an alert to a user device 114, to prompt a user to manually change a condition of the gardening system 100.

The components of the system 10, such as the gardening system 100, the server 104, the user devices 114, may connect to each other or to other devices or components in various ways including directly coupled and indirectly coupled via the network 106. The network 106 (or multiple networks) may carrying data and may involve wired connections, wireless connections, such as the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, and may be connected with other communications networks, such as GSM/GPRS/3G/4G/LTE networks, or a combination thereof. The network 106 may involve different network communication technologies, standards and protocols, such as, for example, G2S protocols.

The server 104 or gardening system 100 may be in communication with one or more user devices 110. The user devices 110 may be connected directly to network 106, or may be connected to network 106, as depicted in FIG. 1, or by way of another network. The user devices 110 may be, for example, personal computers, desktop computers, laptop computers, smartphones, tablet computers, or the like, and may be based on any suitable operating system, such as Microsoft Windows, Apple OS X or iOS, Linux, Android, or the like. For example, the user device 110 is a smartphone that a user may use to view messages transmitted from the gardening system 100 or server 104, to view data captured from the gardening system 100 and processed by the server 104, or to send control commands to the gardening system 100 or server 104.

Figure 3:
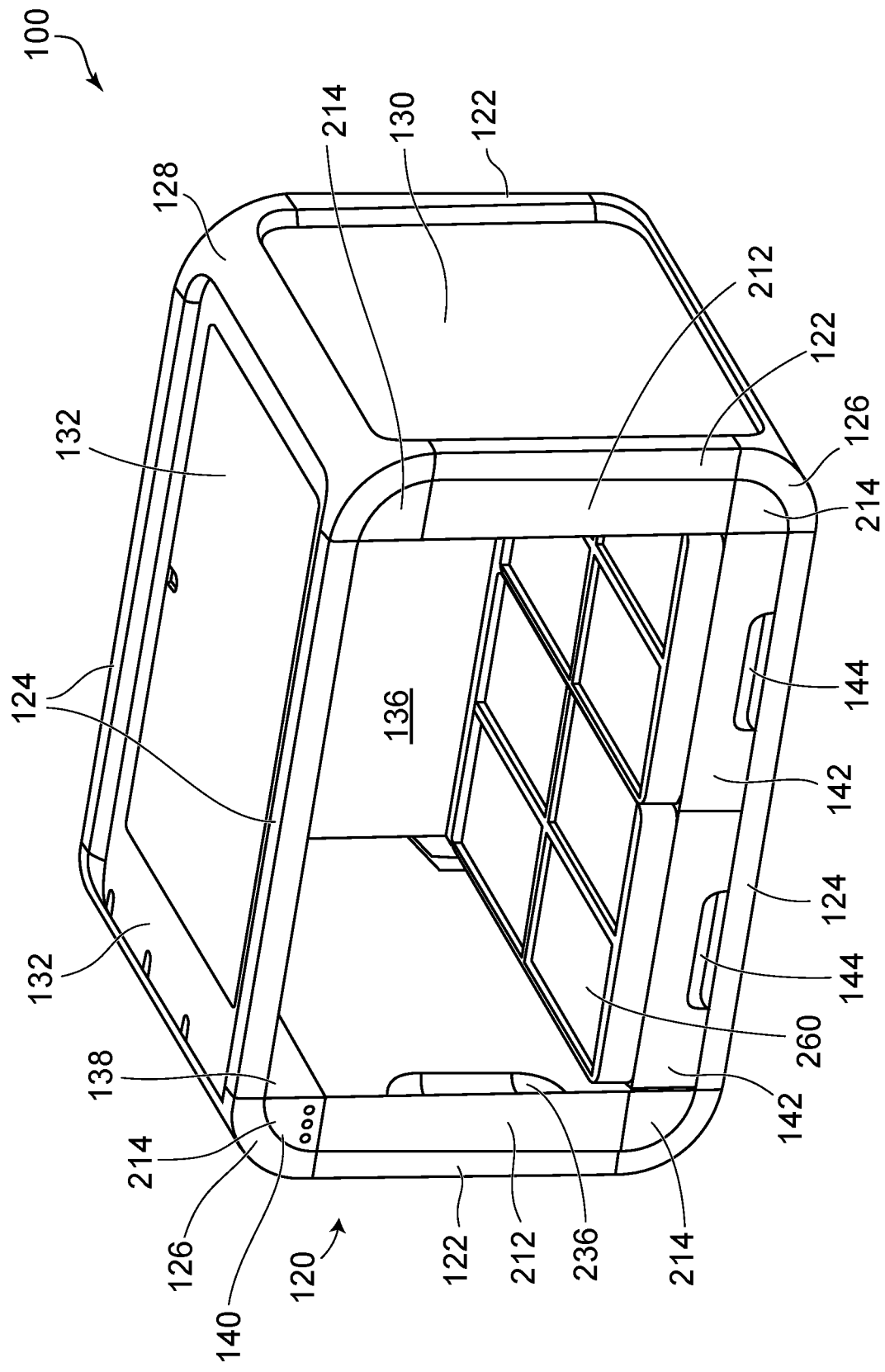
FIG. 3 is a perspective view of a gardening system.

FIG. 3 is a perspective view of the gardening system 100. The gardening system 100 may comprise a frame 120 that defines a housing 136, which may receive one or more trays 142 that may contain the soil and plants grown in the gardening system 100. The bottom surface of the housing 136 may be the growing bed of the gardening system 100, which may be the entire plant growing surface area. The trays may be placed on the bottom surface of the gardening system 100, which may be a water distribution tray 224 of a watering subsystem 210.

As depicted in FIG. 3, the gardening system 100 may have a generally rectangular design with rounded corners and recessed sides.

As depicted in FIG. 3, the frame 120 may comprise one or more vertical elements 122, one or more horizontal elements 124, one or more corner elements 126, one or more corner caps 128, one or more side panels 130, or one or more top panels 132. The components of the frame 120 may be joined together using screws, clips, glue, and the like, or other fasteners and couplings, or may be friction-fit, snap-fit, or click-fit, such that the components to be joined together, and may allow the components to be separated and re-joined together, and have additional components be added or changed to change the size or dimensions of the frame 120 and the housing 136. The frame 120 may house the plants that are grown in the gardening system 100.

In some embodiments, the frame 120, or the parts of the frame 120 (e.g. the one or more vertical elements 122, one or more horizontal elements 124, one or more corner elements 126, one or more corner caps 128, one or more side panels 130, or one or more top panels 132) may be formed with portions or segments that are removably connected to each other, such that a portion of the frame 120 or a portion of the parts of the frame 120 may be removed and re-connected together.

As depicted in FIG. 3, a water reservoir 212 may be mounted on both side surfaces of the frame 120, such that the water reservoirs 212 oppose each other. The water reservoirs 212 may be slidably inserted or removed from the gardening system 100 using rails 214. As depicted in FIG. 3, a rail 214 is at each of the four corners of the gardening system 100. In some embodiments, one or more rails 214 may house components of the gardening system 100, such as electrical components, imaging components 190, or sensor components 192 of the gardening system 100. The side panels 132 cover the outside-facing surface of the water reservoirs 212.

Figure 15:
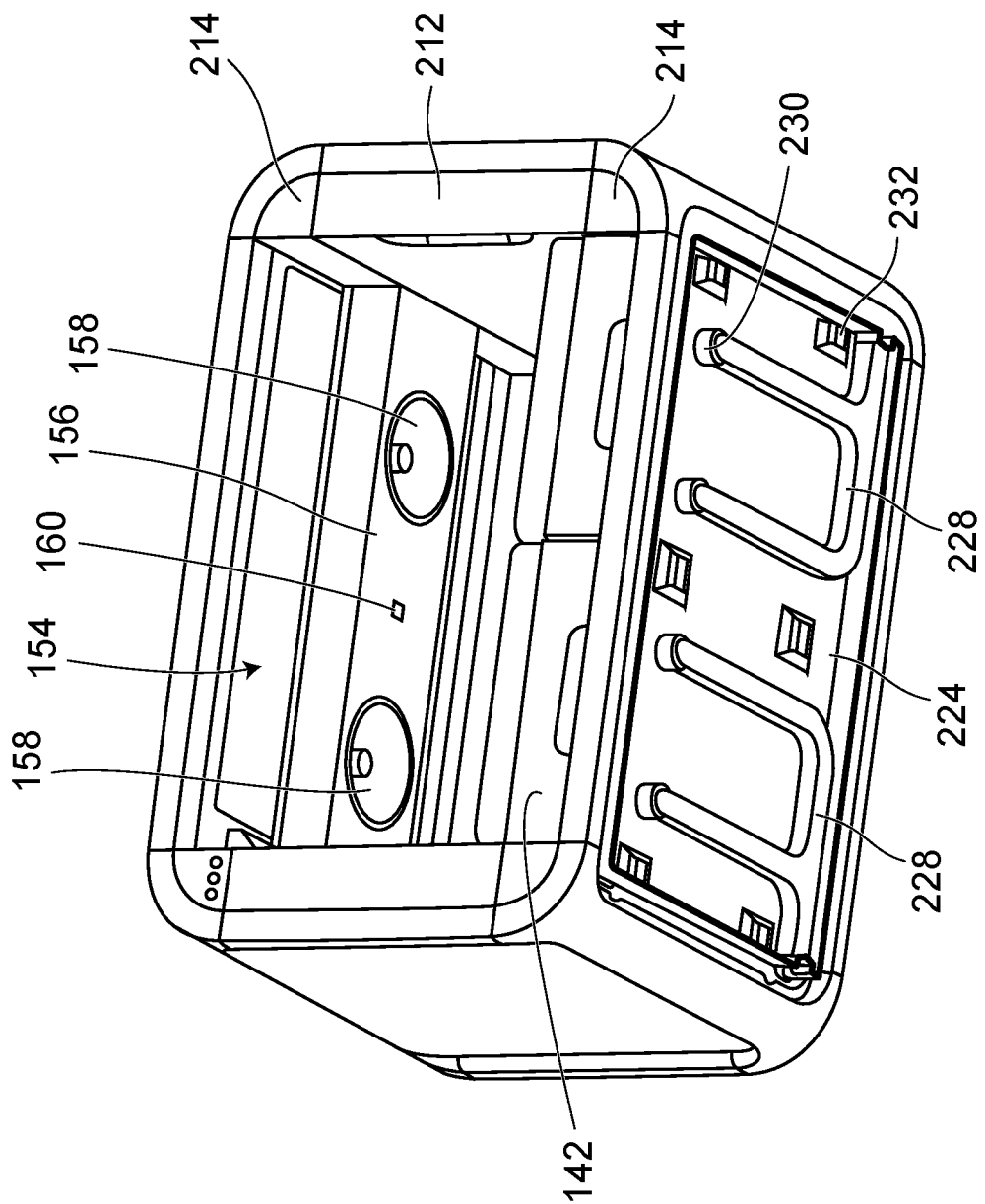
FIG. 15 is a perspective view of the gardening system of FIG. 3.

The gardening system 100 may have a lighting subsystem 154, shown in greater detail in FIG. 15. The top panel 132 and a lighting panel 134 may cover the top portion of the lighting subsystem 154.

In some embodiments, lighting panel 134 may be formed with portions or segments that are removably connected to each other, such that the lighting panel 134 or a portion of the lighting panel 134 may be removed and re-connected together. In some embodiments, the lighting panel 134 may be separable from the top panel 132, or the top panel 132 may function as the lighting panel 134.

As depicted in FIG. 3, the top side, left side, and right side of the gardening system 100 may be recessed.

The components of the frame 120 may be manufactured using wood, metal, plastic, and the like.

In some embodiments, the gardening system 100 may be a modular gardening system 100. In such embodiments, one or more components, or a portion of such components, may be removably joined to the other components of the gardening system 100, and additional components may be installed to the gardening system 100 to change the size, dimensions, or configuration of the gardening system. In some embodiments, the gardening system 100 may be positioned adjacent to another gardening system 100 to increase the size of the gardening system 100. In some embodiments, the gardening system 100 may be stacked on top of another gardening system 100 to increase the amount surface area for growing plants without increasing the size of the footprint of the gardening system 100.

For example, the top panel 132, the lighting panel 134, the water distribution tray 224, or a portion of these components, may be removable from the gardening system 100 to stack one gardening system 100 on top of another gardening system 100. This may allow taller plants to grow in the stacked gardening system 100.

The gardening system 100 may be fully assembled or may be a kit that may be assembled by a user.

In some embodiments, there may be different sizes of gardening system 100 to grow different types of plants.

For example, the gardening system 100 may have a "countertop" size. The gardening system 100 may be dimensioned to receive two trays that may accommodate four soil cubes each. This gardening system 100 may be for growing short, stubby plants, such as microgreens, leafy greens, or herbs.

For example, the gardening system 100 may have a "coffee table" size. The gardening system 100 may be dimensioned to receive two trays that may accommodate four soil cubes each. This gardening system 100 may have sufficient space capacity for growing larger or higher plants, such as Swiss chard, rhubarb, or kale.

For example, the gardening system 100 may have a "large floor" size. The gardening system 100 may be dimensioned to receive two trays that may accommodate four plant cubes. This gardening system 100 may have each with the space capacity for growing taller, deeper plants, such as tomatoes or root vegetables.

For example, the gardening system 100 may have various heights, such as a short height, medium height, or tall height.

Figure 4:
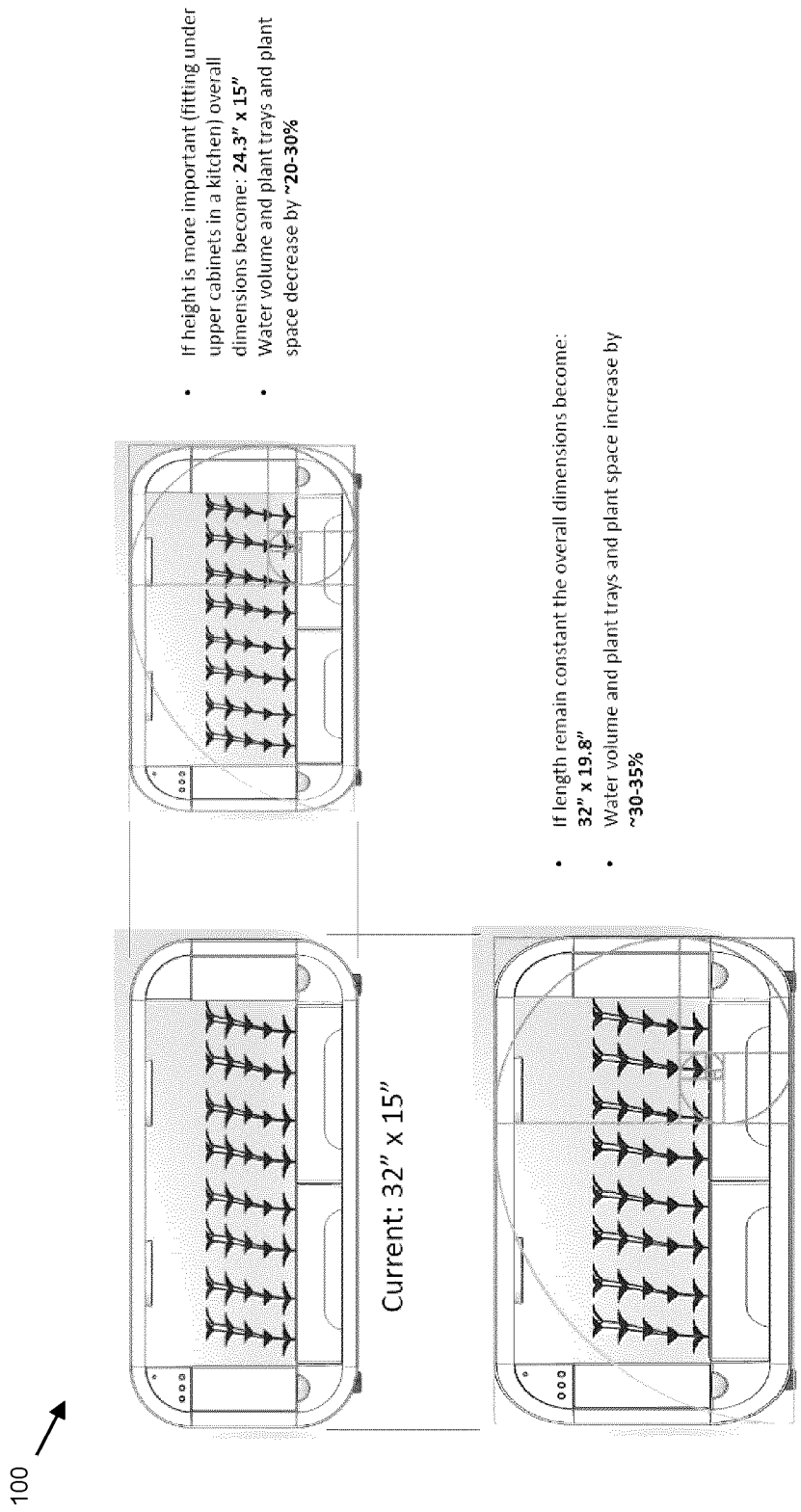
FIG. 4 is a schematic of dimensions of the gardening system of FIG. 3.

In some embodiments, the gardening system 100 may be designed while making use of the Golden Ratio, including the soil cubes discussed herein, for visual beauty. The dimensions for the gardening system 100 may be designed with the Golden Ratio in mind. As depicted in FIG. 4, a gardening system 100 may be 32"×15". If height is a more important dimension (e.g. when designing for the gardening system 100 to fit under upper cabinets in a kitchen), the overall dimension may become 24.3"×15". The water volume and plant trays and plant space may decrease by approximately 20-30%. If the length of the gardening system remains constant, then the overall dimension becomes 32"×19.8". The water volume and plant trays and plant space may increase by approximately 30-35%.

Figure 5:
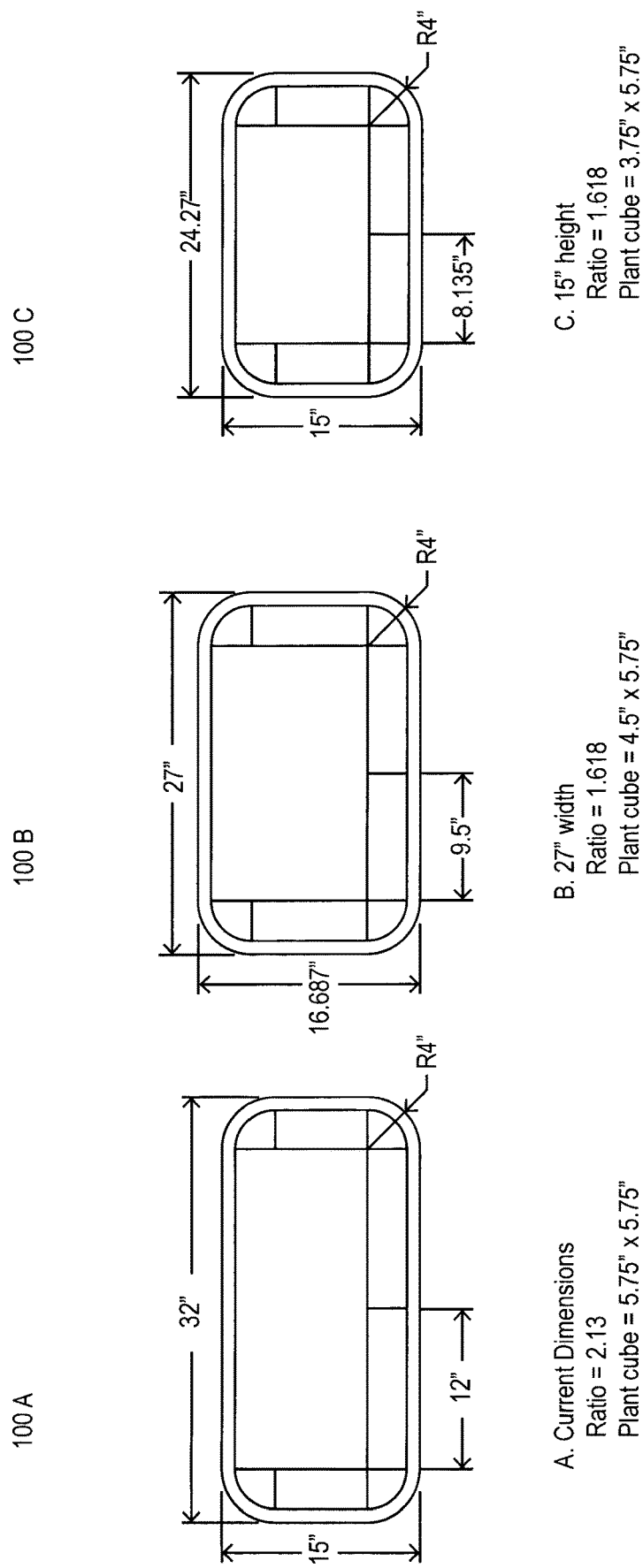
FIG. 5 is a schematic of dimensions of the gardening system of FIG. 3.
Figure 6:
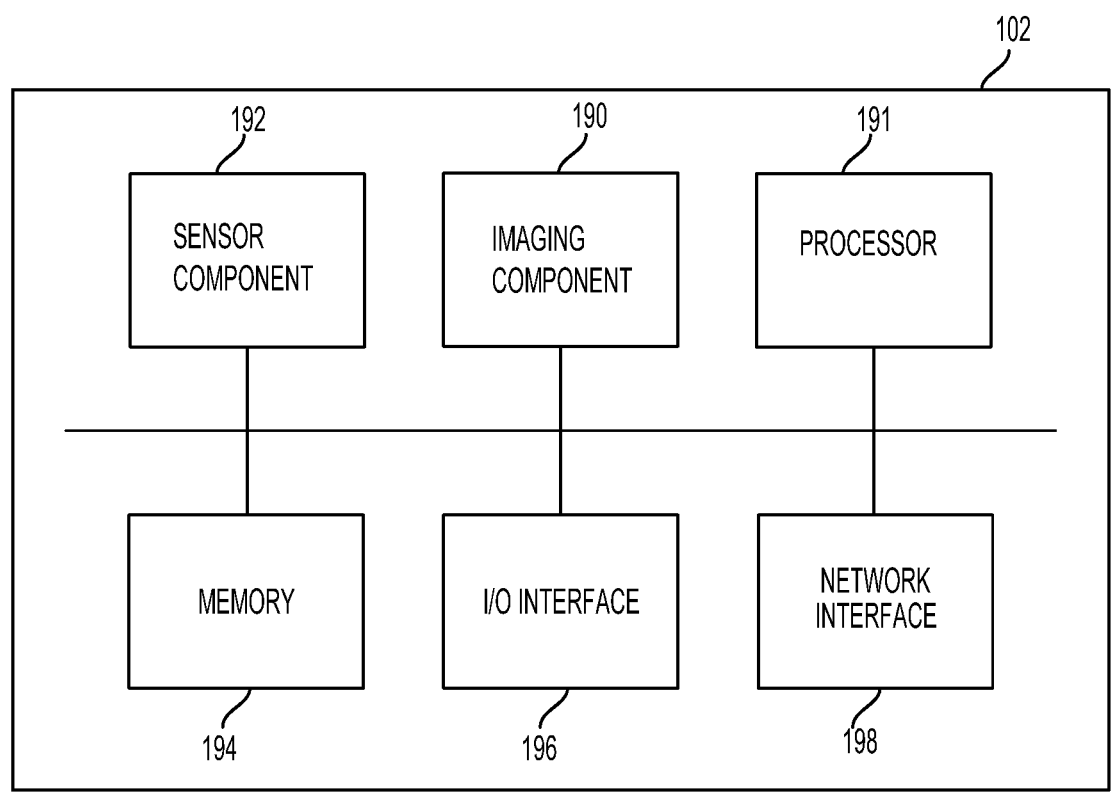
FIG. 6 is a schematic of the gardening system of FIG. 3.

FIG. 5 depicts three example gardening systems 100A, 100B, and 100C.

The gardening system 100A may be 32"×15", which is a ratio of 2.13. The soil unit for gardening system 100A may be 5.75"×5.75". The gardening system 100B may be 27"×16.687", which is a ratio of 1.618. The soil unit for gardening system 100B may be 4.5"×5.75". The gardening system 100C may be 24.270"×15", which is a ratio of 1.618. The soil unit for gardening system 100C may be 3.75"×5.75".

In some embodiments, based on the dimensions of the gardening system 100, in order to maintain a 2 square foot of soil, the depth of the gardening system 100 may be at least 16".

One or more of the rails 214 may house a component of the gardening system 100. As depicted in FIG. 3, the upper left rail 214 of the gardening system 100 may be a housing 138 for the controller 102. A control panel 140 may be positioned on the face of the upper left rail 214. The control panel 140 may comprise buttons, switches, touch screens, and the like, for the user to send a control command to the controller 102. In some embodiments, the control panel 140 may be placed elsewhere on the gardening system 100, such as on the top surface or one of the side surfaces, or on another rail 214.

The controller housing 138 may comprise an air vent to vent out hot air that may be generated in the controller housing 138 during operation of the controller 102.

FIG. 5 illustrates a schematic of the gardening system 102. As depicted, gardening system 102 may include an imaging component 190, sensor component 192, processor 191, memory 194, at least one I/O interface 196, and at least one network interface 198.

The processor 191 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 194 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read only memory (EPROM), and electrically-erasable programmable read-only memory (EEPROM), Ferroelectric RAM (FRAM) or the like.

Each I/O interface 196 may enable the gardening system 102 to interconnect with one or more input devices, such as a keyboard, mouse, camera, touch screen and a microphone, or with one or more output devices such as a display screen and a speaker.

Each network interface 198 may enable the gardening system 102 to communicate with other components, to exchange data with other components, to access and connect to network resources, to serve applications, and perform other computing applications by connecting to a network.

The gardening system 102 may capture data corresponding to the conditions of the housing 136 and the growth of plants in the gardening system 102. The controller 102 may process the captured data, and based on the processed data, send a control command to a subsystem of the gardening system 102 to change the conditions of the housing 136, or send a message to a user device 114. The controller 102 may also transmit the captured data to the server 102 for processing the data and determining optimal plant growing thresholds, and build intelligence in regards to optimal plant growth.

In some embodiments, the controller 102 may be or comprise a computer chip that controls and manages the gardening system 100. The controller 102 may be programmed and updated via software over a network connection, such as an internet connection.

Based on the captured data that may be processed by the controller 102, the controller 102 may send a message to a user device 114 (e.g. mobile phone or desktop computer). In some embodiments, an application may be downloaded to the user device 114, and the message may be viewed on the application. The controller 102 may process data captured by the sensor component 192 or imaging component 190, and based on the processed data, the controller 102 may be triggered to send a message to the user device 114 (e.g. if the controller 102 determines that a water reservoir 212 has run out of water, the controller 102 may be triggered to send a message to the user device 114 immediately). In some embodiments, the controller 102 may periodically send a message to the user device 114. In some embodiments, a user may configure settings of the controller 102 using the user device 114 for the controller 102 to send a message to the user device.

In some embodiments, the messages sent from the controller 102 to the user device 114 may include, and may not be limited to: water reservoir levels, humidity levels, image data of the plants growing in the gardening system 100, photosynthesis data, harvest time recommendation, system malfunctions, humidity and temperature of the environment, acceptable environment thresholds based on seeded plant, Wi-Fi uptime (customizable), data upload times, light usage, cost of electrical usage, optimization settings, optimization of biophotons.

The controller 102 may send messages to the user device 114 in several ways, such as a text message, a message accessible through the downloadable application, and the like.

In some embodiments, if the controller 102, based on captured data, determines that the water in the water reservoir 212 is low or below a certain threshold and need refilling, then the controller 102 may periodically send an alert to the user device 114. Accordingly, the user may be prompted to fill the water reservoir 212.

In some embodiments, if the controller 102, based on captured data, determines that environmental conditions of the gardening system 100 may be outside of an acceptable threshold, then the controller 102 may periodically send an alert to the user device 114.

Figure 7:
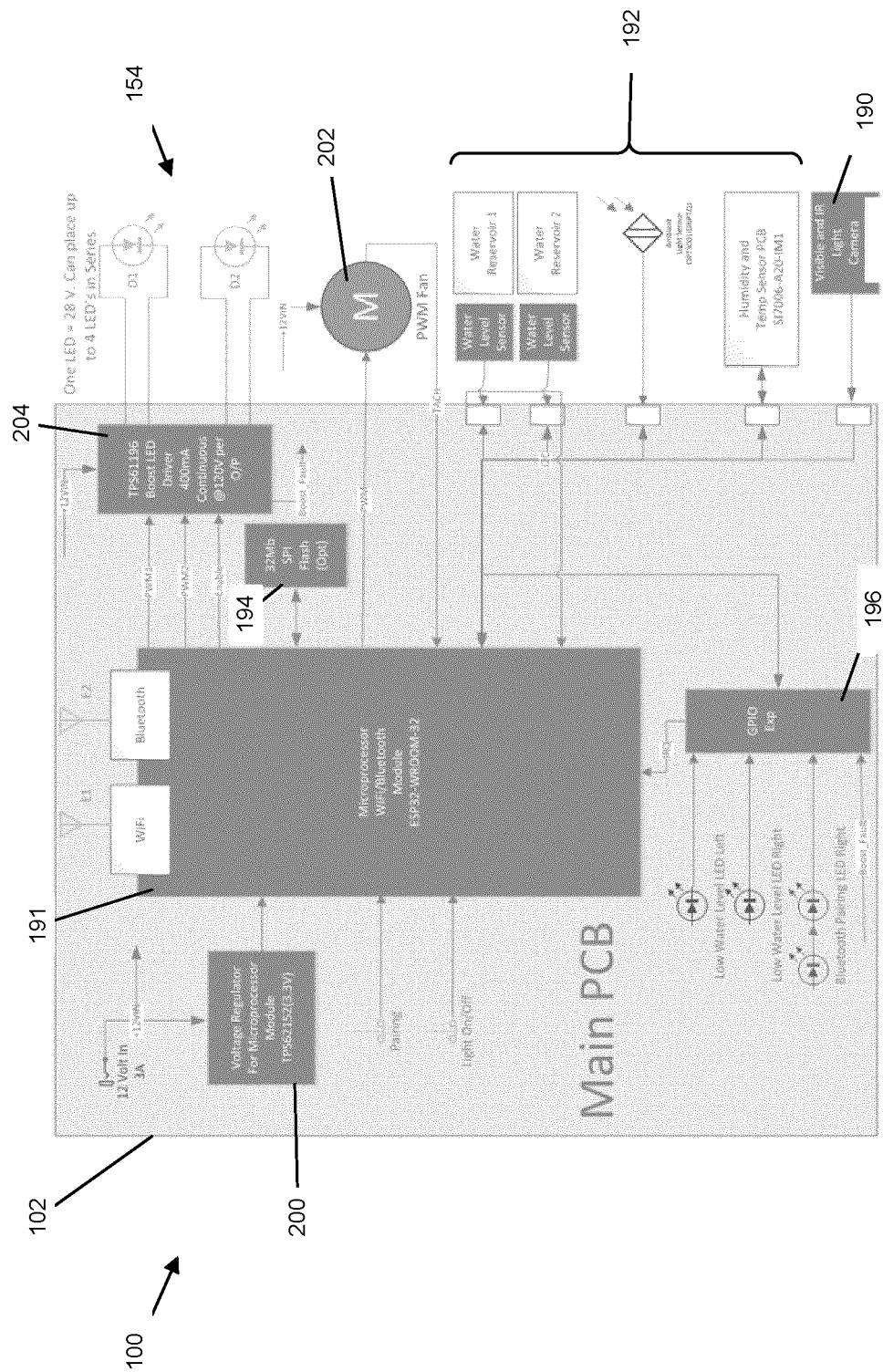
FIG. 7 is a system diagram of the gardening system of FIG. 3.

FIG. 7 is a system diagram of the gardening system 100. As depicted in FIG. 7, the gardening system 100 comprises the controller 102, lighting subsystem 154, sensor component 192, imaging component 190, and a fan 202.

As depicted in FIG. 7, the controller comprises the processor 191, the memory 194, a general purpose input/output interface 196, a voltage regulator 200, and a light controller 204.

To use the gardening system 100, the gardening system 100 is plugged into an electrical outlet, which may provide electrical power to the gardening system 100. For example, the electrical power may be 12 volts in 3 amperes. The voltage regulator 200 may be electrically coupled to the processor 191 and control the amount of electrical energy received by the processor 191.

The controller 102 may be in data communication with the sensor component 192 and the imaging component 190. In some embodiments, the sensor components 192 may comprise water level sensors, ambient light sensors, and humidity and temperature sensors. In some embodiments, the imaging component 190 may comprise a visible camera or an infrared camera. The sensor component 192 and the imaging component 190 may regularly or periodically capture data to be processed by the processor 191. In some embodiments, the controller 102 may send a control command to the sensor component 192 and imaging component 190 to trigger the sensor component 192 and imaging component 190 to capture data.

The sensor component 192 and imaging component 190 may send captured data to the processor 191 to be processed. The processing algorithm used by the processor 191 to process the data from the sensor component 192 and imaging component 190 may be stored in memory 194. The data captured by the sensor component 192 and imaging component 190 may be stored in the memory 194. The processed data from the processor 191 may be stored in the memory 194.

The sensor component 192 and imaging component 190 may be in data communication with the general purpose input/output 196. The general purpose input/output 196 may be in data communication with the processor 191, and various components of the gardening system 100, such as indicator lights. Based on the data received by the processor 191, the processor 191 may send a control command to the various components of the gardening system 100 via the general purpose input output 196. For example, based on processing data from the water level sensors of the sensor component 192, if the processor 191 determines that the water level for one or more water reservoirs 212 is below a certain threshold, the processor 191 may send a control command to a low water level LED light for the corresponding water reservoir 212. As another example, if the processor 191 determines that it is connected to Wi-Fi or Bluetooth, then it may send a control command to a Bluetooth pairing LED light or a Wi-Fi enabled light.

The controller 102 may control the amount of light emitted by the lighting subsystem 154 or the wavelength of the light emitted by the lighting subsystem 154. The ambient light sensor of the sensor component 192 may capture data corresponding to the amount of light in the housing 136. The processor 191 may receive that data from the ambient light sensor, and may process that data to determine the amount of light in the housing 136. Based on this determination, the processor 191 may send a control command to the light controller 204. The light controller 204 may be configured to control the intensity of light emitted by the lighting subsystem 154 and the wavelength of the light emitted by the lighting subsystem 154. As depicted in FIG. 7, the light controller 204 may control two sets of LED lights. In some embodiments, the light controller 204 may control one or more sets of light emitters. As depicted in FIG. 7, as an example, one LED light may be a 28 volt light, so up to four LED lights may be connected in series.

As depicted in FIG. 7, the gardening system 100 may comprise a fan 202. The controller 102 may send a control command to the fan 202 based on the controller 102 determining the temperature of the housing 136 from data captured by a temperature sensor, to change the temperature of the housing 136.

The controller 102 may connect to other devices using Wi-Fi or Bluetooth, as depicted in FIG. 7.

As depicted in FIG. 3, one or more trays 142 may be placed in the housing 136 of the gardening system 100. When the tray 142 is placed in the housing 136, the tray 142 may rest on the water distribution tray 224. The tray 142 may support one or more soil units 260 with seeds for growing plants, and may position the soil unit 260 in the housing 136 such that the soil unit 260 may receive water from the water subsystem 210, and that the soil unit 260 may receive sufficient light from the lighting subsystem 154.

In some embodiments, there may be two trays 142 received in the gardening system 100. The tray 142 may have one or more guiding ridges or rails along the inner surface of the tray 142 for inserting the soil unit 260 into the tray 142.

The tray 142 may be placed in the housing 136. In some embodiments, the housing may have one or more guide rails for sliding the tray 142 in and out of the housing 136.

The tray 142 may be in fluid communication with the water source of the gardening system 100 via the water distribution tray 224 and the water wicking coil 238.

Figure 8:
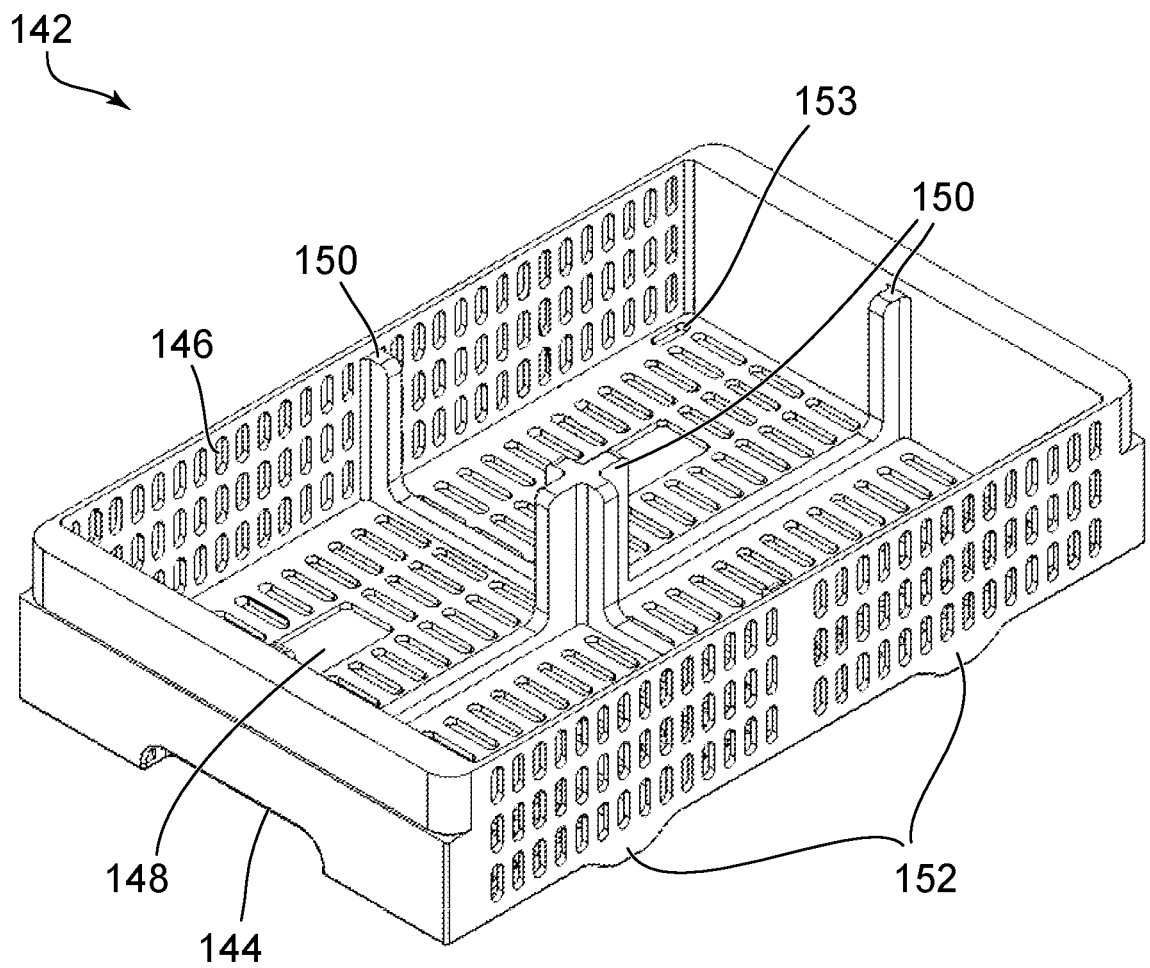
FIG. 8 is a perspective view of a tray.
Figure 9:
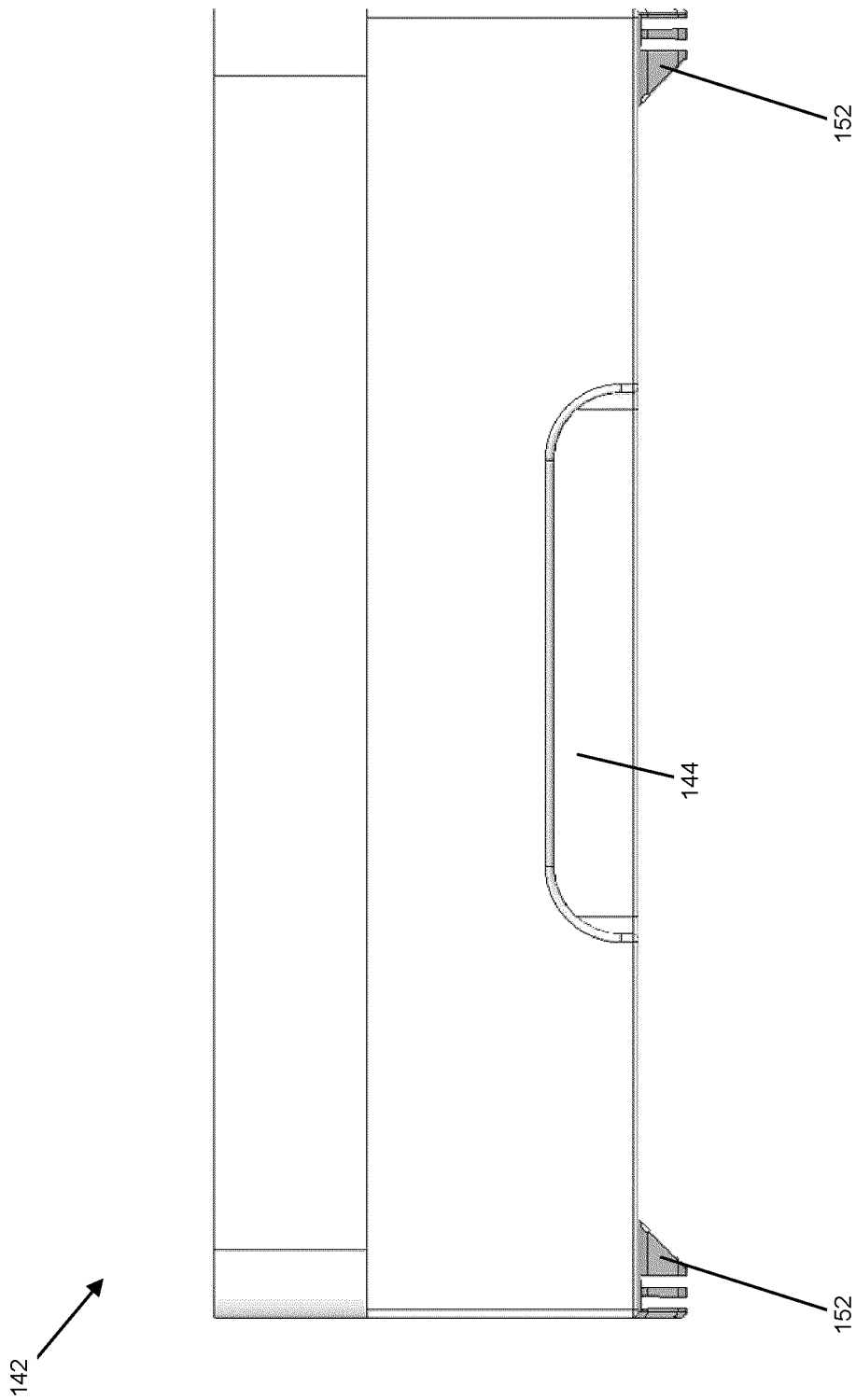
FIG. 9 is a front view of the tray of FIG. 8.
Figure 10:
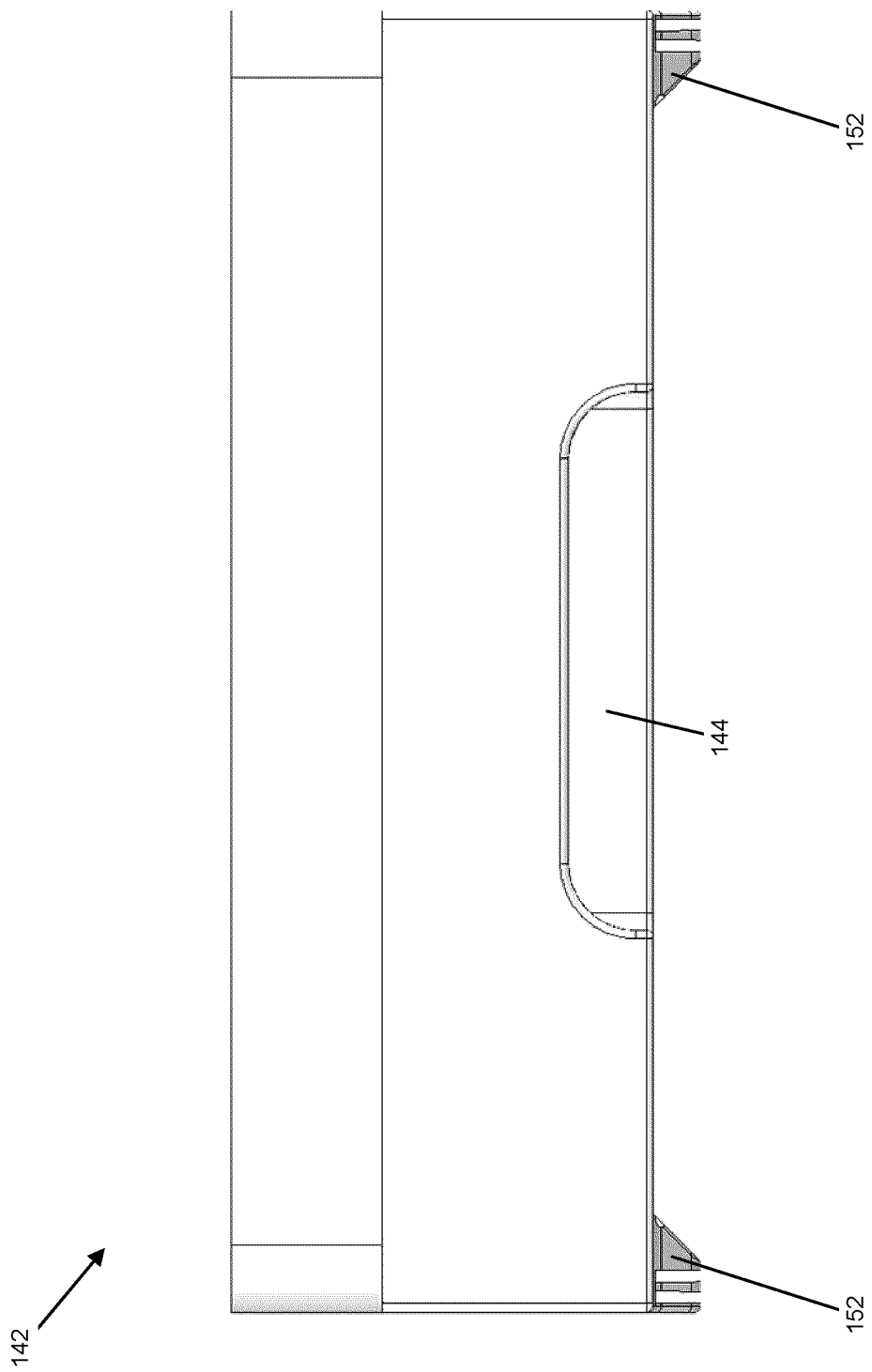
FIG. 10 is a back view of the tray of FIG. 8.
Figure 11:
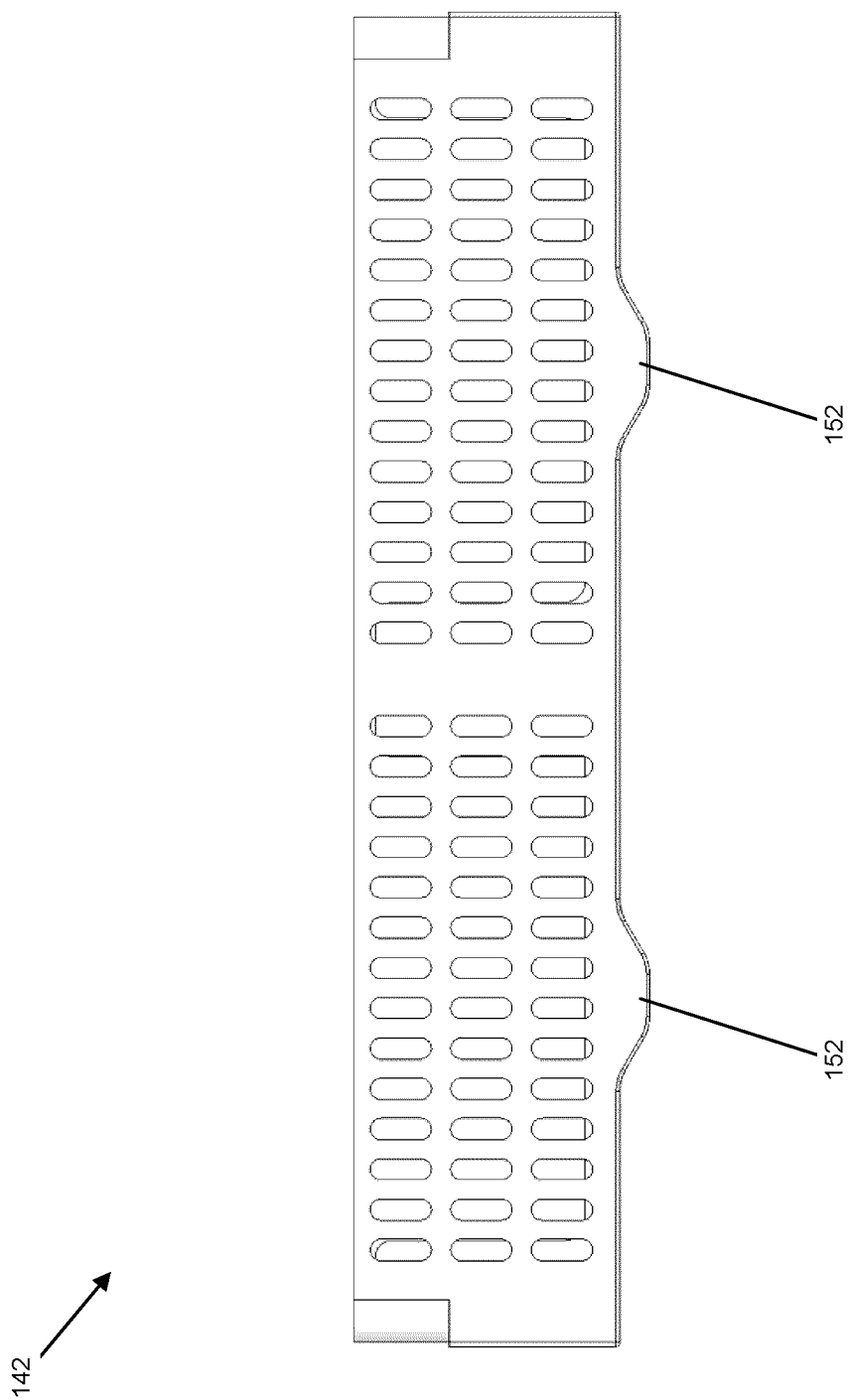
FIG. 11 is a left view of the tray of FIG. 8.
Figure 12:
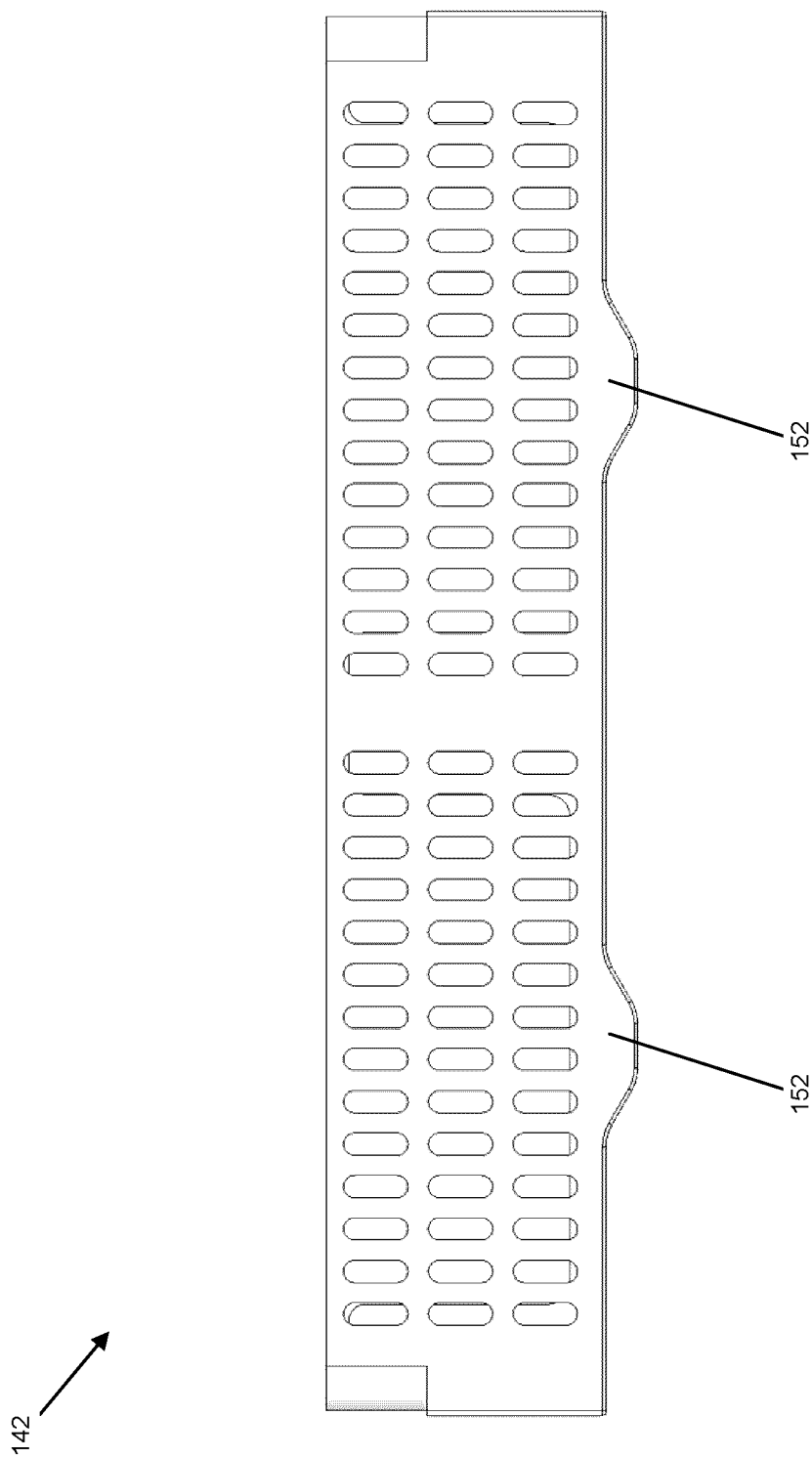
FIG. 12 is a right view of the tray of FIG. 8.
Figure 13:
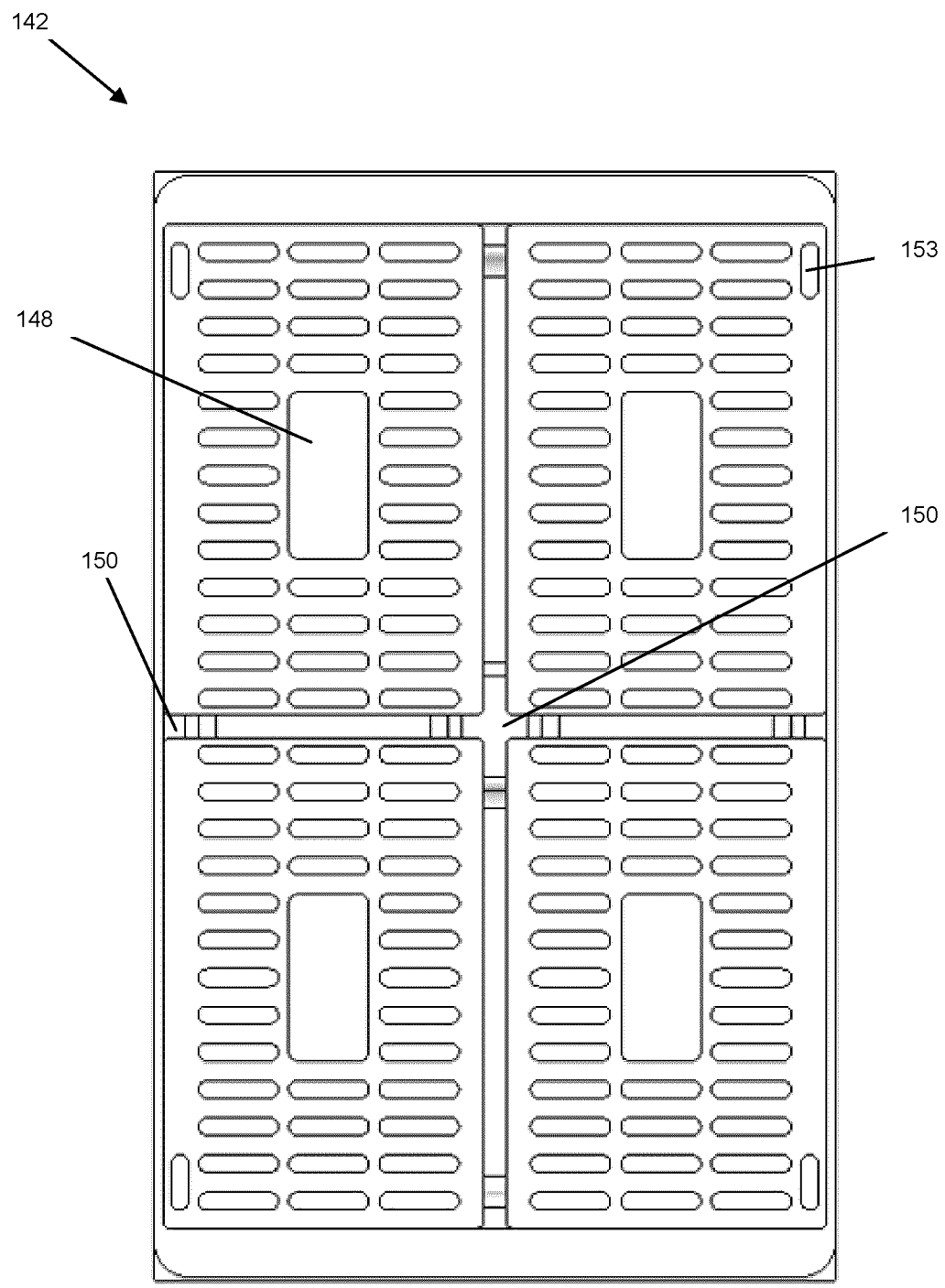
FIG. 13 is a top view of the tray of FIG. 8.
Figure 14:
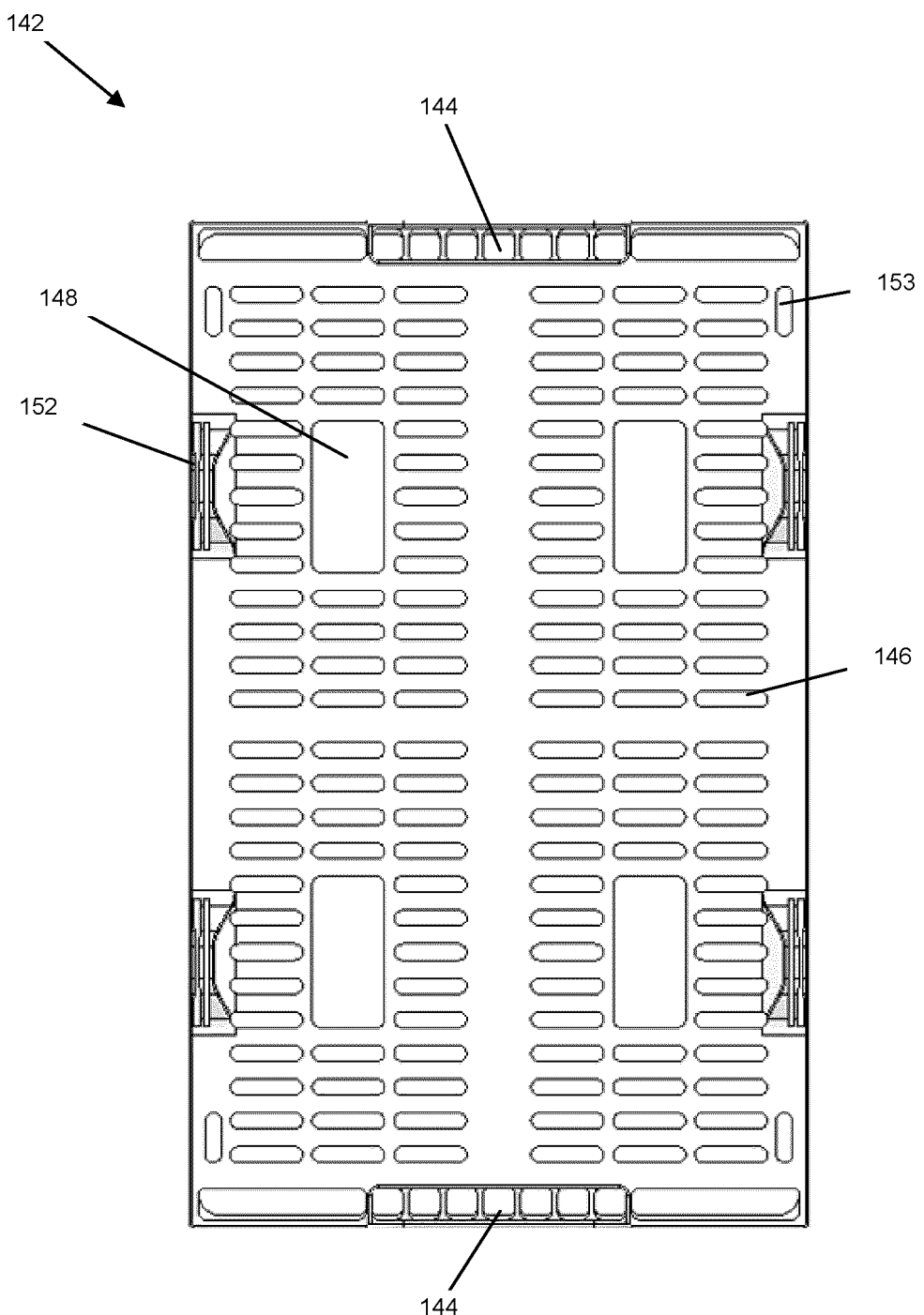
FIG. 14 is a bottom view of the tray of FIG. 8.

FIG. 8 is a perspective view of the tray 142. FIG. 9 to FIG. 14 are front, back, left, right, top and bottom views of the tray 142, respectively. As depicted in FIG. 8, the tray 142 may have a generally rectangular shape. In some embodiments, the tray 142 may have a different shape, such as circle, triangle, square, pentagon, hexagon, and the like. The tray 142 may fit into the housing 136 of the gardening system 100 to position the soil units 260 and seeds in the housing 136 of the gardening system 100.

The tray 142 may be made with plastic, metal, wood, and the like. The tray 142 may be manufactured using extruding, blow moulding, injection moulding, machining, casting, forging, and the like.

The tray 142 may comprise a hand grip 144 on each of the front and back sides of the tray 142. A user may engage the hand grip 144 to carry the tray 142, and move the tray 142 in or out of the housing 136 of the gardening system 100. There may be hand grip 144 on the front and back side of the tray 142, so the tray 142 may be inserted or removed from either the front or back side of the gardening system 100.

The tray 142 may comprise one or more aeration orifices 146 to promote air flow to the soil in the tray 142. The orifices 146 may be manufactured during manufacturing of the tray 142, or may be punched out or cut out after the tray 142 is manufactured. As depicted in FIG. 8, there may be aeration orifices 146 along the side surfaces and bottom surface of the tray 142. The aeration orifices 146 may be generally evenly spaced. In some embodiments, the aeration orifices 146 may be unevenly spaced on the tray 142.

The tray 142 may comprise one or more wicking coil orifices 148. As depicted in FIG. 8, which is configured to support four soil units 260, there are four wicking coil orifices 148. In some embodiments, there may be one or more wicking coil orifices 148. The wicking coil orifice 148 may be positioned on the tray 142, such that when the tray 142 is placed in the housing 136 and rests on the water distribution tray 224, the wicking coil orifice 148 is aligned with a wicking coil 238 that may be placed in a channel 228 of the water distribution tray 224. With the wicking coil orifice 148 aligned in such a manner, when the wicking coil 238 placed in the channel 228, the channel 228 may be in fluid communication with the interior of the tray 142. If there is soil in the tray 142, the channel 228 may be in fluid communication with the soil.

The tray 142 may comprise one or more rails 150. The rail 150 may be configured to promote proper placement of soil units 260 in the tray 260. A soil unit 260 may be slid into the tray 142 using one or more of the rails 150. As depicted in FIG. 8, there may be a rail 150 on each side of the tray 142 and central rails 150, such that the tray 142 may receive four soil units 260, each soil unit 260 approximately one-quarter in size of the tray 142. In some embodiments, there may be more or fewer rails 150 and arranged to promote proper placement of one or more soil units 260.

The tray 142 may comprise legs 152. As depicted in FIG. 8, the legs 152 may extend outwardly from the bottom surface of the tray 142. The legs 152 may be received in corresponding recesses 232 of the water distribution tray 224 to align the tray 142, stabilize the tray 142, or keep the tray 142 in place when supported on the water subsystem 210.

The tray 142 may comprise one or more alignment slots 153. As depicted in FIG. 8, the tray 142 may have a slot 153 at each corner. The slot 153 may receive a corresponding peg 234 of the water distribution tray 224 to align the tray 142, stabilize the tray 142, or keep the tray 142 in place when supported on the water subsystem 210.

In some embodiments, the depth of the tray 142 may be different based on the types of plants grown using the tray 142. For example, for plants with shorter roots, the depth of the tray 142 may be 10 cm deep. As another example, the depth of the tray 142 may be 20 cm deep for growing carrots.

Figure 16:
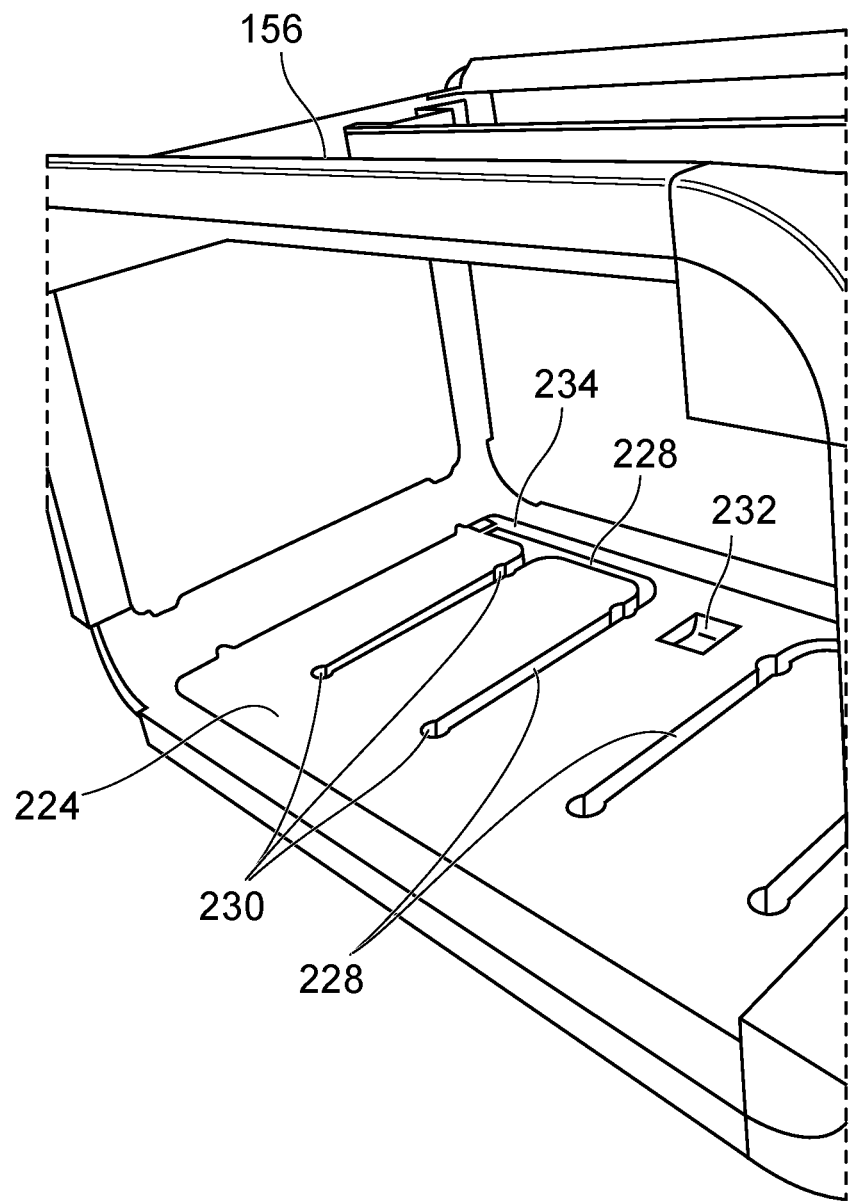
FIG. 16 is a schematic of a lighting subsystem.

The gardening system 100 may comprise a lighting subsystem 154 for controlling the amount of light and type of light that is illuminated in the housing. As depicted in FIG. 15, the lighting subsystem 154 may be mounted to the frame 120 and direct light into the housing 136 of the gardening system. The lighting subsystem 154 may be mounted on the top side of the gardening system 100, as depicted in FIG. 16, or may be mounted on another side of the gardening system 100. For example, one or more light sources 158 may be mounted on the left side of the gardening system 100, the top side of the gardening system 100, the right side of the gardening system 100, or the bottom side of the gardening system 100, or a combination thereof.

The lighting subsystem 154 may comprise a lighting housing 156. The lighting housing 156 may support the components of the lighting subsystem 154. As depicted in FIG. 15, the lighting subsystem 154 may have two recesses to support two light sources 158. The light sources 158 may be controlled by the controller 102 to emit different intensities of light, such as by dimming or brightening, and different wavelengths of light, which may range from ultraviolet light to infrared light, or another wavelength of light. In some embodiments, a first light source 158 may emit a first wavelength of light, and a second light source 158 may emit a second wavelength of light. The lighting subsystem 154 may comprise one or more light sources 158. The light emitted by the one or more light sources 158 may illuminate the housing 136, such that plants growing in the housing 136 may receive light from the light sources 158.

The lighting subsystem 154 may comprise a light sensor 160 that may detect the amount of light in the housing 136 or may detect the type of light in the housing 136. In some embodiments, there may be one or more light sensors 160, with one or more light sensors 160 configured to detect the amount of light in the housing 136, and one or more other light sensors 160 configured to detect the types of light in the housing 136. As depicted in FIG. 15, the lighting subsystem 154 may have a light sensor 160 that may be positioned generally in the middle of the housing subsystem 154 between the two light sources 158. In some embodiments, the one or more light sensors 160 may be positioned ono the gardening system 100 such that the one or more light sensors 160 may detect the amount of light in the housing 136 or may detect the type of light in the housing 136.

The data captured by the light sensors 160 may be transmitted to the controller 102, and the controller 102 may process the data to determine the amount of light and type of light in the housing 136. Based on the determination, the controller 102 may send a control command, for example, to the light controller 204 depicted in FIG. 7, to change the intensity of the light emitted by the lighting subsystem 154 or the type of light emitted by the lighting subsystem 154. For example, if the controller 102 determines that external light (e.g. light from the sun) is shining into the housing 136, the controller 102 may send a control command to the light controller 204 to reduce the intensity of the light emitted by the light sources 158, such as by turning them off or dimming them.

In some embodiments, the lighting subsystem 154 may support light sources 158, which may be LED grow lights. The light sources 158 may be mounted on the top side of the gardening system 100, and directed into the growing bed area of the housing 136. Where a plant is in the housing 136, the LED grow lights may be pointing down towards the plants above the canopy of the soil and plants.

The light sources 158 may emit a full spectrum of light, which may be configured to mimic the sun's spectrum of light. The light sources 158 may emit light having wavelengths that may range from nanometres for UV light to millimeters or Far Red, including infrared. The light sources 158 may emit light having wavelengths outside the nanometer to millimeter range.

When the light sources 160 are turned on, the controller 102 may determine the spectral wavelength of the light to emit during a schedule that the light sources 160 are on. The schedule may be called the "system day".

When the lighting subsystem 154 turns on, the controller 102 may send a control command to the light controller 204 for the light sources 160 to emit light with a wavelength that may mimic a red colour in the early period or the start of the system day schedule, which may be the "day" of the system day. During the middle of the system day, the controller 102 may send a control command to the light controller 204 for the light sources 160 to emit a light with a wavelength that may mimic a white colour. During the end of the system day, the controller 102 may send a control command to the light controller 204 for the light sources 160 to emit light with a wavelength that may mimic a redder colour. Accordingly, the controller 102 may automatically change the intensity of light or wavelength of light emitted from the lighting subsystem 154. This feature may be overridden to other schedules, and may be turned on or off.

The gardening system 100 may comprise a photosensing mechanism that may adjust the amount of light emitted by the lighting system 154 based on the light detected in the housing 136. For example, the gardening system 100 may be placed proximate a window, and external sunlight may shine into the housing 136. The light sensor 160 may capture data that may correspond to spectral wavelengths of sunlight that may be usable to grow the plant in the housing. The captured data may be transmitted to the controller 102, and the controller 102 may determine that there may be sufficient usable sunlight shining on the plants in the housing 136. The controller 102 may send a control command to the light controller 204 to dim the light sources 158 or turn off the light sources 158. The controller 102 may send a control command to the light controller 204 to brighten the light sources 158 or turn on the light sources 158 if it later determines that, based on captured data from the light sensor 160, that the light conditions in the housing 136 has changed. In some embodiments, based on the data captured by the light sensor 160, the controller 102 may send a control command corresponding to a message to a user device 114. The message may be viewed on the user device 114, which may prompt a user to change the lighting conditions in the housing 136. In some embodiments, the user may change the lighting conditions in the housing 136 using the control panel 140. The user may press a button or switch on the control panel 140 to change the lighting conditions in the housing 136. In some embodiments, the user may change the lighting conditions in the housing 136 using the user device 114 (e.g. smartphone or computer), for example, using a downloaded application. The user may send a control command from the user device 114 to the controller 102 to change the lighting conditions in the housing 136. When sending a control command from the user device 114, the user may send the control command by remote access, and a timer may be available to turn on or turn off the gardening system 100.

Figure 17:
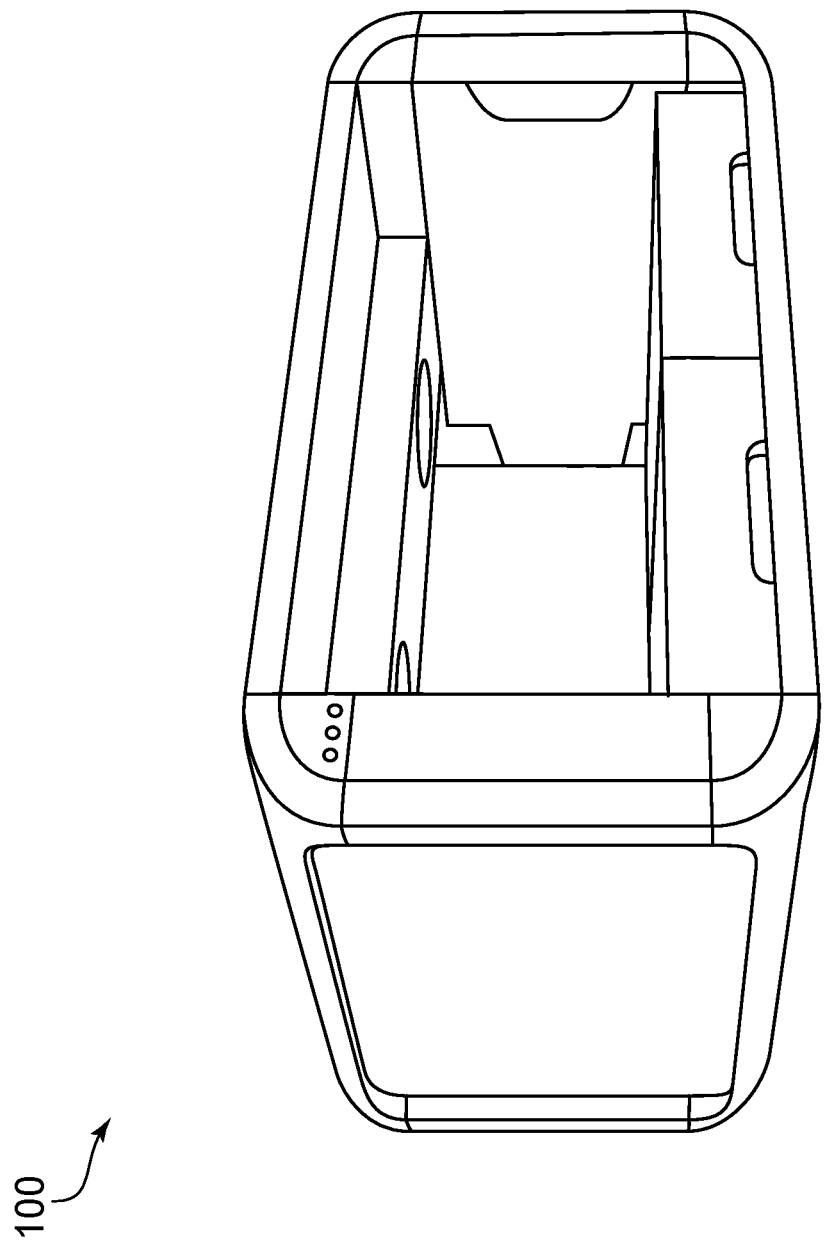
FIG. 17 is a schematic of a lighting subsystem illuminating a housing of a gardening system.

FIG. 17 is a schematic of the lighting subsystem 154 illuminating the housing 136 of the gardening system 100.

In some embodiments, the light source 158 (e.g. LED lights) may provide a spectrum of light that may be associated to the daily spectrum of light that the sun emits for the purposes of growing plants. Based on data captured by the gardening system 100, the system 10 may learn how the light sources 158 may be optimized for optimal bioavailable essentials. The light source 158, in addition to other features of the system 10, may mimic the sun by changing the light spectrum like the sun changes its light spectrum throughout the natural day. For example, the light source 158 may start the "system day" with a red spectrum, turn to white as the "system day" progresses, and then change to red near the end of the "system day". The controller 102 may dynamically adjust the intensity of light or wavelength of light emitted by the light source 158 based on data captured by the sensor component 192.

In some embodiments, the light sources 158 may emit light having ultraviolet to infrared wavelengths found in the sun spectrum. In some embodiments, one light source 158 may emit visible light, and one or more other light sources 158 may emit light having ultraviolet to infrared wavelengths found in the sun spectrum.

In some embodiments, the LED lights may be enhanced with ultraviolet and infrared wavelengths found in the sun spectrum.

Figure 18:
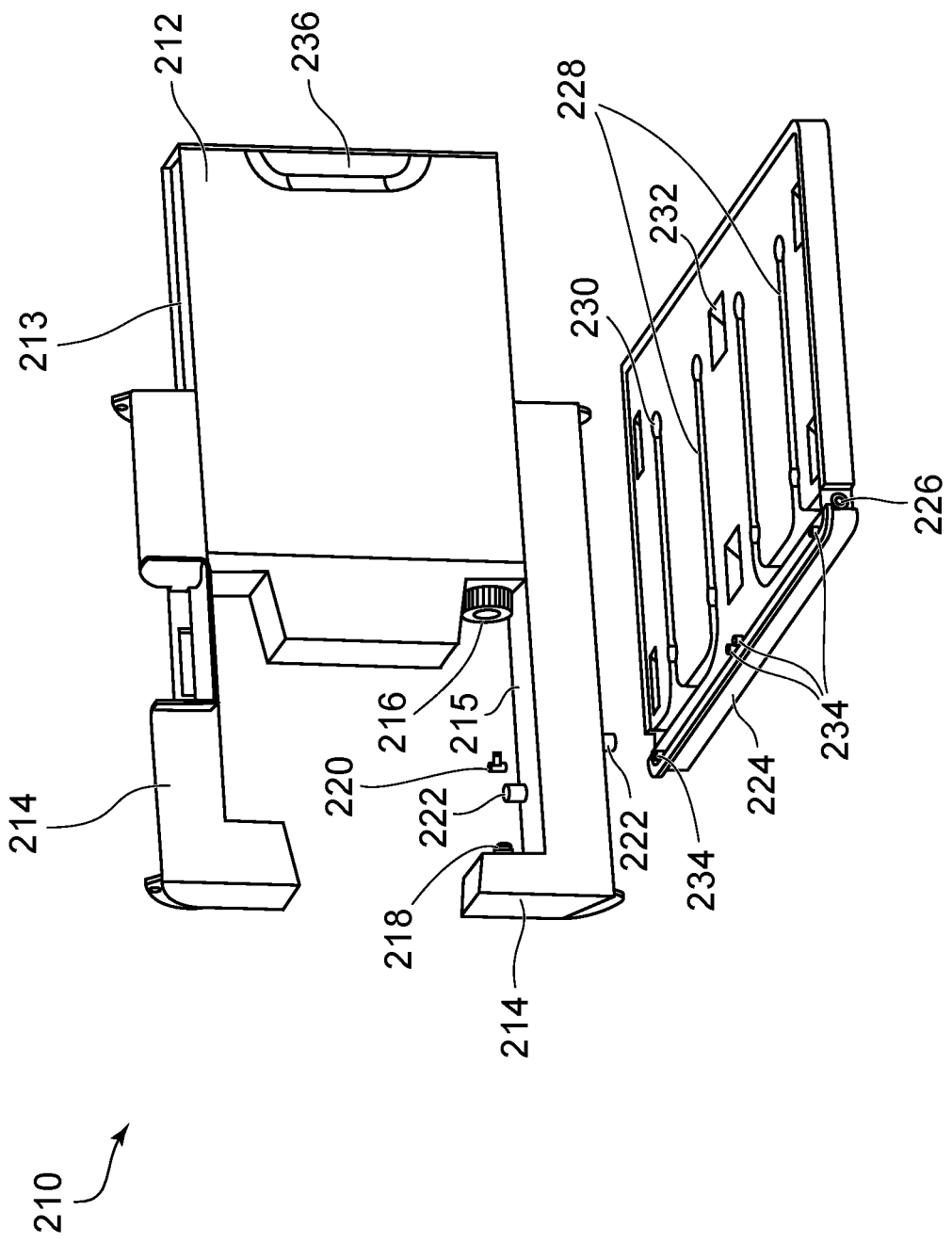
FIG. 18 is a schematic of a water subsystem.

FIG. 18 is a schematic of the water distribution system 210 in exploded view.

The gardening system 100 may comprise a water subsystem 210 to provide a source of water to the plants being grown in the housing 136. The water subsystem 210 may comprise one or more water reservoirs 212, one or more rails 214, and a water distribution tray 224. As depicted in FIG. 3, the water subsystem 210 may have more than one water reservoir 212. The first water reservoir 212 may be mounted on the left side of the gardening system 100, and the second water reservoir 212 may be mounted on the right side of the gardening system. In some embodiments, the water reservoirs 212 may be mounted to the middle portion of the gardening system 100 and divide the housing 136 into a first housing and a second housing.

In some embodiments, the water reservoir 212 may be 2"×14"×10" and may contain approximately 3-4 litres of water.

In some embodiments, the water reservoir 212 may have a different size. There may be larger water reservoirs 212 for larger gardening systems 100 or smaller water reservoirs 212 for smaller gardening systems 100.

To fill up the water reservoir 212 or release water from the water reservoir 212, the water reservoir 212 may comprise a removable spring valve 216. The spring valve 216 may be removable, like a cap, and the water reservoir 212 may be filled using, for example, a faucet or tap. The spring valve 216 may be positioned near the bottom of the water reservoir 212 when the water reservoir 212 is connected to the gardening system 100. When the spring valve 216 is secured to the water reservoir 212, and when the spring of the spring valve 216 is compressed, the spring valve 216 may open to allow for fluid communication between the interior of the water reservoir 212 and the exterior of the water reservoir 212 through the spring valve 216. For example, when the water reservoir 212 is filled and the spring of the spring valve 216 is compressed, the water may flow through the spring valve 216 and out the water reservoir 212.

The body of the water reservoir 212 may define a channel 213 that may receive a guide 215 of the rail 214 for sliding the water reservoir 212 into and out of the gardening system 100.

In some embodiments, the water reservoir 212 may have a spring valve 216 and a cap that are separate from each other, such that the spring valve 216 is not removed the water reservoir 212 to fill the water reservoir. The cap may be removed to fill the water reservoir 212.

The water reservoir 212 may have a hand grip 236 for holding the water reservoir 212, such as when moving the water reservoir 212 in and out of the gardening system 100.

The rails 214 of the water subsystem 210 may be removably connected to the frame 120, using, for example, screws, clips, fasteners, couplings, and the like, or may be friction-fit or snap-fit to the frame 120, such that the rails 214 may be connected to the frame 120, removed from the frame 120, and re-connected to the frame. As depicted in FIG. 3, the gardening system 100 may have four rails 214, each rail removably connected to one of the four corners of the frame 120 of the gardening system 100.

The body of the rail 214 may define a guide 215 that may be received in a corresponding channel 213 of the water reservoir 212 for sliding the water reservoir 212 into and out of the gardening system 100.

As depicted in FIG. 18, the rails 214 may have a body that extends along a longitudinal axis, and have a protrusion at one of the end of the rails 214. The protrusion may prevent the water reservoir 212 from sliding out of the other side of the gardening system 100 when it is being slidably positioned in the gardening system 100. When two rails 214 are joined to the frame 120, the two rails 214 may guide the water reservoir 212 as the water reservoir 212 is slidably inserted or slidably removed from the gardening system 100.

In some embodiments, one or more rails 214 may have a water nozzle 218 that protrudes from the rail 214. There may be a seal, for example, an O-ring 220, installed on the water nozzle 218. The water nozzle 218 may engage with the spring valve 216 to compress the spring of the spring valve 216 to fluidly communicate the water reservoir 212 and the nozzle 218. When the nozzle 218 is engaged with the spring valve 216, the O-ring 220 may seal the interface between the spring valve 216 and the nozzle 218 such that the water does not leak through the interface.

In some embodiments, when the nozzle 218 and the spring valve 216 are engaged, the engagement may create a "click" sound that may indicate that the nozzle 218 and the spring valve 216 are engaged.

Figure 22:
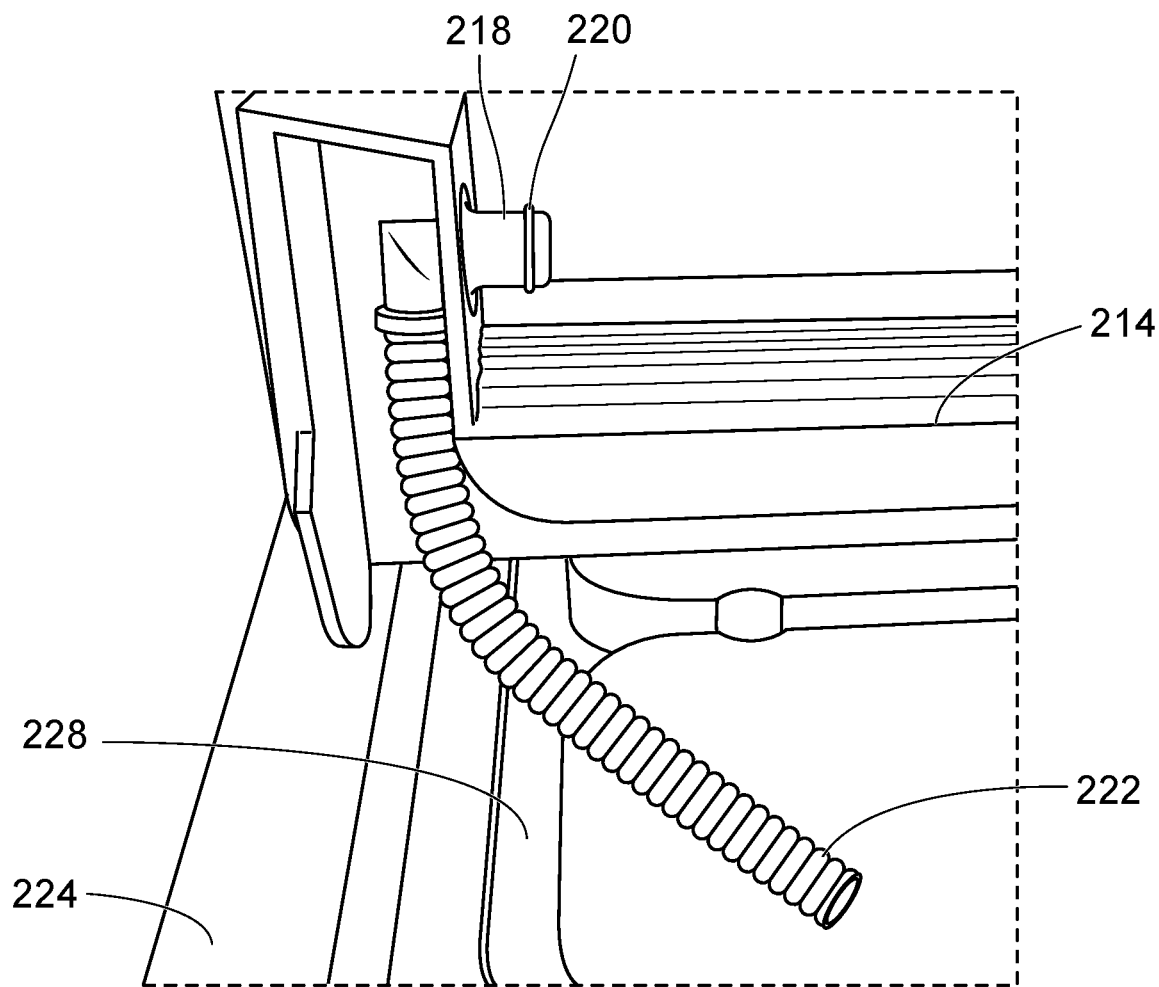
FIG. 22 is a schematic of the water subsystem of FIG. 18.

As depicted in FIG. 22, one end of a tube 222 may be connected to the nozzle 218 using a fitting. The second end of the tube 222 may be connected to a port 226 of the water distribution tray 224 to fluidly connect the nozzle with the port 226. Accordingly, when the nozzle 218 of the rail 214 is engaged with the spring valve 216 of the water reservoir 212, and the tube 222 fluidly connecting the nozzle 218 and the port 226 of the water distribution tray 224, the interior of the water reservoir 212 in fluid communication with the port 226 of the water distribution tray 224, through the spring valve 216, the nozzle 218, and the tube 222.

Figure 19:
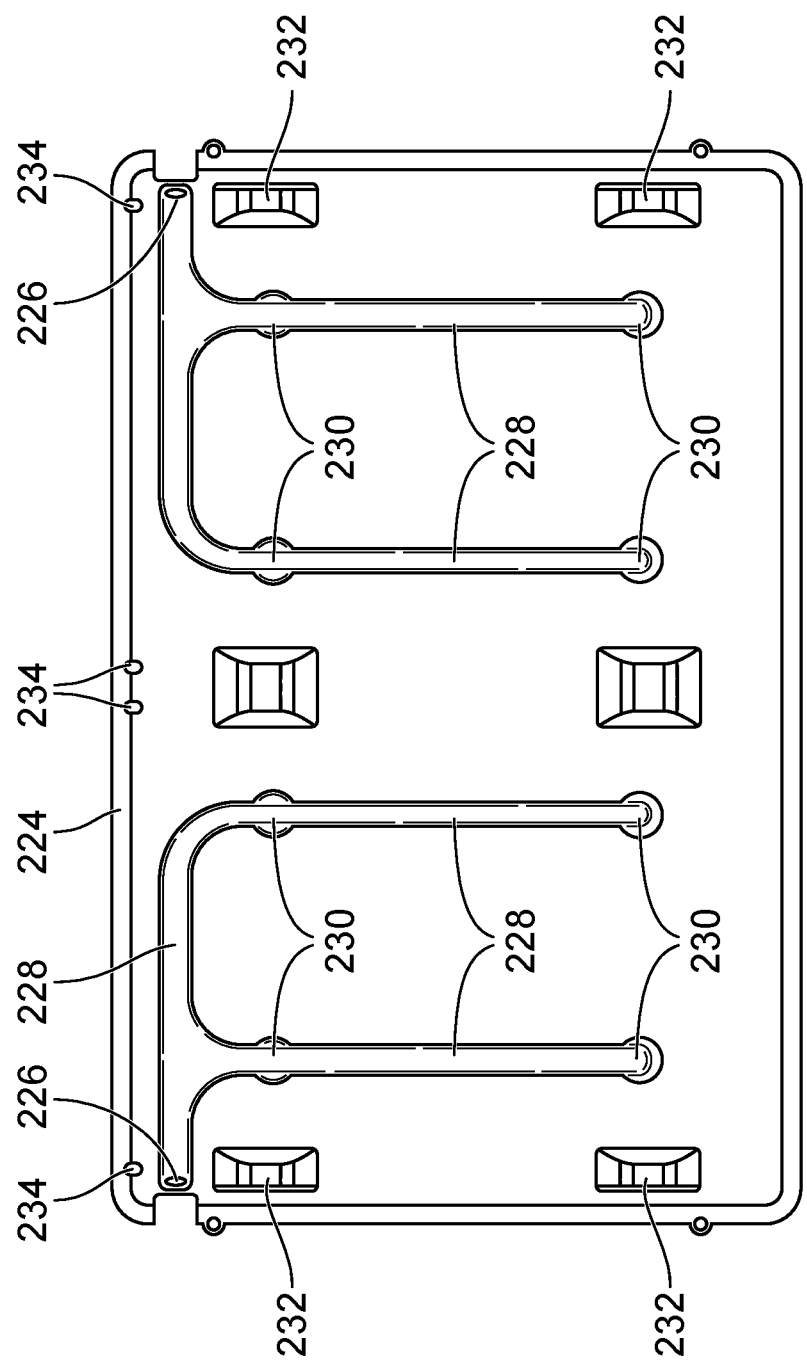
FIG. 19 is a schematic of a water distribution tray of the water subsystem of FIG. 18.

FIG. 19 is a schematic of the water distribution tray 224 of the water subsystem 210. The water distribution tray 224 may be connected to the bottom side of the frame 120 of the gardening system 100. The water distribution tray 224 may define the surface on which the one or more trays 142 holding the soil and plants rest.

The water distribution tray 224 of the water subsystem 210 may be removably connected to the frame 120, using, for example, screws, clips, fasteners, couplings, and the like, or may be friction-fit or snap-fit to the frame 120, such that the water distribution tray 224 may be connected to the frame 120, removed from the frame 120, and re-connected to the frame. In some embodiments, the water distribution tray 224 may be formed with portions or segments that are removably connected to each other, such that a portion of the water distribution tray may be removably connected to the frame 120.

Figure 21:
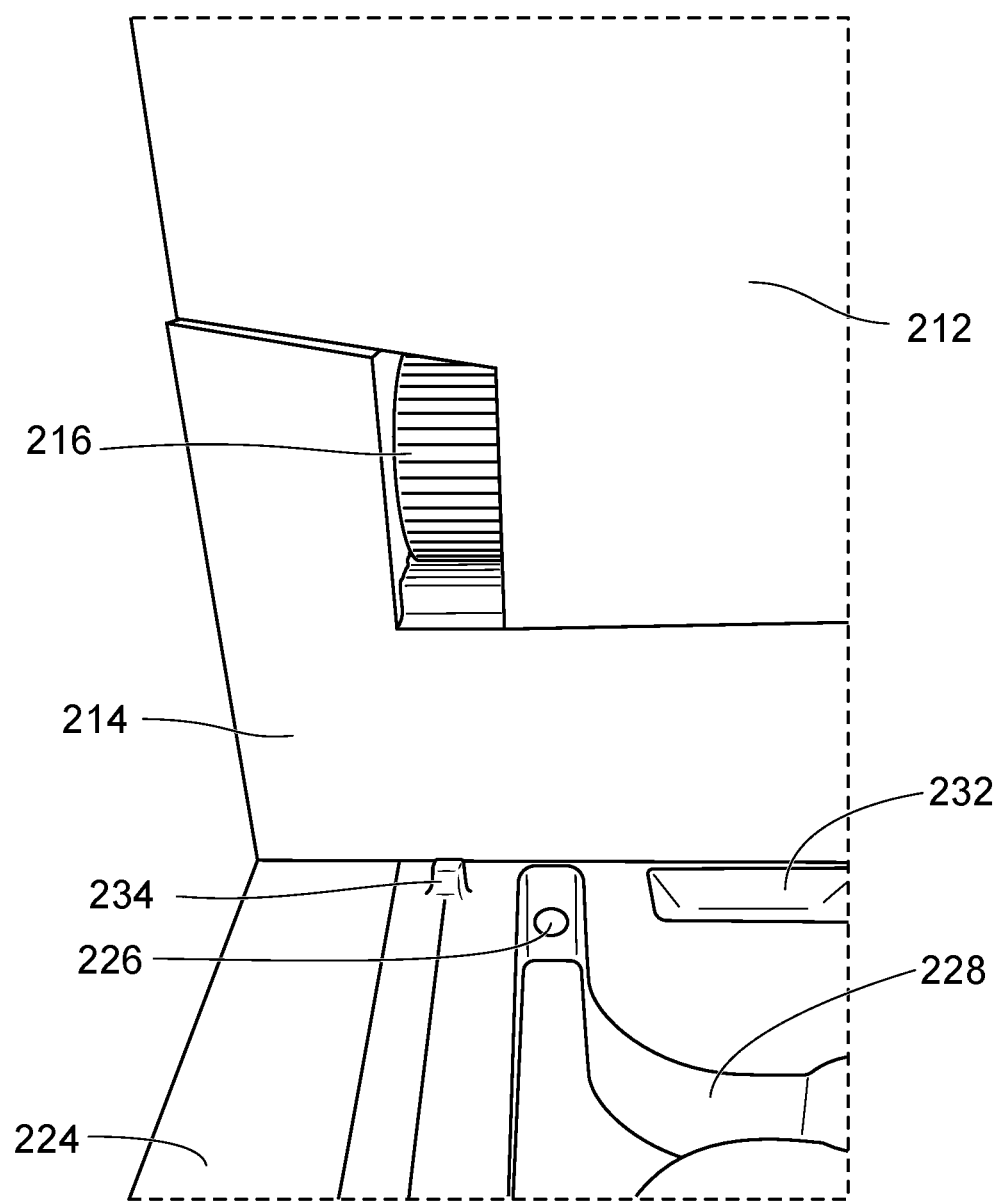
FIG. 21 is a schematic of the water subsystem of FIG. 18.
Figure 23:
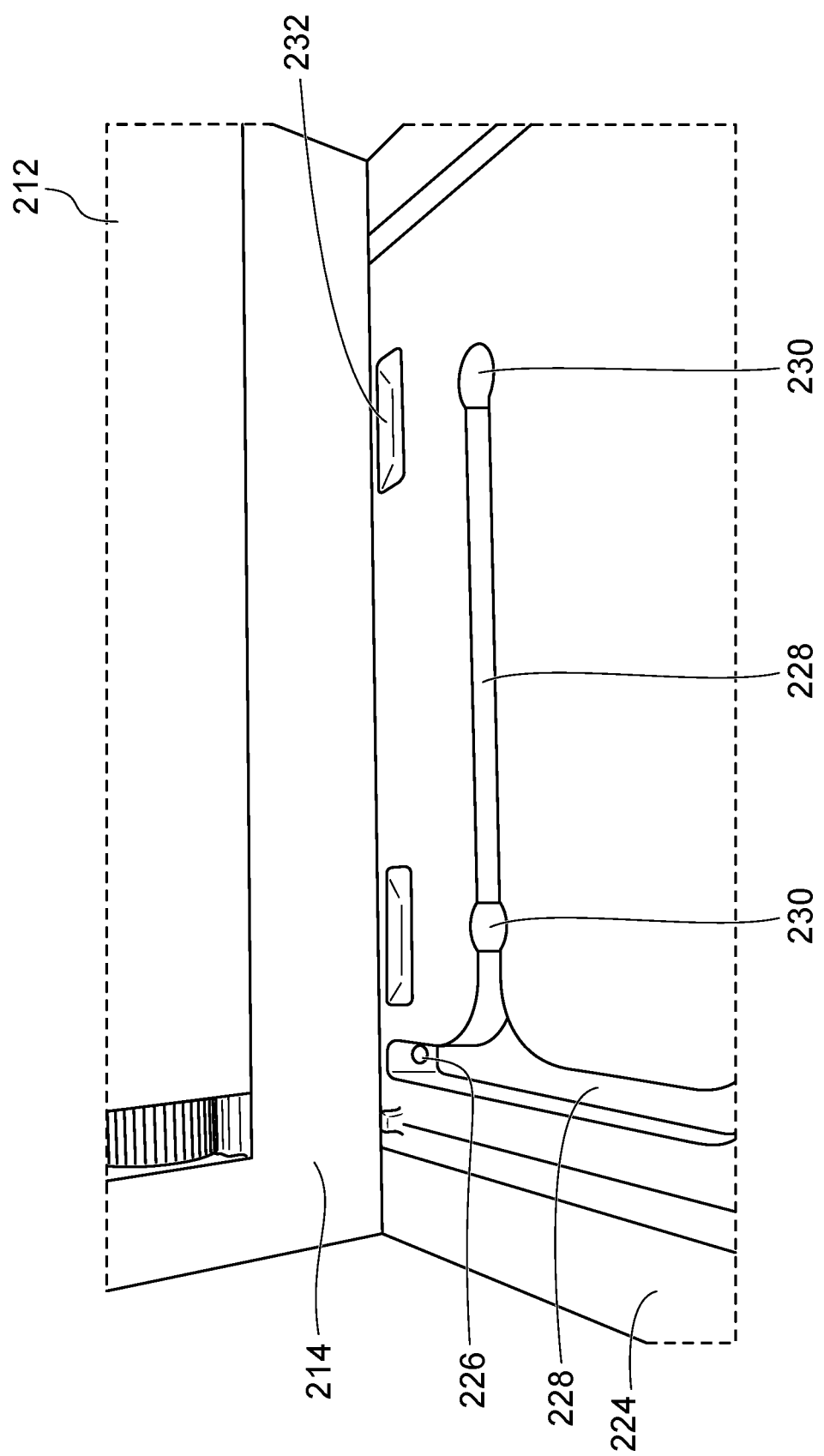
FIG. 23 is a schematic of the water subsystem of FIG. 18.

The water distribution tray 224 may comprise a port 226 that may be fluidly connected with the nozzle 218 using the tube 222. There may be a port 222 for each water reservoir 212 that may be present in the gardening system 212. As depicted in FIG. 21 and FIG. 23, the port 222 may be in fluid communication with the channel 228 of the water distribution tray 224.

The water distribution tray 224 may define one or more channels 228 for receiving water from the water reservoir 212. As the water flows from the water reservoir 212 through the port 226, the water flows into the channels 228. As the water continues to flow into the channels 228, the water level in the channels 228 may increase until it reaches the water level reaches the top of the port 226. As the water reservoir 212, rail 214, and channel 228 define an air-tight system when the water level in the channel 228 reaches the top of the port 226, no air may flow into the water reservoir 212, such that no more water flows out of the reservoir 212 and into the channel 228.

As depicted in FIG. 19, the water distribution tray 224 may define two channels 228 that may be fluidly isolated from each other. A first water reservoir 212 may provide water for a first channel 228, and a second water reservoir 212 may provide water for a second channel 228. By isolating the two channels 228, the amount of water provided to the plants on the two sides of the housing 136 may be controlled. In some embodiments, the water distribution tray 224 may define one or more channels 228, some of which may be fluidly connected or fluidly separated from each other.

A wicking coil 238 may be placed in the channel 228 to fluidly communicate the channel 228 with soil housed in the tray 142 that is placed in the housing 136 of the gardening system 100. In some embodiments, one or more rounded cavities 230 may be defined along the channels 228, as depicted in FIG. 23, for receiving the wicking coil 238. The cavity 230 may be shaped generally like the shape of the wicking coil. While FIG. 23 depicts the cavity 230 as a rounded cavity, the cavity 230 may have a triangular shape, rectangular shape, square shape, polygonal shape, irregular shape, honeycomb shape, and the like. The cavity 230 may be positioned along the channel 228 such that a wicking coil 238 placed in the cavity 230 may fluidly communicate the channel 228 with soil that is positioned above the cavity 230. For example, the cavity 230 may be positioned along the channel 228 to align with the wicking coil orifice 148 of the tray 142 when the tray 142 is positioned in the housing.

The water distribution tray 224 may define one or more recesses 232. As depicted in FIG. 18, the recesses 232 may extend downwardly from the top surface of the water distribution tray 224. The recesses 232 may receive corresponding legs 152 of the tray 142 to align the tray 142, stabilize the tray 142, or keep the tray 142 in place when supported on the water subsystem 210. As depicted in FIG. 19, the recesses 232 along the sides of the water distribution tray 224 may be narrower than the recesses 232 along the middle of the water distribution tray 224. The recesses 232 along the sides of the water distribution tray 224 may receive a leg 152 from one tray 142, while the recesses 232 along the middle may receive legs 152 from two trays 142.

The water distribution tray 224 may comprise one or more pegs 234. As depicted in FIG. 18, there may be four pegs 234 positioned at the back of the water distribution tray 224. The pegs 234 may be received in the slots 153 of the tray 142 to tray 142, stabilize the tray 142, or keep the tray 142 in place when supported on the water subsystem 210. In some embodiments, the water distribution tray 224 may comprise one or more pegs 234 along the back of the tray 224, along the front of the tray 224, or both the front and back of the tray 224.

In some embodiments, the water distribution system 210 may be a passive hydrology system, in that there may be no pump, and gravity acts upon the water for the water to flow from the water reservoir 212 to the channel 228 of the water distribution tray 224.

In some embodiments, the water distribution system 210 may be an active hydrology system, in that there may be a pump that pumps water from the water reservoir 212 to the channel 228 of the water distribution tray 224.

Figure 20:
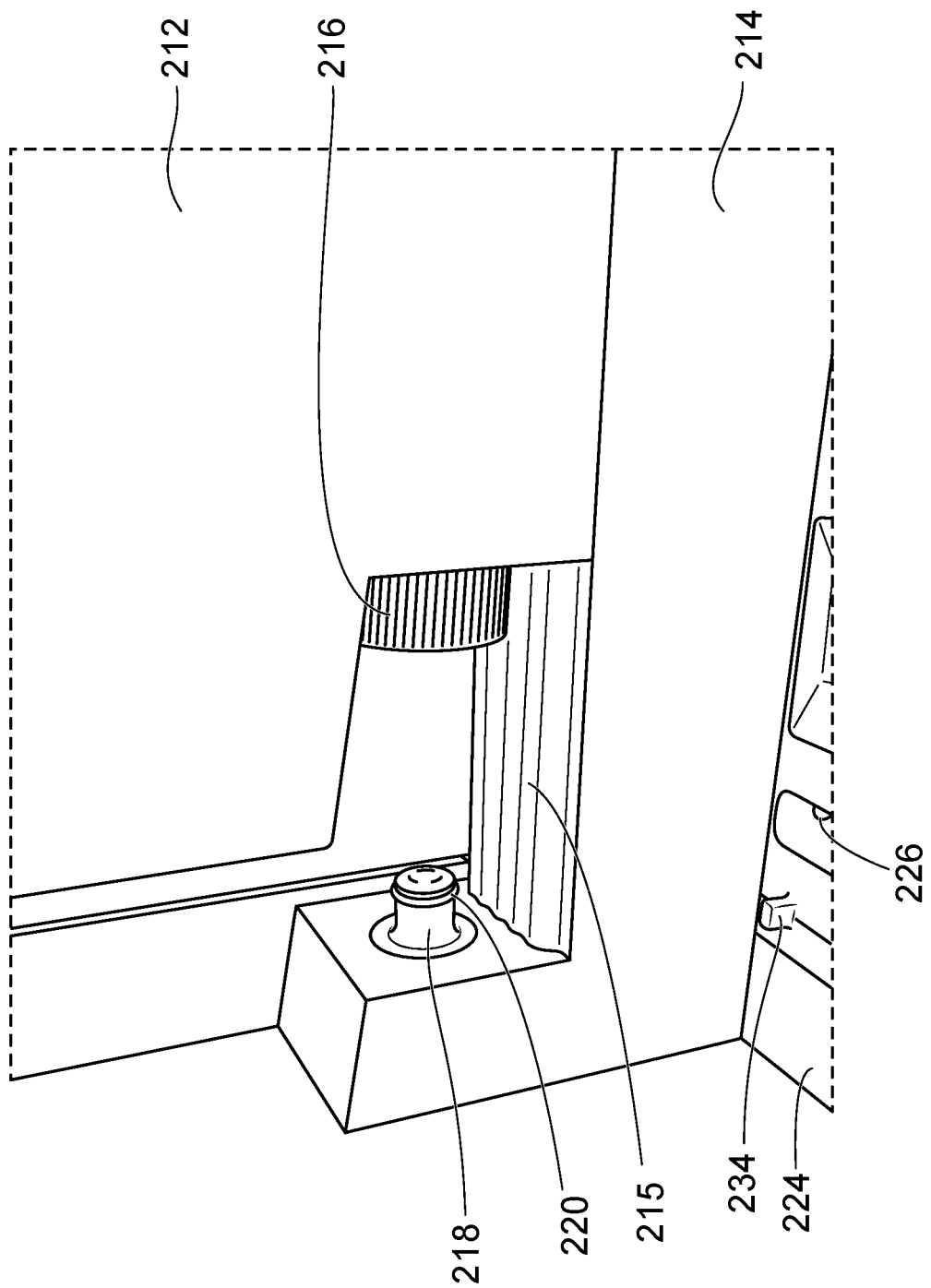
FIG. 20 is a schematic of the water subsystem of FIG. 18.

FIG. 20 is a schematic of the water system 210. FIG. 20 depicts the water reservoir 212 sliding along the guide 215 of the rail 214.

FIG. 21 is a schematic of the water system 210. FIG. 21 depicts the spring valve 216 engaged with the nozzle 218 of the rail 214. Accordingly, the water reservoir 212 is in fluid communication with the channel 228 through the spring valve 216, the nozzle 218, the tube 222, and the port 226.

FIG. 22 is a schematic of the water system 210. FIG. 22 depicts a cutaway view of the rail 214, illustrating one end of the tube 222 connected to the nozzle 218.

FIG. 23 is a schematic of the water system 210. The water reservoir 212 is engaged with the rail 214 and is in fluid communication with the channel 228.

Figure 24:
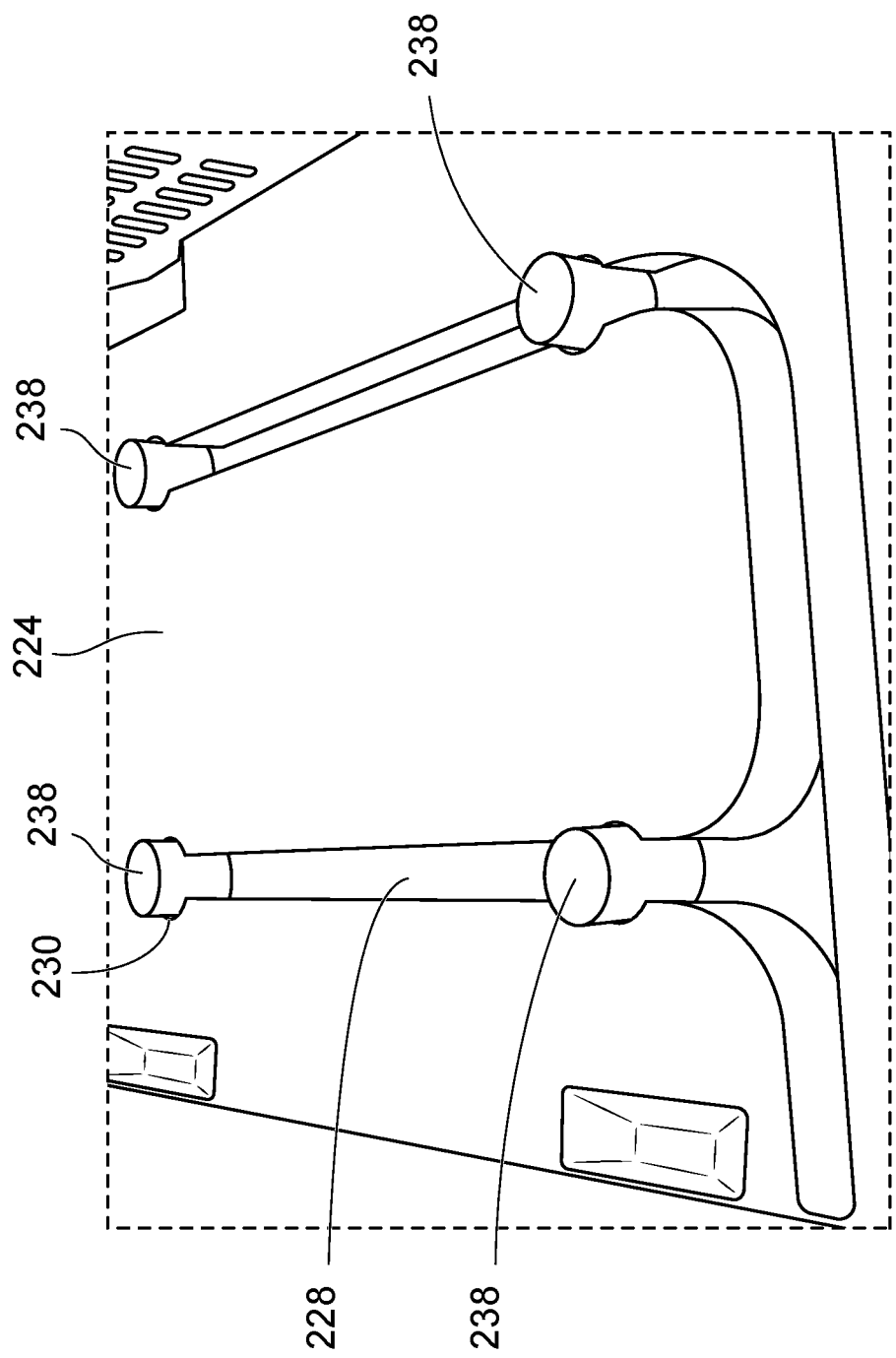
FIG. 24 is a schematic of the water subsystem of FIG. 18 with wicking coils placed in channels of the water distribution tray.

To fluidly communicate the channel 228 with soil in the housing 136, one or more wicking coils 238 may be placed in the channel 228. In some embodiments, the wicking coils 238 may be placed in the rounded cavity 230 along the channel 228, as depicted in FIG. 24. The wicking coil 238 may have a cylindrical shape, but may have other shapes, such as triangular, square, rectangular, polygonal, or an irregular shape. The wicking coil 238 may be made of a material that may draw water from the channel 228 to the top surface of the wicking coil 238 using capillary action. For example, the wicking coil 238 may be made with a capillary blanket, capillary sheet, or felt.

In some embodiments, the wicking coil 238 may be a single body made with the material that may move water using capillary action. In some embodiments, the wicking coil 238 may be a rolled material, as depicted in FIG. 24.

Figure 25:
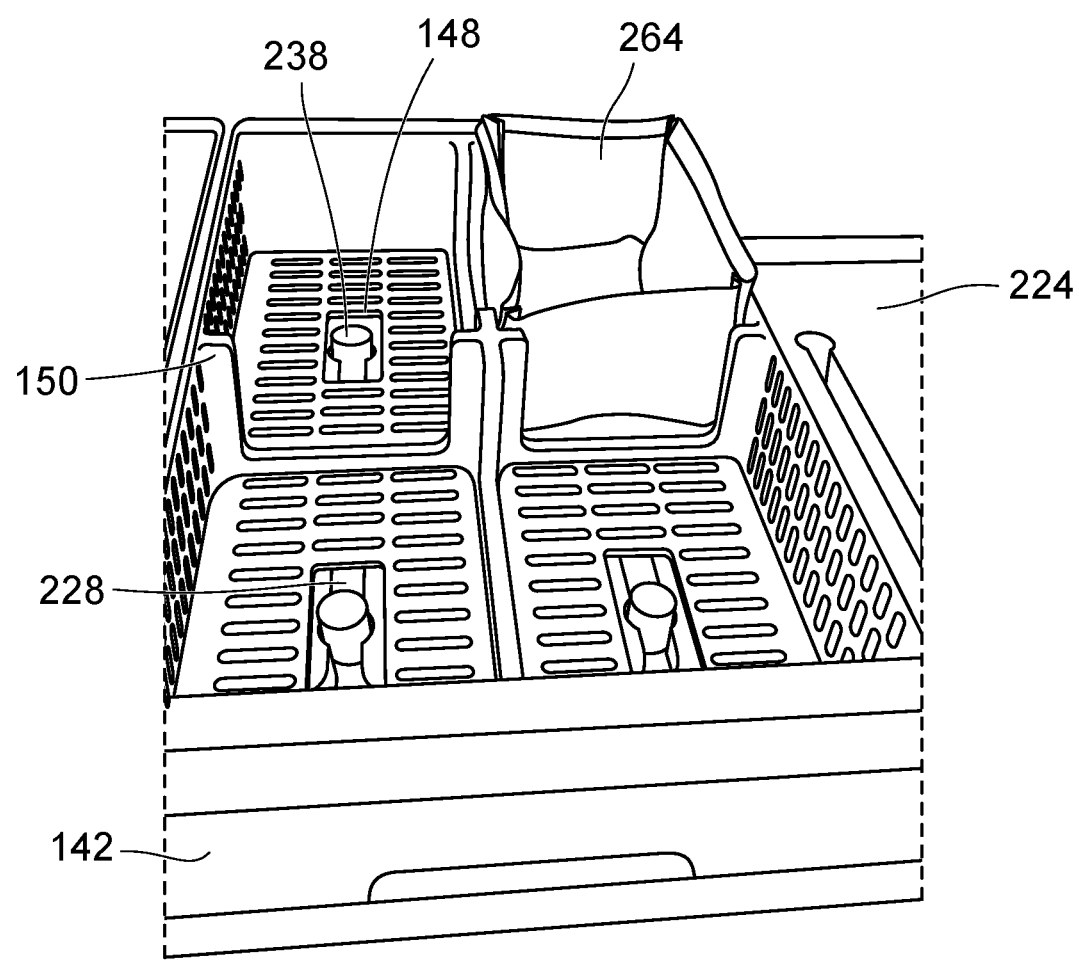
FIG. 25 is a schematic of the water subsystem of FIG. 18 with a tray placed on the water distribution tray having wicking coils in the channels.

FIG. 25 is a schematic of the water system 210 with a tray 142 placed on the water distribution tray 224. As depicted in FIG. 25, the cavity 230 and the wicking coil orifice 148 are aligned such that the wicking coil 238 placed in the channel 228 extends from the channel 228 through the wicking coil orifice 148 and into the interior of the tray 142.

FIG. 25 depicts a soil unit cover 264 of a soil unit 260 received in the tray 142. The soil unit cover 260 may be guided into the tray 142 by the rails 150 of the tray 142. When the soil unit cover 264 is in the tray 142 and the wicking coil 238 is placed in the channel 228, the bottom of the soil unit cover 264 may contact the wicking coil 238, such that the channel 228 is in fluid communication with the bottom of the soil unit cover 264 through the wicking coil 238. The material of the bottom of the soil unit cover 264 may be the same as the material of the wicking coil 238, such that water drawn by the wicking coil 238 from the channel 228 by capillary action may continue to flow to the bottom of the soil unit cover 264. Where the soil unit cover 264 holds soil, the water from the channel 228 may flow through the wicking coil 238, the bottom of the soil unit cover 264, and into the soil.

The wicking coil 238 may fluidly communicate the water in the channel 228 that is recessed in the water distribution tray 224 with soil that is contained in the tray 142 that is inside the housing 136. The water subsystem 210 and the components of the gardening subsystem 210 described herein may allow plants to be grown using soil. By being able to use soil in the gardening system 100 to grow plants, the plants may be healthy and the bioavailability of the essentials of the plants may be increased.

As described herein, by using soil when growing the plants in the gardening system 100, the plants may be more nutritious, and the nutrients of the plant may be more bioavailable to the human cell.

To add water to the water reservoir 212, the water reservoir 212 may be slidably removed from the gardening system 100 and filled. Then water reservoir 212 may be slidably inserted into the gardening system 100 using the guides 215 of the rails 214. As the spring valve 216 is positioned towards the bottom of the water reservoir 212, gravity will tend to draw the water out of the spring valve 216. In some embodiments, upon the engagement of the nozzle 218 of the rail 214 and the spring valve 216 of the water reservoir 212, the water reservoir 212 may be "clicked" in place.

Soil that may be in the tray 142, which may be supported on the water distribution tray 224, may be saturated automatically.

When the spring valve 216 and the nozzle 218 are engaged, the water reservoir 212 may be in fluid communication with the channel 228 of the water distribution tray 224 through the spring valve 216, the nozzle 218, the tube 222, and the port 226. The water may flow from the water reservoir 212 and begin to fill the channel 228.

As the channel 228 begins to fill up, the wicking coils 238 placed in the channel 228, such as at cavities 230, draw the water using capillary action towards the housing 136. The wicking coil 238 may be in contact with the bottom of the soil unit cover 264. The water may flow from the channel 228 through the wicking coil 238 and through the bottom of the soil unit cover 264 into the soil that is contained in the soil unit cover 264.

In some embodiments, the amount of capillary action based on the saturation of the wicking coil 238, the bottom of the soil unit cover 264, the soil, or a combination thereof.

The saturation of the soil may be automatically based on the humidity or saturation level of the soil. For example, the humidity or saturation level of the soil may be 30%.

One of the sensors of the sensor component 192 may capture data corresponding to the humidity of the housing 136 or saturation of the soil. The controller 102 may process that data to determine the humidity of the housing 136 or saturation of the soil. Based on this determination, the controller 102 may send a control command to a humidity controller or humidity source or emitter to change the humidity of the housing 136. Accordingly, the saturation of the soil may be automatically based on the humidity or saturation level of the soil.

When the soil is saturated, water may stop flowing from the water reservoir 212 to the channel 228 of the water distribution system 224.

The water subsystem 210 may comprise a pump for controlling the flow of water from the water reservoir 212 to the water distribution tray 224. In some embodiments, the pump may be positioned along the fluid flow path defined from the water source to the water distribution tray 224. For example, the pump may be positioned in the rail 214 downstream of the nozzle 218 and upstream of the port 226. As another example, the pump may be positioned in the water reservoir 212. As yet another example, the pump may be positioned in the water distribution tray 224.

The sensor component 192 or the imaging component 190 may be configured to capture data corresponding to the saturation of the soil in the gardening system 100. Based on this data, the controller 102 may determine that the plants growing in the soil or plants should be stressed, for example, such that the sensor component 192 or the imaging component 190 may capture data corresponding to the health of the plants when the soil or plants are stressed. The controller 102 may send a control command to the pump to activate the pump and to pump water into the water distribution tray 224 to saturate the soil in the gardening system.

The sensor component 192 of the gardening system 100 may comprise sensors configured to capture data corresponding to the water levels of the water reservoirs 212.

In some embodiments, the water level sensors may be Hall Effect sensors that capture data using magnetic sensing. One or more water level sensors may be used to detect the water level in the water reservoirs 212. A float assembly having a magnet with a magnetic field may be placed in the water reservoir 212 that may be detected by the hall effect sensors, and the hall effect sensors may capture data corresponding to the position of the magnetic field of the magnet, and the controller 102 may process that data to determine the water level in the water reservoirs 212.

Figure 26:
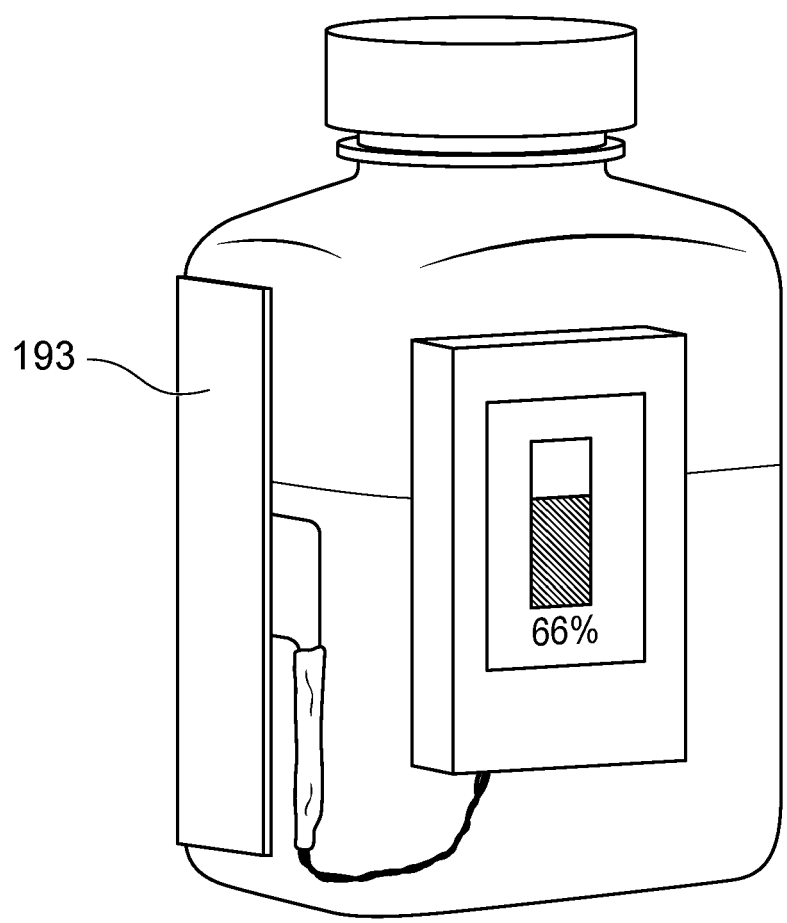
FIG. 26 is a schematic of a water level sensor configured for capacitive touch mounted to a water reservoir.

In some embodiments, the water level sensors may be configured for capacitive touch. FIG. 26 is a schematic of a water level sensor configured for capacitive touch mounted to a water reservoir. The water level sensors may comprise a sensing pad that may be mechanically and electrically coupled with the water reservoir 212. The water level sensors may be in data communication with the controller 102 to transmit captured data from the water level sensors to the controller 102.

In some embodiments, the gardening system 100 may comprise water level sensors may be configured to capture data corresponding to the water levels in the soil of plants growing in the gardening system 100.

In some embodiments, the gardening system 100 may be connected to an external water source using, for example, a water connection. A conduit, hose, fitting or a coupling may be used to connect the gardening system 100 to the external water source. The external water source may be the water source of a residence (e.g. water main), or may be a water tank "back pack" or external water tank. The water tank "back pack" may be used if the gardening system 100 may not be connected to the water main, but the user may be away from the gardening system 100 for an extended period of time, such that the water reservoir 212 may not be refilled by the user (e.g. user on vacation).

The gardening system 100 may comprise a pump for pumping water from the external water source to the water reservoir 212. The pump may be controlled by the controller 102, based on the water level of the water reservoir 212 detected by the controller 102.

When multiple gardening systems 100 are used together (e.g. stacked together), the conduits or hoses that connect the water source to the gardening systems 100 may be daisy chain connected, such that a single external water source (e.g. water main, water tank, large reservoir) may provide water to multiple gardening systems 100.

The gardening system 100 may comprise a control panel 140. The control panel 140 may comprise buttons, switches, screens, touch screens, and the like, for the user to view one or more conditions related to the gardening system 100, or to send a control command to the controller 102 to change a condition of the gardening system 100.

In some embodiments, the control panel 140 may comprise one or more buttons and lights. For example, there may be a button corresponding to turning the gardening system 100 on or off, a button corresponding to turning the lighting system 154 on or off, or a button for turning the Wi-Fi or Bluetooth compatibility on or off. There may be a logo or a light corresponding to whether the water level in the water reservoir 212 is low. The light may be turned on by the controller 102 when the controller 102 determines that the water level in the water reservoir 212 is low. There may be a logo or a light corresponding to whether the gardening system 100 is connected to Wi-Fi or Bluetooth.

In some embodiments, the control panel 140 may comprise a screen. The controller 102 may send a control command for displaying buttons, lights, or menu options on the screen. There may be a knob, switch, or buttons for scrolling through the screen. In some embodiments, the screen may be a touch screen. The user may use the control panel 140 to send a control command to the controller 102 for changing the conditions of the gardening system 100.

Figure 27:
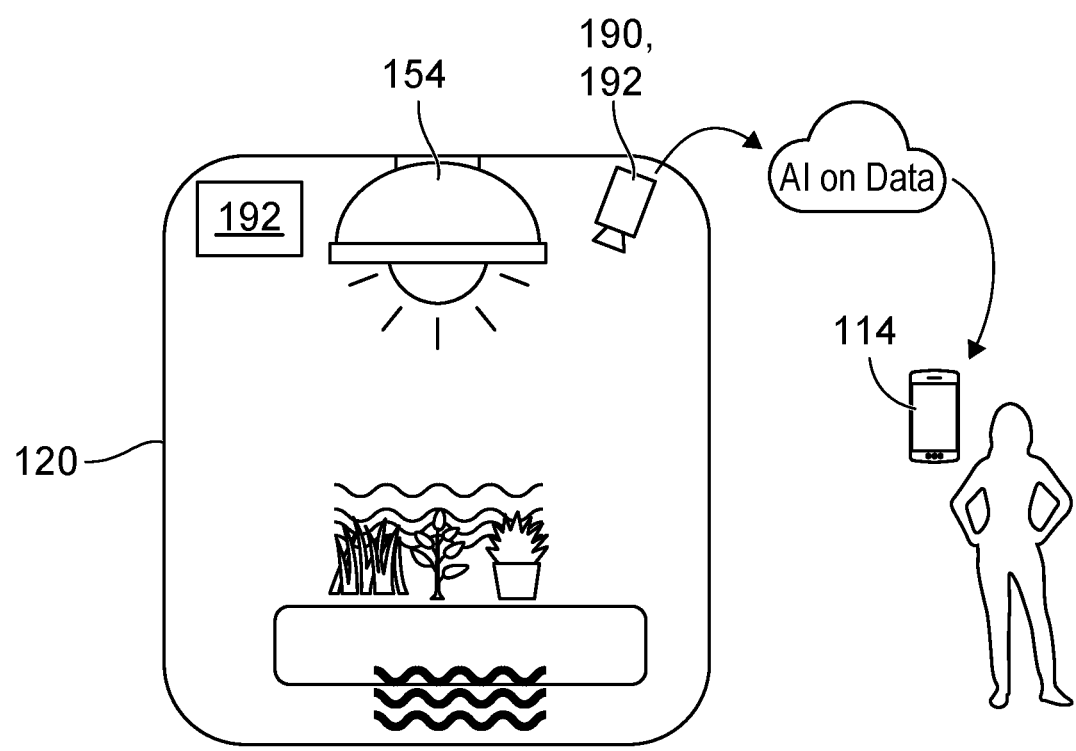
FIG. 27 is a schematic of the gardening system of FIG. 3 in communication with a user device.

FIG. 27 is a schematic of the gardening system 100 in communication with a user device 114. The gardening system 100 may comprise sensor component 192 and imaging component 190 for capturing data of the gardening system 100. In some embodiments, the controller 102 may process the captured data and change a condition of the gardening system. In some embodiments, the captured data from the gardening system 100 may be transmitted to the server 104 for storage, processing, or analysis. In some embodiments, the captured data from the gardening system 100 may be transmitted to the cloud for storage, processing, or analysis.

The data captured by the sensor component 192 and imaging component 190 may vary based on the overall environment that the gardening system 100 is placed in (e.g. the data may vary from residence to residence that the gardening system 100 is placed in). The data captured by the sensor component 192 and imaging component 190 may be processed to continually improve the ability of the system 10 to manage the growth of plants and may improve the health of plants grown in the system 10.

The system 10 (e.g. the server 104) may process the data captured by the sensor component 192 and imaging component 190 to determine optimal plant growing thresholds. The server 104 may compare newly captured data with the optimal growing thresholds, and may send adjustment recommendations to an application (e.g. downloaded on a smartphone or computer) for manual adjustments of a condition of the gardening system 100, or may send a control command to the controller 102 to dynamically or automatically adjust a condition of the gardening system 100.

For example, based on data captured by the sensor component 192 and imaging component 190, the server 104 may determine an optimal amount of oxygen threshold in the gardening system 100 for growing healthy plants. The server 104 may compare newly captured data from the sensor component 192 and imaging component 190 with the optimal amount of oxygen threshold, and may send a control command to the controller 102 for the controller 102 to send a control command to, for example, an oxygen emitter, to change the amount of oxygen in the gardening system 100 to reflect the optimal amount of oxygen threshold.

The data captured by the sensor component 192 and imaging component 190 may be stored in the cloud. The controller 102 or server 104 may process the data to understand that in certain conditions, some plants may grow better, while other plants may not grow better. The controller 102 or server 104 may transmit a control command corresponding to recommendations to adjust variables of the environment, such as temperature, humidity, lighting, or colour.

The gardening system 100 may comprise an imaging component 190 for capturing data corresponding to images of contents in the housing 136 (e.g. soil and plants).

The controller 102 or server 104 may send a control command to the imaging component 190 for capturing image data of contents in the housing 136 (e.g. soil and plants). The controller 102 or server 104 may receive the image data captured by the imaging component 190. The image data may be stored in memory or may be transmitted to the controller 102 or server 104 for storage or processing. In some embodiments, the image data may correspond to photosynthesis activity of the plants, how colour of the plant (e.g. how green it is), chlorophyll levels, the inclusion, availability, or presence of certain minerals, taste, and the like. The image data may correspond to the health of the plant, or the ability of the nutrients of the plant to be processed by a user.

In some embodiments, the controller 102 or server 104 may pre-process the image data to determine if the image data corresponds to obscured objects. If the controller 102 or server 104 determines that the image data corresponds to obscured objects, the controller 102 or server 104 may send a control command to the imaging component 190 to re-capture image data.

The imaging component 190 may comprise one or more sensors or cameras configured to detect one or more conditions in the housing 136. The imaging component 190, as depicted in FIG. 27, may be mounted above the canopy of the plants and may capture image data of the contents in the housing 136. The imaging component 190 may capture image data corresponding to salient information in the gardening system 100, which may include general activity of the growing bed environment, saturation of soil, pictures of plants indicating plant health, photosynthesis activity of the plants, and mineralization of the plant from the leaves. The imaging component 190 may be, for example, cameras, sensors, and may collect image data in the form of video, pictures, histogram data, in various formats. The image data may have particular characteristics tracked in the form of associated metadata, such as shutter speeds, camera positions, imaging spectra, reference illumination characteristics, etc. In some embodiments, the imaging components may provide an initial pre-processing to perform preliminary feature recognition, optical character recognition, etc.

The imaging component 190 may capture image data continuously or periodically. In some embodiments, the imaging component 190 may capture image data in a time lapsed manner that may be sent by the user as one application.

The controller 102 or server 104 may be configured to receive image data from the imaging component 190 and may extract features from the image data. The controller 104 or server 102 may segment or pre-process the image data to remove noise, artifacts, background imagery, or foreground imagery. For example, the controller 102 or server 104 may be configured to visually identify the pixels or regions of interest (e.g., by using a combination of depth data and similarity/size information). The controller 102 or server 104 may draw a "bounding box" over a portion of the image data, indicative of the pixels to be analyzed. The image processing engine 204 may extract features from the bounding boxes and, for example, create a compressed transform representative of a subset of the image information.

The controller 102 or server 104 may be configured to apply recognition techniques to the image data, which may be compressed data or a subset of the captured image data, to determine the health of the soil or plants growing in the gardening system 100. The controller 102 or server 104 may use a classifier to determine how well the image data corresponds to various reference templates (e.g. general activity on the growing bed environment, saturation of soil, plant pictures indicating plant health, photosynthesis activity, mineralization of plant, etc.). In some embodiments, the classifier provides an estimated value and a confidence score (e.g., a margin of error). Where the image data may not be processed to make a determination of the condition of the soil or plant with a sufficiently high confidence score, a notification may be provided to either request re-imaging with varied characteristics, or to generate an error value. For example, features of the soil or plant may be poorly captured due to changes in ambient lighting or environmental shadows, and the notification from the controller 102 or server 104 to the lighting subsystem 154 may control the intensity of the light or wavelength of the light emitted by the lighting subsystem 154 to obtain a more useful set of image data.

The controller 102 or server 104 may include tracked linkages and associations for processing image data captured by the imaging component 190 to determine a relationship between a particular reference feature set (e.g. the reference feature set may correspond to optimal plant growing thresholds). The controller 102 or server 104 may include weighted rules whose weights may dynamically vary based on updated feature sets or accuracy feedback information, among others.

The controller 102 or server 104 may process the captured image data by the imaging component 190 and may maintain an inventory of image data, which may be stored in memory on the gardening system 100 or data store 112. The controller 102 or server 104 may be configured to provide real time or near real time feedback, and may perform various analyses. The controller 102 or server 104 may identify patterns based on combining image data with other data captured by the gardening system 100, such as by sensor component 192, which may include lighting, sound, oxygen levels, carbon dioxide levels, water levels, soil saturation, root vibration, or pressure.

In some embodiments, the controller 102, the server 104, or a combination thereof may perform the processing of the image data captured by the imaging component 190. Where the server 104 processes image data, the controller 102 may transmit the image data to the server 104 over the network 106.

In some embodiments, the imaging component 190 may comprise a red green blue (RGB) camera, a visible light camera, an infrared camera, an ultraviolet camera, another camera that may detect another light wavelength, or a combination thereof. The imaging component 190 may comprise one or more emitters that emit a particular light have a wavelength that may be detectable by the camera of the imaging component 190. For example, the imaging component 190 may comprise an infrared emitter that may reflect from the plants or soil growing in the gardening system 100.

The imaging component 190 may capture aspects of the environment through various images, which may include image data corresponding to photos of the plants, such as a normal colour photo or an infrared photo of the plant.

In some embodiments, the imaging component 190 may capture image data corresponding to an infrared image of the plant growing in the gardening system 100. The controller 102 or server 104 may process this image data to determine the activity of photosynthesis occurring in the plant.

Based on the data captured by the imaging component 190, the controller 102 or server 104 may determine when to send a message to a user device 114 to recommend that the plant be harvested. The recommendation may be a window of time for harvesting the plant, which may include herbs, leafy greens, roots, and microgreens, and may include flowering plants.

The gardening system 100 may comprise a sensor configured to capture data corresponding to ambient light arriving from outside the gardening system 100. The controller 102 or server 104 may determine in real time or near real time if the light is usable sunlight by the plants for growing in the gardening system 100. If it is determined that the spectrum of light is usable sunlight, the controller 102 or server 104 may send a control command to the light controller 204 to adjust the emissions from the light source 158 to include the external usable light spectrum to save on costs associated with running the gardening system 100, such as costs associated with generating light with the lighting subsystem 154. This feature may be user-determined where the user may place the gardening system 100 in an "economy" setting.

The gardening system 100 may comprise a sound wave emitter (e.g. a speaker) configured to emit sound waves having a frequency that may mimic the sound of nature, which may be called a "sonic bloom". The sound frequency, sound pressure level, exposure periods, and distance from the source of the sound wave emitted by the sound wave emitter may be compared with data captured by the imaging component 190 and sensor component 192, and a sound frequency that enhances the health of the plant may be determined. The sound frequency may be developed and may be enhanced as any sound that may be pleasant sounding, and may be played and be available in the gardening system 100 to enhance the health of the plant.

Sound waves technology has been applied to different plants. It has been found that sound waves at different frequencies, sound pressure levels (SPLs), exposure periods, and distances from the source of sound may influence plant growth. Experiments have been conducted in the open field and under greenhouse growing conditions with different levels of audible sound frequencies and sound pressure levels. For example, sound waves at 1 kHz and 100 dB for 1 hour within a distance of 0.20 m may promote the division and cell wall fluidity of callus cells and may enhance the activity of protective enzymes and endogenous hormones. Sound waves stimulation may increase the plant plasmamembrane H+-ATPase activity, the contents of soluble sugar, soluble protein, and amylase activity of callus. Moreover, sound waves may increase the content of RNA and the level of transcription. Stress-induced genes may switch on under sound stimulation. For example, sound waves at 0.1-1 kHz and SPL of (70±5) dB for 3 hour from plant acoustic frequency technology (PAFT) generator within a distance ranged from 30 to 60 m every other day may increase the yield of sweet pepper, cucumber and tomato by 30.05%, 37.1% and 13.2%, respectively. As another example, the yield of lettuce, spinach, cotton, rice, and wheat may be increased by 19.6%, 22.7%, 11.4%, 5.7%, and 17.0%, respectively. Sound waves may also strengthen plant immune systems. In some embodiments, spider mite, aphids, gray mold, late blight and virus disease of tomatoes in the greenhouses may be decreased by 6.0%, 8.0%, 9.0%, 11.0%, and 8.0%, respectively, and the sheath blight of rice may be reduced by 50%. Sound waves applied to plants may have an effect on various growth parameters of plants at different growth stages.

In some embodiments, the frequency of the sound may emulate that of a sonic bloom or a frequency within a certain range to make plants grow healthier and grow faster.

In some embodiments, the sound may emulate the play of a violin.

Accordingly, the controller 102 or server 104 may send a control command to a speaker to play one or more sounds that correspond to promotion of growth of healthy plants.

In some embodiments, there may be a sound cancelling system for cancelling the sound played, such that the plants may receive the sound waves, but the sound may not be heard by users of the gardening system 100.

The sensor component 192 may comprise a sensor (e.g. a microphone sensor) configured to capture data corresponding to the sound of the environment of the gardening system 100 and the vibration of roots. The data may be processed and compared with data corresponding to the health of the plants growing in the gardening system 100 to determine sounds of the gardening system 100 that correspond to healthy plants. Accordingly, the controller 102 or server 104 may send a control command to a speaker to play sounds that correspond to healthy plants.

The sensor component 192 may comprise a sensor (e.g. root sensor) configured to capture data corresponding to the vibration frequency of roots of plants growing in the gardening system 100. The sensor may be inserted in the soil from which the plants are growing. The data may be processed and compared with data corresponding to the health of the plants growing in the gardening system 100 to determine vibrations of roots of plants that correspond to healthy plants.

Based on the data captured by the root sensor, the controller 102 or server 104 may send a control command to a speaker to emit a vibration frequency into the environment of the gardening system 100.

The sensor component 192 may comprise one or more sensors for detecting the atmosphere of the gardening system 100, such as the atmosphere of the housing 136. In some embodiments, the one or more sensors may be oxygen sensors or carbon dioxide sensors configured to detect the amount of oxygen (e.g. in parts per million) and carbon dioxide (e.g. in parts per million) in the gardening system 100. In some embodiments, the one or more sensors may be pressure sensors configured to detect the barometric pressure of the atmosphere in the housing 136.

The data from the oxygen sensor, and carbon dioxide sensor, and pressure sensor may be processed by the controller 102 or server 104, and may be compared with ideal oxygen levels, carbon dioxide levels, or barometric pressure levels as determined by a self-learning algorithm or machine-learning algorithm (e.g. by the server 104). Based on this comparison, the controller 102 or server 104 may send a control command to an oxygen emitter, carbon dioxide emitter, or a pressurization component of the gardening system 100 to change the levels of oxygen, levels of carbon dioxide, or the barometric pressure in the gardening system 100.

The composition of the atmosphere (e.g. the amount of carbon dioxide, oxygen, or other components of the atmosphere) of the environment in which a plant grows may affect the rate at which the plant grows, which may affect the amount of nutrients absorbed by the plant from soil in which the plant is growing. For example, with more carbon dioxide in the environment, the plant may grow more quickly, which may reduce the amount of time that the plant has for absorbing nutrients from the soil. For example, with carbon dioxide at 250 parts per million, the plant may grow at a first rate. With carbon dioxide at 480 parts per million, the plants may grow at a second rate faster than the first rate. Accordingly, plants grown in relatively high carbon dioxide environments may have fewer nutrients.

When the plant is grown using the gardening system 100, the sensor component 192 may capture data corresponding to the composition of the atmosphere (e.g. the amount of carbon dioxide, oxygen, or other components of the atmosphere) in the housing 136. Based on optimal plant growing thresholds corresponding to the atmosphere conditions in the housing 136, the controller 102 or server 104 may send a control command to, for example, a carbon dioxide emitter to emit additional carbon dioxide, an oxygen emitter to emit additional oxygen, or may send a control command to a fan to circulate air into the housing 136, to change the atmosphere composition in the housing 136.

In some embodiments, the optimal plant growing thresholds corresponding to the atmosphere conditions in the housing 136 may be based on the average atmospheric conditions that has been historically present, or what the atmospheric composition may be on average on a given day.

The gardening system 100, by controlling the atmospheric conditions, such as the amount of carbon dioxide or oxygen, may control the rate of growth of the plants and the amount of nutrients of the plants.

The sensor component 192 may comprise a temperature sensor and a humidity sensor configured to capture data corresponding to the temperature and humidity of the environment of the gardening system 100. The data may be processed and compared with data corresponding to the health of the plants growing in the gardening system 100 to determine the temperature and humidity of the gardening system 100 that correspond to healthy plants.

The controller 102 or server 104 may send a control command to a temperature or humidity controller (e.g. a fan, a heater) to change the temperature and humidity of the gardening system 100 to reflect the temperature and humidity of the gardening system 100 that correspond to healthy plants.

The sensor component 192 may comprise a salinity sensor configured to capture data corresponding to the pH of the soil in the gardening system 100. The data may be processed and compared with data corresponding to the health of the plants growing in the gardening system 100 to determine the salinity of soil in the gardening system 100 that correspond to healthy plants.

The controller 102 or server 104 may send a control command to a salinity system to change the salinity of the soil in the gardening system 100 to reflect the salinity of soil of the gardening system 100 that correspond to healthy plants.

The sensor component 192 may comprise a biophoton sensor configured to capture data corresponding to the biophotons emitted by plants growing in the gardening system 100. The data may be processed to determine the biophoton emission of plants in the gardening system 100 that correspond to healthy plants.

In some embodiments, varying levels of biphotonic activity may determine the health of the plant.

Figure 28:
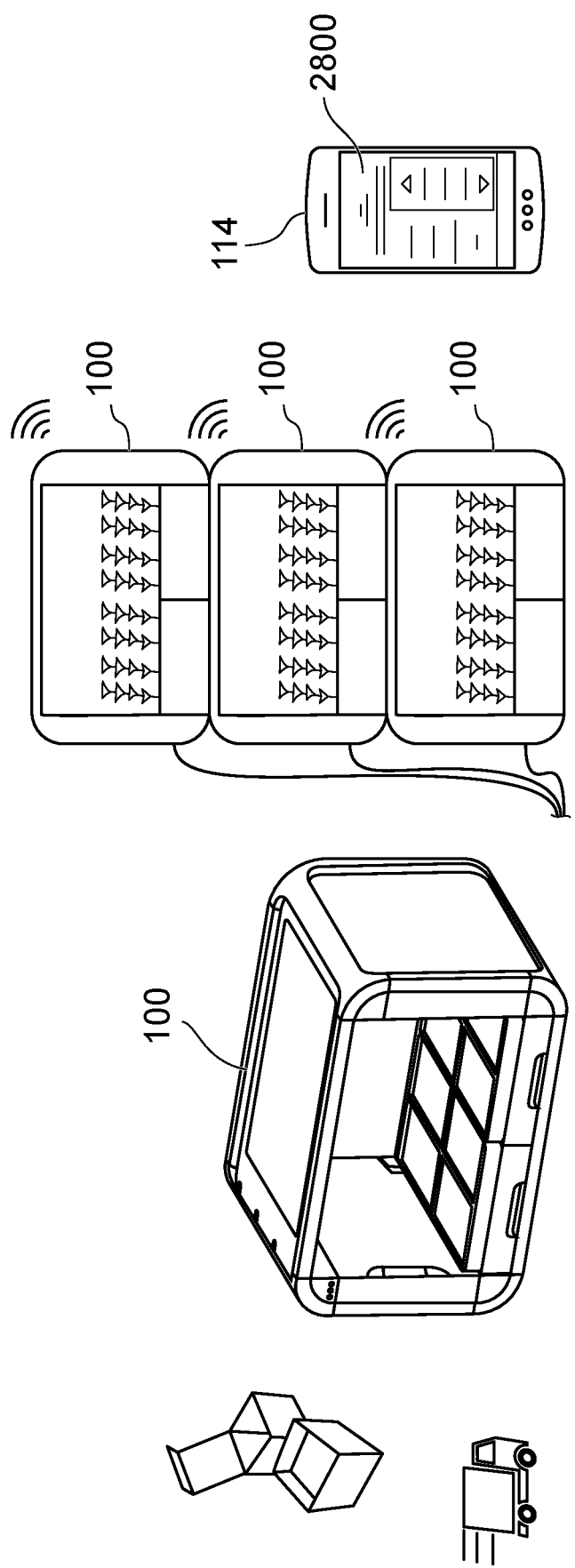
FIG. 28 is a schematic of the gardening system of FIG. 3 in communication with a user device.

The controller 102 or server 104 may comprise a wireless transceiver that may communicate with a user device 114 (e.g. smartphone or computer), for example, using standard Wi-Fi or Bluetooth, as depicted in FIG. 28, or another protocol, based on the wireless communication capabilities of the user device 114. A user may be able to view the conditions of the gardening system 100 or monitor the growth of the plants growing in the gardening system 100. The data captured by the gardening system 100 or data processed by the gardening system 100 may be displayed on the user device 114. The user device 114 may receive a control command from the controller 102 or server 104, such that the display of the user device 114 may be updated in real time or near real time to provide a graphical effect displayed on the user device 114 representative of the conditions of the gardening system 100 or the growth of the plants growing in the gardening system 100.

In some embodiments, the user device 114 in communication with the controller 102 or server 104 may be configured to be a device that compliments the controller 102 or server 104. For example, based on the plants being grown in the gardening system 100, the user device 114 may be configured to display graphic effects corresponding to the conditions of the gardening system 100, the progress of the growth of the plants, and a date or time that would prompt an action by the user (e.g. to refill the water reservoirs 212).

A user may download an application for displaying data captured by the gardening system 100 or data processed by the controller 102 or server 104 on a user device 114, such as a smartphone or computer. FIG. 28 is a schematic of an example graphical rendering of a user device interface 2800 rendered on the user device 114. In FIG. 28, the user device interface 2800 is rendered on the display of a smartphone. In some embodiments, the user device interface 2800 may be rendered on the display of another user device 114. The user device interface 2800 may be provided by the front end interface 110 residing on different types of devices. For example, the front end interface 110 may reside in a smartphone of a user. The front end interface 110 may generate, assemble and transmit interface screens for an application for a phone, such as user device interface 2800. In some embodiments, a user may download an application on their user device 114, and input log-in information, such as a user identification number and password. In some embodiments, the user may input information relating to the gardening system 100, such as a serial number or another identification number of the gardening system 100, for logging into the application. The controller 102 or server 104 may determine that the log-in information is correct, and the front end interface 110 may provide the user device interface 2800 on the user device 114. As depicted in FIG. 28, the front end interface 110 may provide the interface 2800 comprising one or more interface buttons. The user may press the interface buttons for the front end interface 110 to render data processed by the controller 102 or server 104 on the user device 114. For example, the user may press an interface button to review alerts sent by the controller 102 or server 104 related to growing or monitoring the plants, the conditions of the gardening system 100 (e.g. the humidity and temperature of the housing 136, the salinity of the soil, or lighting conditions), the instructions for growing plants, data corresponding to monitoring the growth of the plants, the nutrients contained in the plants, and the savings for using the gardening system 100 compared to buying the same plants at a local grocery store.

In some embodiments, after the user has logged in with their log-in information to the application, as the user uses the gardening system 100, the controller 102 or server 104 may tag the captured data to associate the captured data with the user.

In some embodiments, the downloaded application may have available various timer intervals. The various timer intervals may be used for receiving alerts from the controller 102 or server 104.

In some embodiments, there may be two ways to determine the type of plants being grown in the gardening system 100. First, at the time of seeding, the types of plants being grown may be manually input into the controller 102, the server 104, or the user device 114. For example, the user device 114 may display a graphical effect corresponding to one or more types of plants that may be grown using the gardening system 100, and the user may scroll through the graphical effects and select the plant or plants being grown using the gardening system 100. Second, at the time of seeding, the imaging component 190 may capture data corresponding to an image of the plant as it starts to grow (e.g. the colour, the size and shape of leaves, etc.), and the controller 102 or server 104 may process that data to determine the plant being grown. The controller 102 or server 104 may determine the optimal growth environment variables based on the type of plant that the controller 102 or server 104 has determined to be growing in the gardening system 100.

The system 10 may continually monitor the environment, such as that of the housing 136 of the gardening system 100, and may analyze the captured data to determine the optimal plant growing thresholds. The system 10 may continually capture data to build intelligence. The system 10 may determine that a plant is growing suboptimally, for example, by comparing the optimal plant growing thresholds (e.g. amount of light, amount of oxygen or carbon dioxide in the environment, soil saturation, colour of plants, amount of photosynthesis activity, size of plant, mineralization of plant, etc.) with newly captured data, which may be captured in real time or near real time data, or may be captured and stored for processing at a later time. In the event that a plant is growing suboptimally, such as low mineralization, suboptimal photosynthesis, etc. the system 10 may send an alert to a user device 114 with optimization recommendations. In some embodiments, the system 10 may automatically change the environment based In some embodiments, the server 104 may process the data captured at the gardening system 100 and may build intelligence on optimal plant growing thresholds. The server 104 may use one machine learning module or may combine multiple learning modules to automate and enable self-learning capabilities to improve the determination of optimal plant growing thresholds using historical captured data and real time or near real time data. The optimal plant growing thresholds may be long term thresholds or short term thresholds.

When the captured data is received by the server 104, the server 104 may prioritize the captured data for determining the optimal plant growing thresholds, which may be used to increase the efficiency and accuracy of the machine learning by the server 104.

Example machine learning techniques and systems that may be used by the server 104 for determining the optimal plant growing thresholds may include optimization techniques, logic techniques for learning and planning, probabilistic methods, classifiers and statistical learning methods, neural networks, regression analysis, support vector machines, and the like.

In some embodiments, the server 104 may apply machine learning techniques to raw captured data, data already processed with machine learning techniques, or subsets or these data sets. The server 104 may compute one or more variables of the optimal plant growing thresholds without the need for a baseline average across conditions. The server 104 may detect variables that affect all variables of the optimal plant growing thresholds. The server 104 may compare captured data of a certain type to historical reference data of a similar type, which may enable the server 104 to make different predictions for the same type of data. The server 104 may determine a different between a predicted optimal plant growing threshold, reference data, or captured data, which may be used to rank a known or unknown variable. The server 104 may compute a difference between variables, which may allow the server 104 to classify variables based on how similar they are to know variables. The server 104 may determine one or more changes to the environment of the gardening system 100 by comparing one or more reference optimal plant growing thresholds with captured data.

In some embodiments, the server 104 may be a cloud computing system, and the data captured at the gardening system 100 may be transmitted to the cloud computing system for the server 104 to determine the optimal plant growing thresholds.

The gardening system 100 may be modular, such that it may be placed, positioned, or configured in several ways. A gardening system 100 of a first size may be stacked on top of a gardening system 100 of a second size, where the first size and the second size may be the same or different. The gardening system 100 may be modified by a user by placing the gardening system 100 into a frame by a user to stack more gardening systems 100 on top of another.

In some embodiments, a first gardening system 100 may be stacked on top of a second gardening system 100, such that the footprint of the gardening system 100 may be efficiently used. This may allow a user to increase the number of plants that may be grown.

In some embodiments, one or more of the components of the gardening system 100 (e.g. the frame 120, vertical element 122, horizontal element 124, corner element 126, corner cap 128, side panel 130, top panel 132, lighting panel 134, lighting subsystem 154, water subsystem 210, etc.) may be in segments, such that one or more segments of the gardening system 100 may be removed (this may be called an "extension system"), and the extension system may be stacked on top of another gardening system 100. This may allow taller plants to be grown using the gardening system 100.

Multiple gardening systems 100 may be placed in the same space (e.g. same residence) or different spaces (e.g. different residence, different city, different country, etc.), and each of the gardening systems 100 may be in communication with the user device 114 (e.g. through a downloaded application) for user management.

The modularity of the gardening system 100 may allow for plants of various heights to be grown. The modularity of the gardening system 100 may allow for the addition of other components, such as panels or doors, to change the configuration of the gardening system 100.

Figure 29:
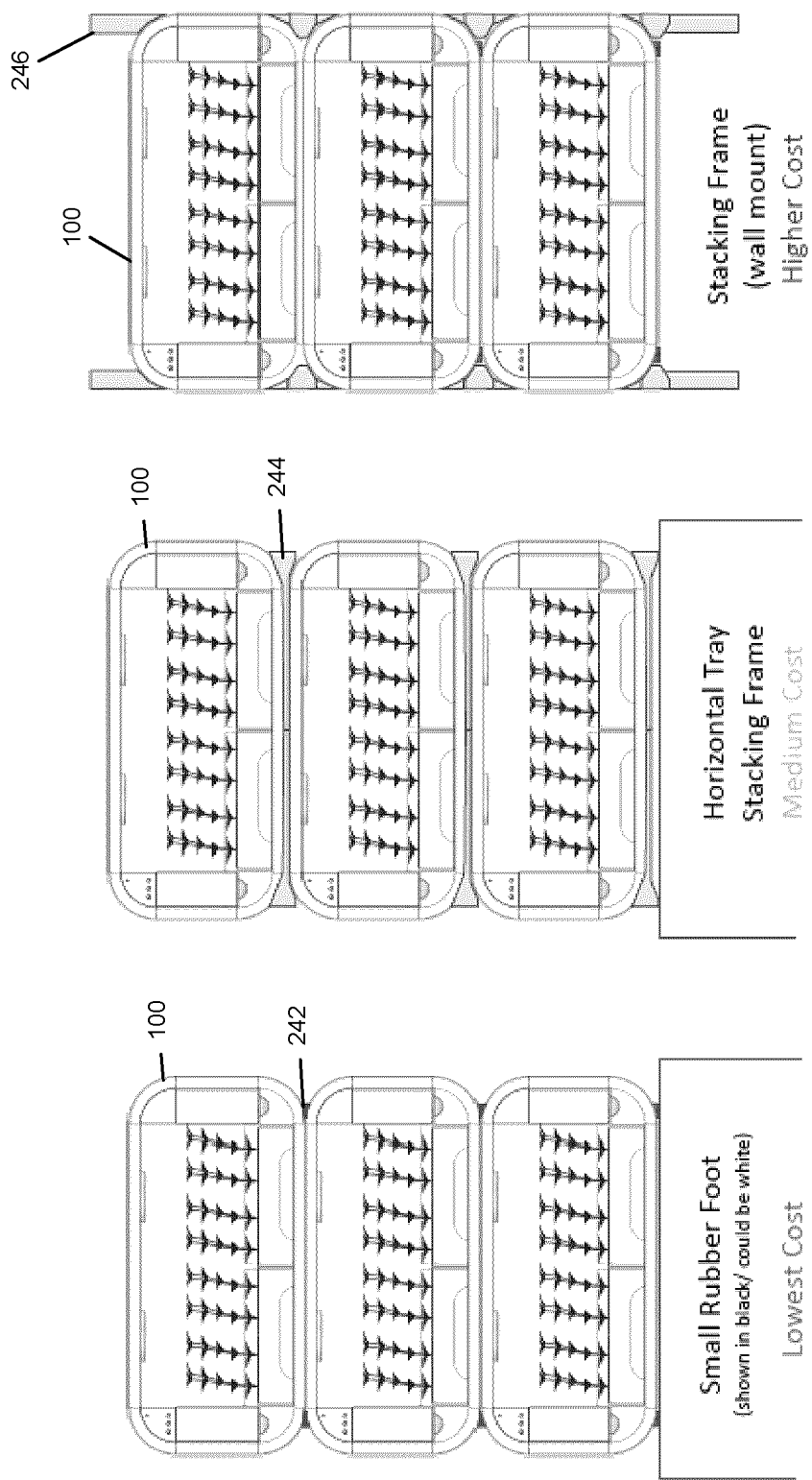
FIG. 29 is a schematic of stacked gardening systems.

FIG. 29 depicts three options for stacking gardening systems 100.

The gardening systems 100 may be stacked on top of each other using one or more small rubber feet 242. Each gardening system 100 may have rubber feet 242. The rubber feet 242 may be coloured, such as black or white. The small rubber feet 242 of a first gardening system 100 may rest on the top of a gardening system 100 placed below the first gardening system 100.

The gardening system 100 may be stacked on top of another using a horizontal tray stacking frame 244. As depicted in FIG. 29, the frame 244 may be interposed between gardening systems 100. In some embodiments, the frame 244 may be separate from the gardening system 100 or may be integrally formed with the gardening system 100.

The gardening system 100 may be stacked on top of another using a wall mount stacking frame 246. The wall mount stacking frame 246 may be mounted to a wall, and then the gardening systems 100 may be mounted to the wall mount stacking frame 246.

Figure 30:
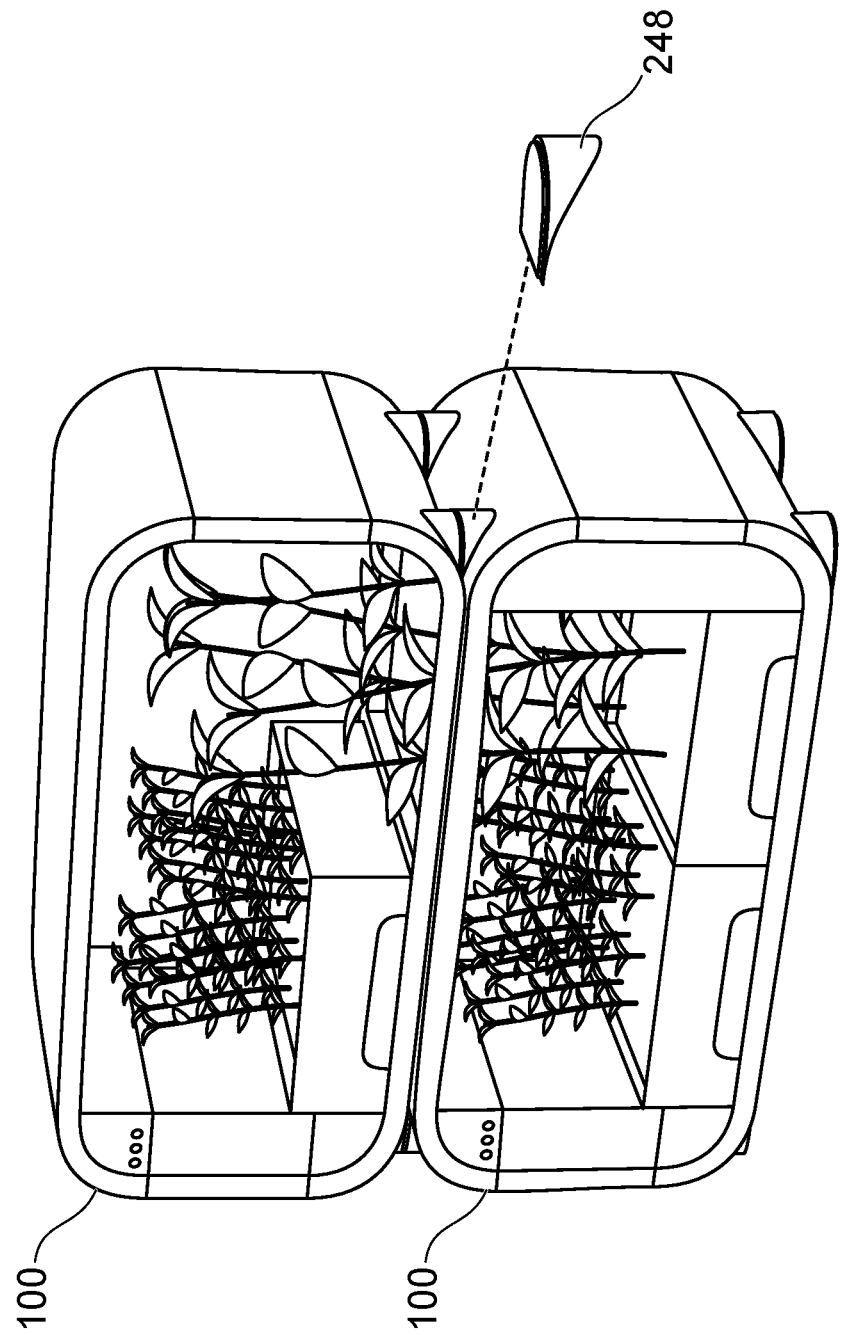
FIG. 30 is a schematic of stacked gardening systems with separately formed feet.

FIG. 30 is a schematic of stacked gardening systems 100 with separately formed feet 248. The gardening system 100 may comprise feet 248. As depicted in FIG. 30, the feet 248 may be parts that may be separate from the gardening system 100. This may allow for more configurations of the shape of the feet 248 and material used for making the feet 248. The feet 248 may be manufactured using moulding, such as blow moulding or injection moulding. The feet 248 may be moulded in different colours. By having the feet 248 separate from the gardening system 100, the corners of the gardening system 100 may have a relatively clean appearance.

Figure 31:
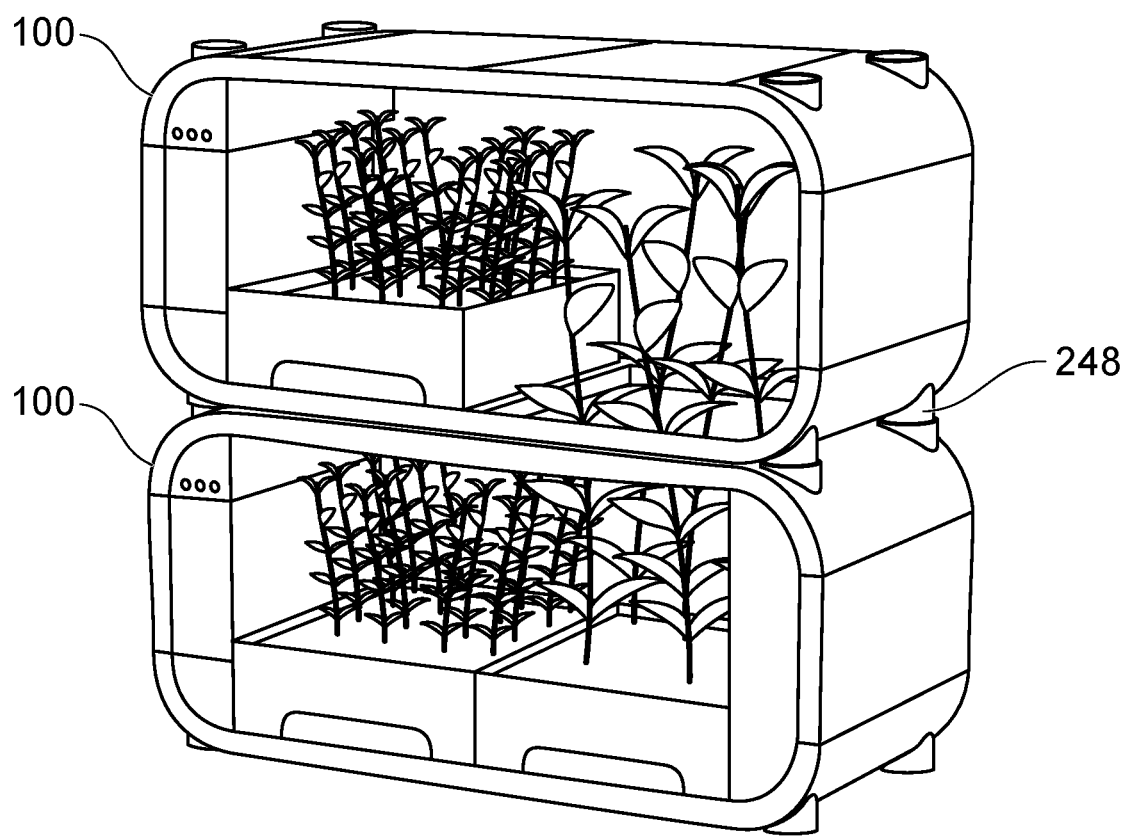
FIG. 31 is a schematic of stacked gardening systems with integrally formed feet.

FIG. 31 is a schematic of stacked gardening systems 100 with integrally formed feet 248. In some embodiments, the feet 248 may be integrally formed on a corner element of the frame 120 of the gardening system 100. As depicted in FIG. 31, the bottom feet 248 of a top gardening system 100 rests on the top feet 248 of a bottom gardening system 100. The details of the foot 248 may be repeated on each gardening system 100. The details of the foot 248 may come for free. The feet 248 may be integrally formed on the top and bottom sides of the gardening system 248, so feet 248 may be seen on the top surface of the top gardening system 100. With the feet 248 integrally formed with the gardening system 100, the feet may be installed correctly on the gardening system 100.

Figure 32:
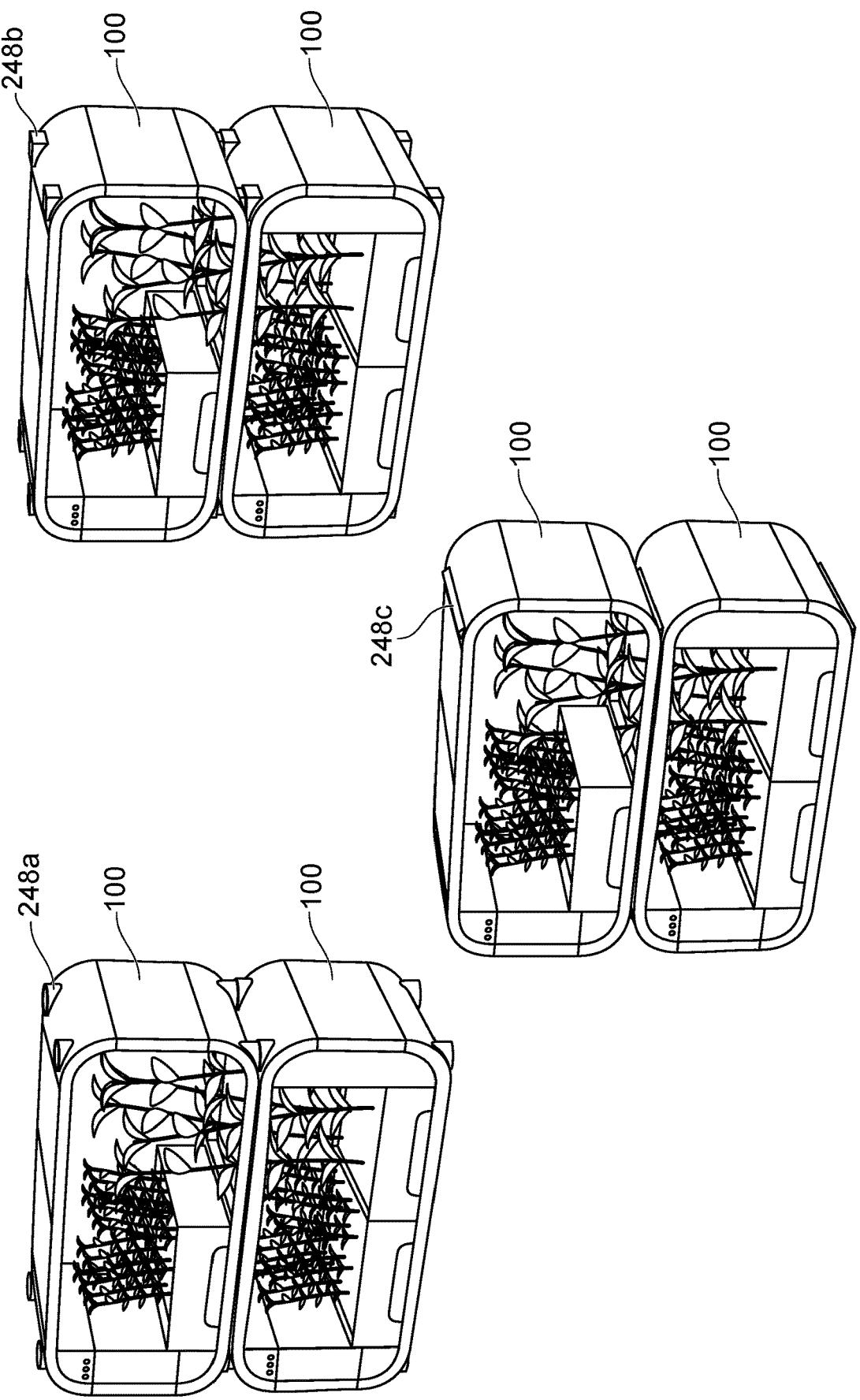
FIG. 32 is a schematic of stacked gardening systems with variations of integrally formed feet.

FIG. 32 is a schematic of stacked gardening systems 100 with variations of integrally formed feet 248. The feet 248a may have a round shape, such as a circular shape or an oval shape. The feet 248b may have a rectangular shape or a square shape. The feet 248c may have a shape that extends along a width of the gardening system 100.

Figure 33:
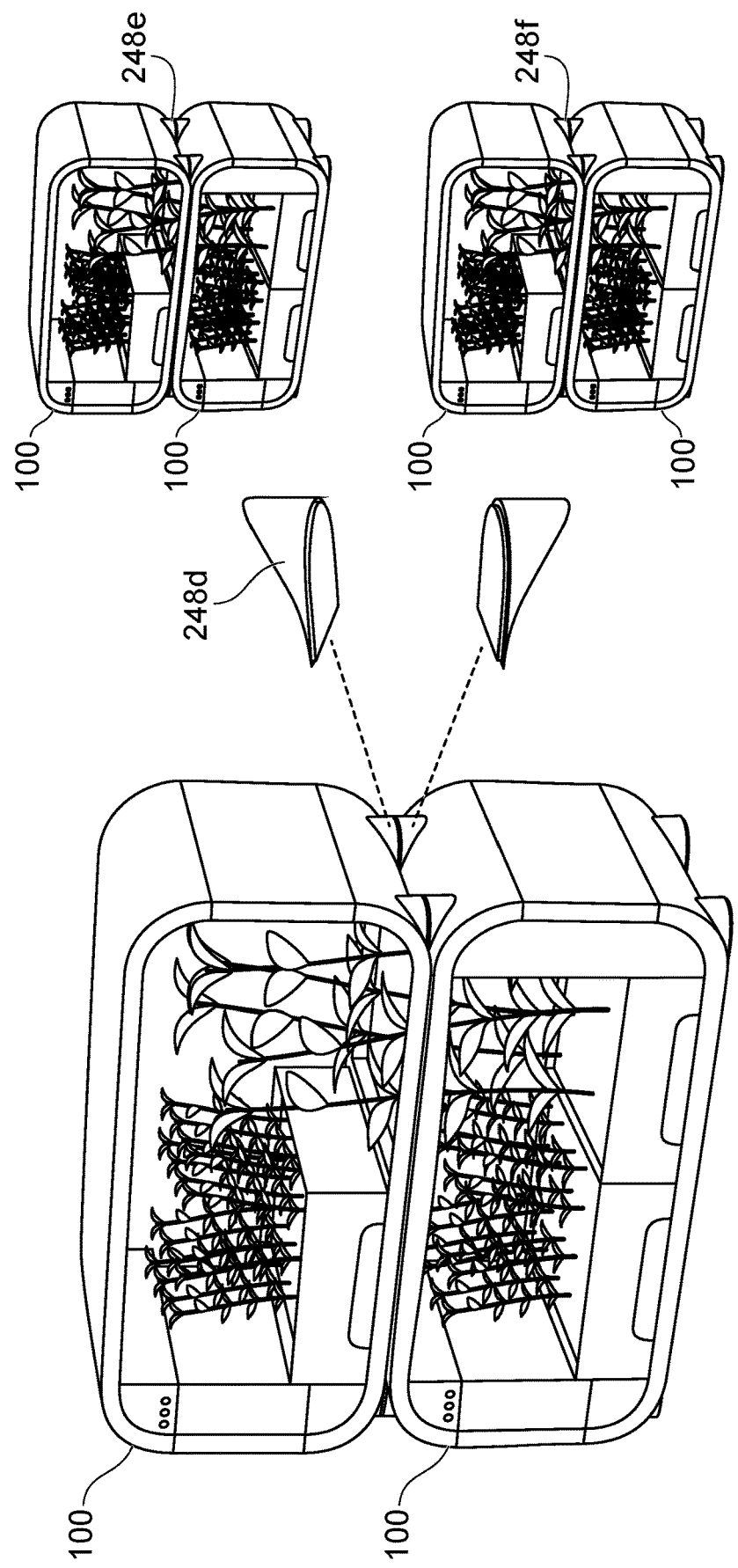
FIG. 33 is a schematic of stacked gardening systems with variations of separately formed feet.

FIG. 33 is a schematic of stacked gardening systems 100 with variations of separately formed feet 248. The feet 248d may have flat faces that oppose each other when a top gardening system 100 is stacked on top of a bottom gardening system. The feet 248e may be made in a particular colour, such as green. The feet 248f may be made in a particular colour, such as grey.

Figure 34:
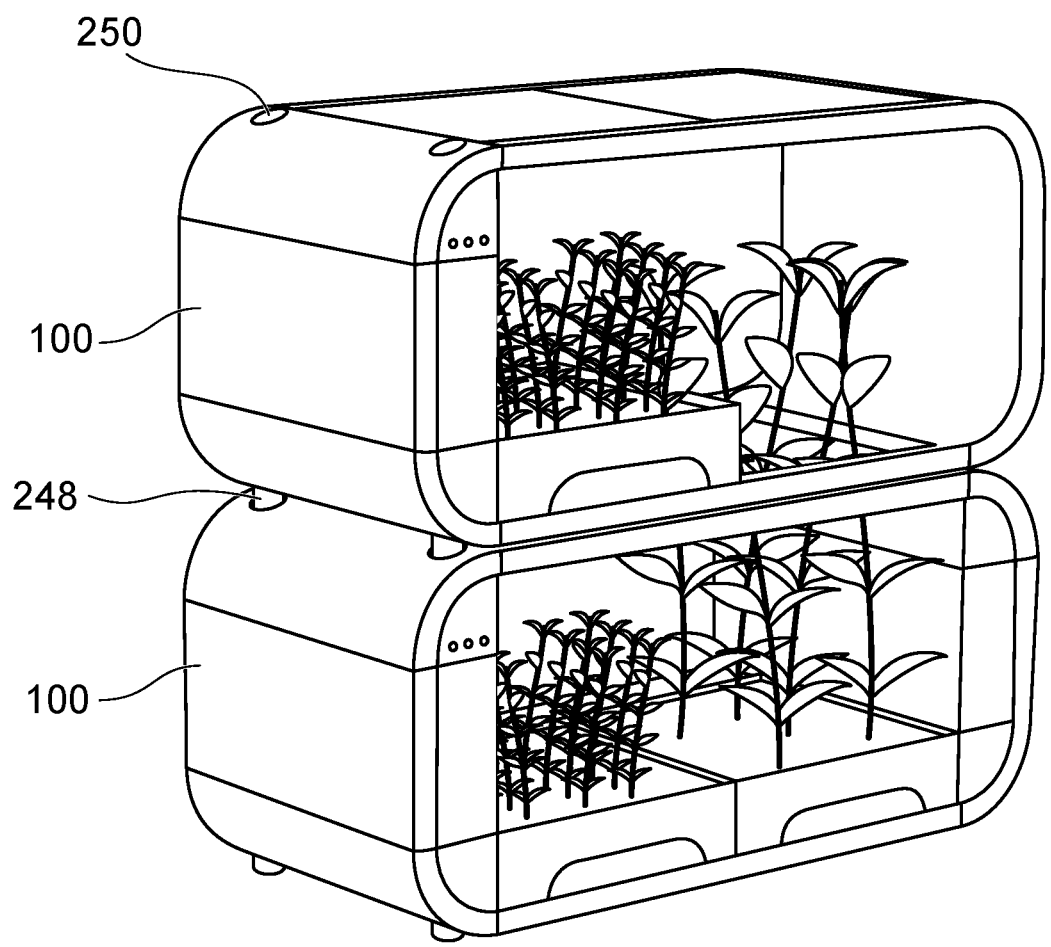
FIG. 34 is a schematic of stacked gardening systems with rubber feet.

FIG. 34 is a schematic of stacked gardening systems 100 with rubber feet 248. The gardening system 100 may have rubber feet 248 extending from the bottom surface of the gardening system 100. The gardening system 100 may have recesses 250 for receiving corresponding rubber feet 248 of a gardening system 100 stacked above it.

Figure 35:
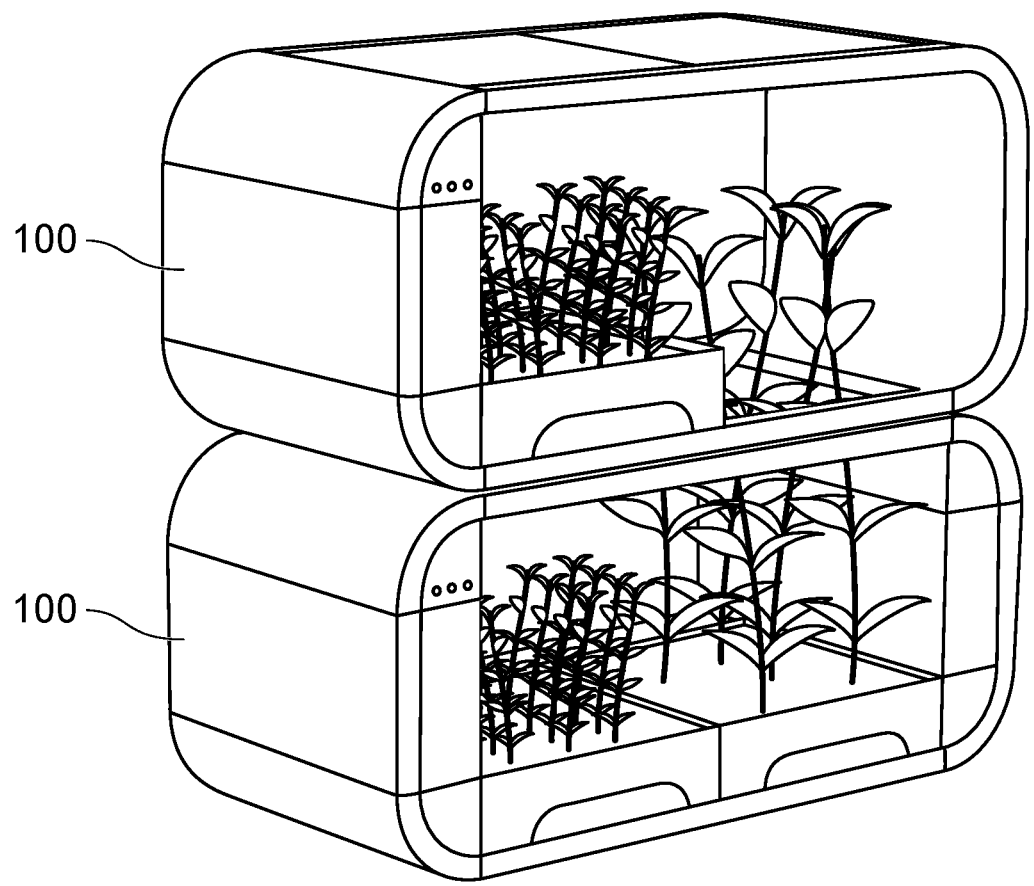
FIG. 35 is a schematic of stacked gardening systems with portions of the gardening systems removed to accommodate high-growing plants.

The gardening system 100 may be modular, such that components or segments of components of the gardening system 100 may be added, removed, or changed, such that the configuration of the gardening system 100 may be changed. FIG. 35 is a schematic of stacked gardening systems 100 with portions of the gardening systems 100 removed to accommodate high-growing plants. As depicted in FIG. 35, on the left side, two trays of plants are grown, one at a lower level and one at a higher level, and on the right side, one plant is grown, extending from the lower level to the higher level. One or more components on the right side of the gardening systems 100 may be removed. As depicted in FIG. 35, a right side portion of the top panel 132 and the lighting panel 134 of the bottom gardening system 100 may be removed for the plant to grow through the bottom gardening system 100 up into the top gardening system 100. Similarly, a right side portion of the water distribution tray 224, the rails 214 on the right side, and the water reservoir 212 on the right side of the top gardening system 100 have been removed. The top gardening system 100 may not support a tray on the right side. The components on the left side may be fixed due to mounting of the electronics, sensor, and fan. In some embodiments, one or more components of the left side of the gardening system 100 may be removed. In some embodiments, the plant growing on the right side may grow around the lighting system 154 and lighting housing 156 of the bottom gardening system 100.

In some embodiments, the water distribution tray 224 of a top gardening system 100, and the top panel 132 and lighting panel 134 of a bottom gardening system 100 may be removed, such that tall plants may grow on both the left and right sides of the gardening systems 100, extending from the bottom gardening system 100 to the top gardening system 100.

FIG. 36 is a schematic of stacked gardening systems 100 of different sizes. As depicted in FIG. 36, there may be 1×1 units, 1×2 units, 2×1 units, and 2×2 units of gardening systems 100. Gardening systems 100 may have other sizes. 1×1 units and 1×2 units may be sized for growing smaller plants, such as microgreens, herbs, and short leafy greens, while 2×1 units and 2×2 units may be sized for growing larger plants, such as tall leafy greens. Each gardening system 100 may have dedicated lighting, sensor control, and a water containment and distribution system. Each gardening system 100 may be separately powered. In some embodiments, two or more gardening system 100 may be in electrical communication together, such that the two or more gardening system 100 may be able to share electrical power.

As depicted in FIG. 36, the gardening system 100 may have a variety of shapes. The gardening system 100 may have a generally rectangular shape or a generally square shape. In some embodiments, the length of the gardening system 100 may be greater than its height. In some embodiments, the length of the gardening system 100 may be less than its height. In some embodiments, the length of the gardening system 100 may be similar to its height.

FIG. 37 is a schematic of a soil unit 260. The soil unit 260 may comprise soil 262 that may be compressed, shaped, and may be somewhat dehydrated. The soil 262 may be shaped as a rectangular block. The soil unit 260 may comprise a cover 264 that the soil is placed in.

The soil 262 may be a microbial-rich soil blend for growing living, nutritious food using the system 10. The soil 262 may be a custom mixture of components. The soil may comprise components that may be optimized for bioavailability with a mixture or recipe that may be designed and tested for effective uptake of nutrients (e.g. vitamins, minerals, protein, carbohydrate, etc.) from the soil by the plant. This may continue to be enhanced as the system 10 learns and more data leads to such optimization.

The soil unit 262 may come in various sizes in order to grow short plants, medium sized leafy green plants, and deeper root vegetables. For example, short or small blocks may be 4.5" wide×7" long×3.5" high, while large blocks may be 9" wide×14" long×8" high.

The soil unit covering 264 may be a pseudo-fabric container that may be made of breathable material for root and soil aeration. For example, the soil unit covering 264 may be 4.375" wide×7" long×3" height. The sides of the soil unit covering 264 may be made with PET perforated fabric, and the base of the soil unit covering 264 may be made with PE non-woven wicking material, felt, or another material that may promote fluid flow using capillary action. The material used for the base of the soil unit cover 264 may be the same as the material used for the wicking coil 238.

The somewhat dehydrated soil 262 may not be fully dehydrated so that it may keep its full microbial rich living activity. The soil 262 may be placed in the soil unit covering 264 and compressed (about ⅓ compression) for ease of shipping and reduced cost of shipping (lighter weight and smaller size). The soil 262 and the soil unit covering 264 may be placed into a waterproof bag and placed into a carton for shipping.

A filler piece may be placed in the top ⅓ area of the soil unit 260 to maintain the sides of the soil unit 260.

The soil unit 260 may be placed in an e-flute cardboard box 266 for transport. As depicted in FIG. 37, one cardboard box 266 may be for transporting one soil unit 260. There may be custom printed graphics on the cardboard box 266. The cardboard box 266 may be wax-coated. In some embodiments, the soil unit 260 may be poly-bagged prior to placement in the cardboard box 266.

By using soil when growing the plants in the gardening system 100, the plants may be more nutritious, and the bioavailability of the nutrients of the plant may be increased. That is, the ability of the nutrients to be absorbed by the human body may be increased.

When the soil 262 is placed in the housing 136 of the gardening system 100, the water subsystem 210 may provide moisture to the soil 262, using, for example, the wicking coil 238 that may fluidly communicate the channel 228 of the water distribution tray 224 and the soil 262.

The soil 262 may comprise one or more components and ingredients. The soil 262 may be a mixture of components and ingredients. In some embodiments, the soil 262 may comprise microbes. The microbes may be naturally occurring microbes in the soil 262. The microbes may interact with roots of the plants growing in the soil that is in the housing 136 of the gardening system 100. This interaction between the microbes in the soil 262 and the roots of the plants may create by-product minerals. An example of the by-product minerals created by this interaction may be humates, which may be made of fulvic acid and humic acid, among other components.

The humates may promote intake of nutrients (e.g. vitamins, minerals, carbohydrates, proteins, etc.) by the plant from the soil. The plant growing in the gardening system 100 may also intake the humates.

When the plant has sufficiently grown in the gardening system 100, the plant may be harvested. The plant comprises nutrients taken in from the soil, and the humates. When the plant is consumed by a user, such as a human, the humates present in the plants may improve, increase, or promote absorption of nutrients of the plants into the human cell, or otherwise increase the bioavailability of the nutrients for absorption into the human cell.

In some embodiments, the depth of the soil unit 260 may be based on the types of plants grown using the soil unit 260. For example, for plants with shorter roots, the depth of the soil unit 260 may be 10 cm deep. As another example, the depth of the soil unit 260 may be 20 cm deep for growing carrots.

Figure 38:
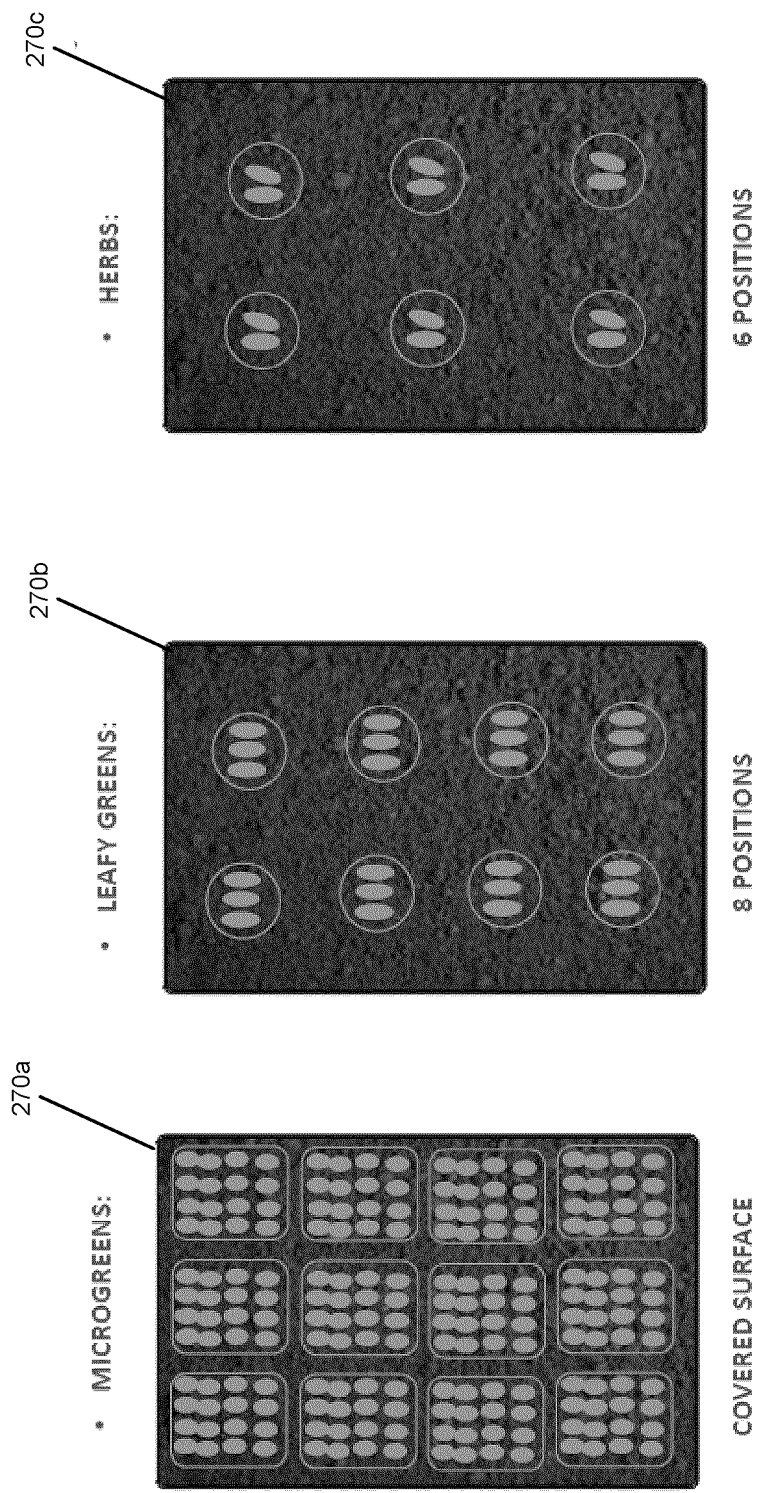
FIG. 38 is a schematic of seed sheets.

FIG. 38 is a schematic of seed sheets 270. FIG. 39 is another schematic of seed sheets 270. Seed sheets 270 may be a flat mat with embedded, depressed seed pods that may be intentionally spaced to promote growth. These seed sheets 270 with pods may be fabricated according to the type of seeds in the seed sheets 270 and the growing requirements of the plant being frown. The seed sheets 270 may be overlaid on top of the soil 262, and may be contained in the soil unit covering 264.

For example, seed sheets 270 for microgreens may have up to 45 seed pods, and may be placed closer together for denser growth. As another example, seed sheets 270 for herbs may have 24 seed pods. As yet another example, seed sheets 270 for leafy greens may have 12 seed pods, placed in a low density.

As depicted in FIG. 38, seed sheet 270a may be for microgreens, and the seed sheet 270 may have a covered surface of seeds. Seed sheet 270b may be for leafy greens, and the seeds may be separated into eight positions. Seed sheet 270c may be for herbs, and the seeds may be separated into six positions.

As depicted in FIG. 39, seed sheet 270b may be for leafy greens, and the seeds may be separated into eight positions. Seed sheet 270a may be for microgreens, and the seeds may be separated into 12 positions and may be in relatively close proximity.

The seed sheet 270 may comprise two polylactic acid (PLA) sheets that may be heat sealed together and may define the number of positions for the seeds. PLA may be a biodegradable and bioactive thermoplastic aliphatic polyester derived from renewable resources, such as corn starch cassava roots, chips or starch, or sugarcane. For example, the PLA may be manufactured by BIAX Int. in Wingham, Ontario.

Figure 40:
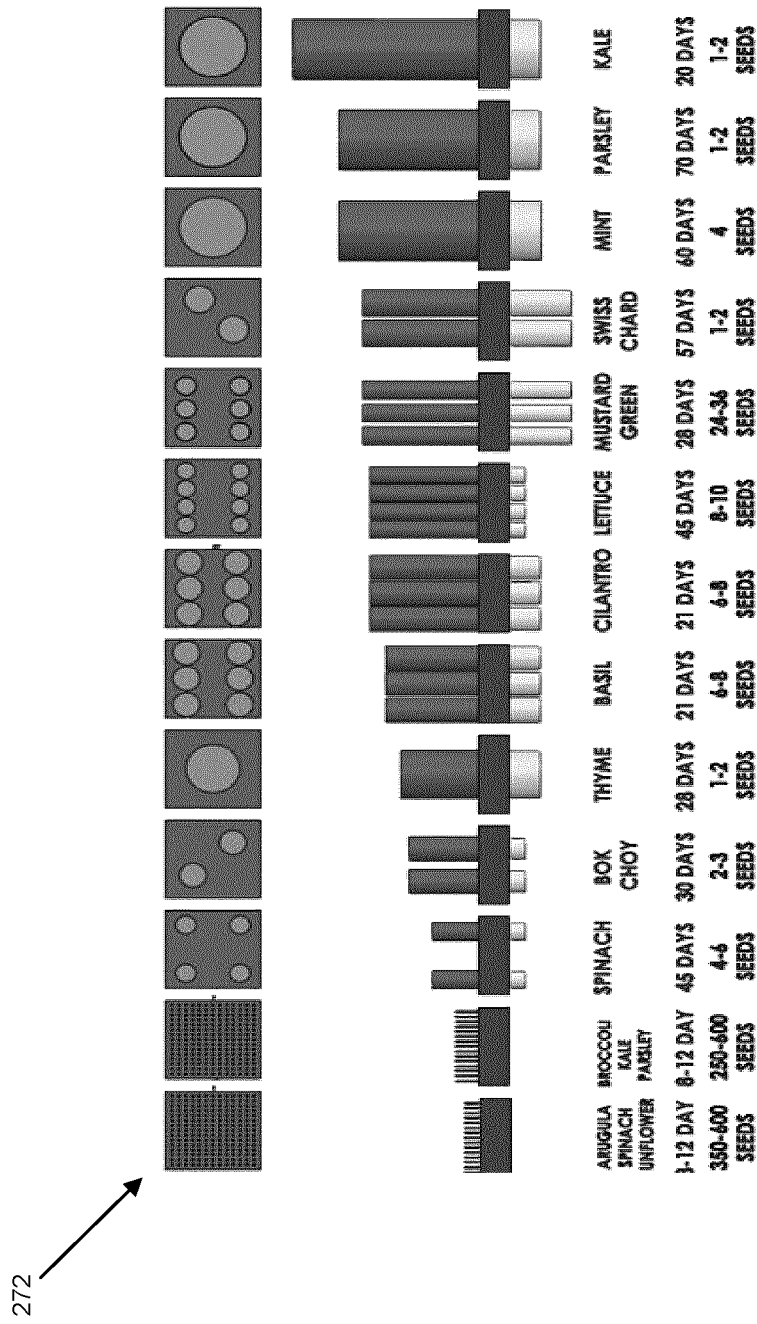
FIG. 40 is a schematic of spatial distributions of seeds in a seed sheet for growing various plants.

FIG. 40 is a schematic 272 of spatial distributions of seeds in a seed sheet 270 for growing various plants. As depicted in FIG. 40, depending on the type of plant being grown, the seed sheet 270 may have a particular seed distribution and the number of seeds used may be different.

In some embodiments, the system 10 may be in communication with other devices or computer systems in the network 106. These devices or computer systems may provide price information relating to the cost of plants sold at a grocery store, and the system 10 may calculate the savings associated with using the system 10 grow plants compared to the buying the same plants at the grocery store.

In some embodiments, based on the plants grown in the gardening system 100, the system 10 may send a control command corresponding to a graphical effect for displaying and suggesting a recipe on a user device 114 that may use the plants grown in the gardening system 100.

In some embodiments, the system 10 may notify a user when another user is using another system 10 or when another gardening system 100 is proximate. The system 10 may inform users if a number of gardening systems 100 may be proximate in a certain geographical area (e.g. within a block, within the same residential building, etc.), which may present an opportunity to trade plants grown at those gardening systems 100. The notification may be a suggestion of an trade opportunity, such that the users of the system 10 may trade plants that they are growing (e.g. a user growing kale may trade with another user growing mint).

In some embodiments, a first user may send a control command corresponding to a trade offer (e.g. an offer to trade an excess amount of plants grown on their gardening system 100, seeking certain plants grown nearby but not grown by the user, etc.) to the server 104. The server 104 may send a control command to the user devices 114 of the users of nearby gardening systems 100 to notify the users of nearby gardening systems 100 of the trade offer of the first user, and the users of nearby gardening systems 100 may respond to the trade offer of the first user. The system 10 may provide a platform for one or more of the users of the nearby gardening systems 100 to communicate with the first user using the user devices 114, such as a messaging platform, video platform, voice platform, or a combination thereof.

In some embodiments, the system 10 or components of the system 10 may be verified to be the system 10 or components of the system 10. For example, a QR code may be printed on the system 10 or components of the system 10 and may be matched with information in a database to confirm that the system 10 or components of the system 10 are real or manufactured by the correct manufacturers. There may be a secure Universal Product Code handshake to ensure that soil units 260 are manufactured by the correct manufacturers.

In some embodiments, the system 10 may track the amount of plants that have been harvested and consumed by the user (e.g. a certain unit of plants, a certain unit of microgreens, a certain unit of leafy greens, etc.) and may calculate the amount of essentials (e.g. minerals, vitamins, proteins, carbohydrates) that were consumed by the user. Based on the amount of nutrients consumed by the user, the system 10 may determine the percentage of daily intake of those nutrients consumed by the consumer, and may recommend an amount of plants to meet the total recommended daily intake of those nutrients. The system 10 may recommend growing certain types of plants in the gardening system 100, eating certain types of foods, or consuming certain types of supplements. The system 10 may be used by the user to buy these products. The system 10 may provide a link to each item, with prices and a purchase function.

In some embodiments, the system 10 may be in data communication with a supplier of materials of the system 10, such as a supplier of the soil unit 260 or seed sheets 270. The system 10 may send a control command to the supplier to order more soil units or seed sheets 270.

In some embodiments, the system 10 may be a commercial unit, like a vending machine. The system 10 (e.g. the gardening system 100) may be placed in a store, and plants may be grown using the system 10. A customer of the store may harvest the plants growing in the system 10. The harvested plants may be weighed to calculate the cost of the harvested plants. In such embodiments, the system 10 may be a vending machine of plants for customers.

The system 10 described herein may be used to grow plants. In some embodiments, the system 10 described herein may be used to grow other food, such as fruits.

The system 10 described herein may be used to optimize soil composition based on the data captured at the gardening system 100.

When the user installs the system 10 (e.g. purchasing the system 10, or placing the gardening system 100 at home), the system 10 may be set up and turned on. The system 10 may monitor the conditions of the environment before making a personalized region-specific recommendation of what plants to grow using the gardening system 100. This recommendation may be based on data that may be captured at the gardening system 100, such as barometric pressure, air quality, elevation, temperature, humidity, and the like.

In operation of the system 10 as depicted in FIG. 1, the gardening system 100 may be connected to a power source, such as to an electrical outlet. The user may remove the one or more trays 142 from the gardening system 100 to fill them with soil and seeds. The soil may be placed in the tray 142 first, and then the seeds may be placed on the soil. The soil may be placed in the tray 142 until the tray 142 is filled with soil. In some embodiments, the user may place the soil unit 260 in the tray 142, being guided by the rails 150 of the tray 142. Then, one or more seed sheets 270 may be placed on the soil unit 260. As depicted in FIG. 3, two trays 142, each configured to receive four soil units 260, may be used with the gardening system 100. The user may insert the tray 142, now having soil and seeds, into the gardening system 100. In some embodiments, the tray 142 may be slidably inserted into the gardening system 100. When the tray 142 is properly positioned in the gardening system 100, the lighting subsystem 154 and water subsystem 210 may be able to access the soil and seeds in the tray 142. The tray 142 may make a "click" sound when it is properly positioned in the gardening system 100.

The user may remove the water reservoirs 212 from the gardening system 100 and fill them with water, and then insert the water reservoirs 212 into the gardening system 100. The water reservoirs 212 may be slidably inserted into the gardening system 100 using the rails 214 of the gardening system. The spring valve 216 of the water reservoirs 212 may engage with the nozzles 218 of the rail 214 to fluidly communicate the water reservoirs 212 with the water distribution tray 224 of the water subsystem 210. When the spring valve 216 and nozzle 218 are engaged, a "click" sound may be made, and the water subsystem 210 may be activated. The water may flow from the water reservoir 212 to the channels 228 of the water distribution tray 224. The water in the channels may flow to the soil in the tray 142 using one or more wicking coils 238 positioned in the channels 228. Using capillary action, the wicking coil 238 may draw the water from the channel 228 towards the tray. The wicking coil 238 may be in contact with the soil in the tray. In some embodiments, the wicking coil 238 may be in contact with the base of the soil unit cover 264, which may be made using the same material as the wicking coil 238. The water in the channels 228 may flow to the soil through the wicking coil 238, or through the wicking coil 238 and the soil unit cover 264, and may begin to saturate the soil in the tray 142.

The user may then turn on the gardening system 100 using the control panel 140. For example, the user may turn on the lighting subsystem 154 of the gardening system 100 using the control panel 140. The gardening system 100 may also be turned on remotely using the user device 114. At this point, the controller 102 may take over the growth of the plant and monitoring the growth of the plant. The sensor component 192 and imaging component 190 of the gardening system 100 may capture data corresponding to the conditions of the gardening system 100, growth of the plant, and health of the plant. The controller 102 of the gardening system 100 may process the data captured by the sensor component 192 and imaging component 190 to determine the growth of the plant. Based on the data captured by the sensor component 192 and imaging component 190, the controller 102 may send a control command to a subsystem of the gardening system (e.g. lighting subsystem 154, atmosphere control, etc.) to change the conditions of the gardening system 100. The controller 102 may send a control command to a user device 114, such as over a network 106, wirelessly (e.g. Wi-Fi, Bluetooth) to send a message to the user device 114. The user may view the message on an application downloaded on the user device 114. Based on the message sent by the controller 102 to the user device 114, the user may tend to the plant, harvest the plant, add water to the water tanks, or otherwise manage the gardening system 100. The system 10 has now entered into user passivity, where the user waits while the controller 102 and user device 114 continue to communicate with one another to enable plant growth. The user may be notified using the user device 114 to act on the plants or the gardening system 100.

The controller 102 may send data captured by the sensor component 192 and imaging component 190 to the server 104 via the network 106. The server 106 may process the data provided by the controller 102, and based on that data, determine the optimal plant growing thresholds to build intelligence using machine learning or artificial intelligence, and may compare captured data, such as real time or near real time data, with the optimal plant growing thresholds. Based on this comparison, the server 104 may determine if a plant is growing sub-optimally, and may send a control command to the user device 114 to display a message on the user device 114, such as recommendations for optimization, or the server 104 may send a control command to the controller 102 to dynamically or automatically change the condition of the gardening system 100.

Figure 41:
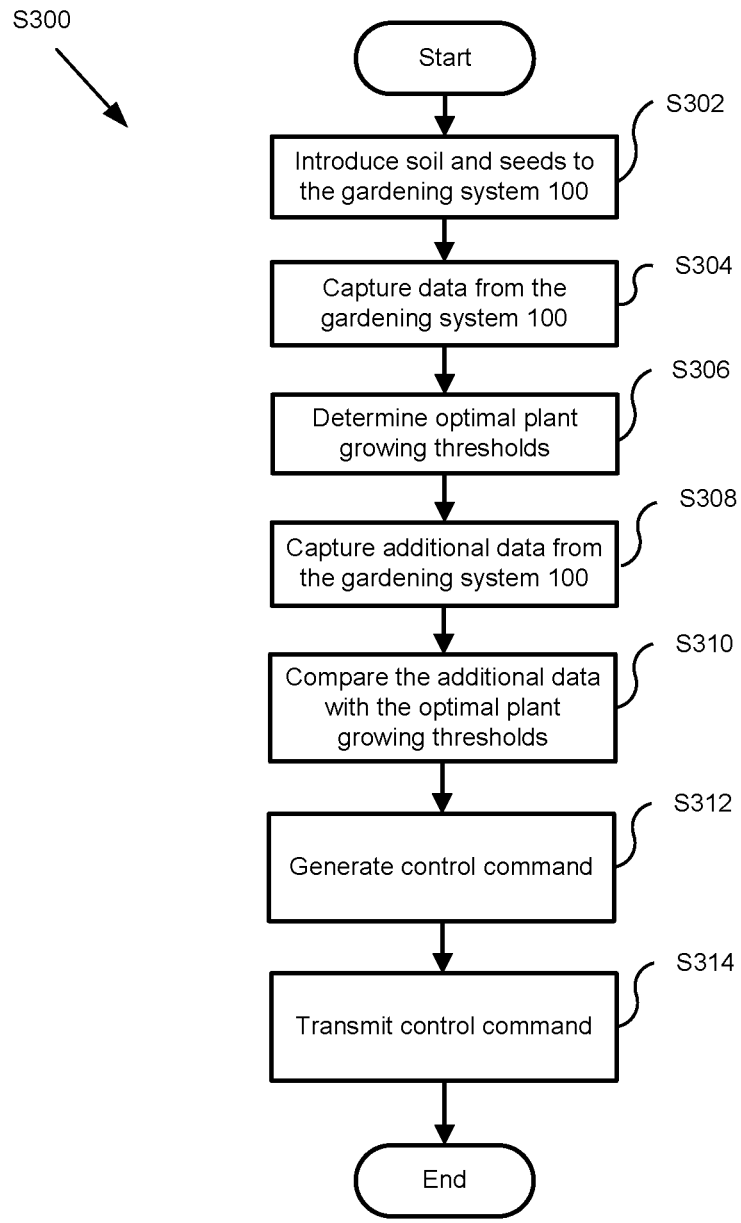
FIG. 41 is a flow chart depicting a method of using the gardening system of FIG. 3.

FIG. 41 depicts a method S300 of using the system 10.

At block S302, the soil and seeds, such as the soil unit 260 and seed sheet 270 may be introduced to the gardening system 100. The soil and seeds may be introduced to the gardening system 100 using one or more trays 142. The water reservoirs 212 may be filled with water and inserted into the gardening system 100, and water may begin to flow into the water distribution channel 228 and begin to saturate the soil. The lighting subsystem 154 may be turned on. At this point, the seeds may begin to grow.

At block S304, the sensor component 192 and imaging component 190 may capture data of the conditions of the gardening system 100 and the growth of the plant in the gardening system 100. The captured data may be processed by the controller 102, the server 104, or a combination thereof.

At block S306, based on the captured data from the gardening system 100, optimal plant growing thresholds may be determined. The optimal plant growing thresholds may be determined, for example, by the server 104, using machine learning and artificial intelligence.

At block S308, additional data may be captured by the sensor component 192 and imaging component 190 corresponding to the conditions of the gardening system 100 and the growth of the plant in the gardening system 100.

At block S310, the optimal plant growing thresholds determined at S306 may be compared with the additional captured data at S308.

At block S312, based on the comparison, a control command may be generated. The control command may correspond to a change to the condition of the gardening system 100 (e.g. change in lighting, change in atmospheric composition, change in sound, etc.) to optimize the conditions of the gardening system 100 to improve the health of the plant and bioavailability of the nutrients of the plant.

At block S314, the control command generated at S312 may be transmitted. In some embodiments, the control command may be transmitted to the controller 102 of the gardening system 100 to automatically or dynamically change the condition of the gardening system 100. In some embodiments, the control command may be transmitted to a user device to recommend that a user manually change the condition of the gardening system.

In use, different plants grown by system 10 may require varying environmental variables or controls (such as temperatures) for optimized growth to achieve, for example, a desired balance of mineralization, enzymes, and chlorophyll development in the plant. System 10 may be configured to customize settings based on a plant type, number of plants, and condition of the plants.

One such environmental variable includes temperature. In some embodiments, temperature in gardening system 100 may be sensed by temperature sensors such as sensor components 192 and temperature in gardening system 100 may be modified to be cooler or warmer than the overall ambient temperature, for example, by way of a temperature controller (e.g. a fan, a heater, in an example, based on electrical resistance) as described herein. In some embodiments, temperature may be sensed and/or modulated on the scale of the overall environment of system 10, an individual gardening system 100, an individual tray 142 within gardening system 100, or an individual soil unit 260. In this way, custom control of system 10 may be achieved and generation of optimization of a plant and plant growth through calibration of temperature, as one variable in an example.

A centralized controller, in an example, controller 102, may capture data on the plants growing in each gardening system 100. Plant data may be communicated back to the cloud and the data stored over time, as described herein. Data such as a plant type may be input in an automated manner or manually entered or captured.

In some embodiments, a plant type and number of plants present may be automatically captured by way of image recognition software, for example, by way of imaging component 190, and an algorithm (for example, as part of controller 102 or server 104) may recognize the plant type. Images may be gathered through imaging component 190, for example, a lens mounted in gardening system 100.

In some embodiments, a plant type may be manually captured through a user action or interaction with, for example, controller 102 or server 104. In an example, a user may select the plant types and number of plants growing in each soil unit 260, tray 142, gardening system 100 or system 10.

Once plant types are captured and determined, an algorithm may match the plant to its optimal settings for growth and/or bioavailability, and may set gardening system 100 environment to optimum growing variables, such as temperature settings, and may make adjustments throughout the plant's life.

In some embodiments, system 10 may be configured to mimic a geographical growing region, for example, that is well-suited for a plant type. In one example, for a plant type identified as lettuce system 10 may be configured to mimic a region of California, on the basis of certain growing variables, including temperature, humidity, water level, light colour and level, and soil characteristics.

In some embodiments, system 10 may be configured to mimic certain growing seasons, varying over time.

The system 10 may grow plants that are nutritious to the human body as it relates to the human bioavailability of plant minerals to enable optimum human cellular health (i.e. high nourishment for the body). The system 10 may allow a user to conveniently grow vegetables at the touch of a button.

The system 10 may be driven by bio inputs, such as microbial-rich soil, sun mimicking LED lights, Infrared camera that captures photosynthesis to offer feedback to customers, sound waves that enhance plant growth, and bio geometric design. By controlling these inputs, the system 10 may improve the health of the plants grown using the system 10, the essentials or nutrients provided by the plants, and the bioavailability of these essentials or nutrients for the human body.

The system 10 may allow food to be grown 24 hours a day, 365 days a year while protecting crops from harsh weather and accidental pollution. The system 10 may allow plants to be grown in the manner that they have traditionally been grown, namely, in a complex environment, with a focus on growing nourishing plants by enhancing bio-inputs. Bio-inputs may be enhanced using: the soil, which may be a complex combination or web of microbes, enzymes, minerals, etc.; the lighting subsystem, which may mimic the sun using LED lights; sound subsystem; and enhancement of biophotons, and the like.

The system 10 may also allow food to be grown cheaply. The price of growing the food may be similar to prices of food sold by farms. The cost of the food grown by the system may be reduced, as the cost may not include the costs related to transporting the food or distributing the food.

The system 10 may allow the user to oversee or supervise food production from planting the seed to harvesting the crop, which may give insight into the growth process. The system 10 may allow the user to trace the materials used to grow the plants from seed to fork.

The system 10 may allow the user to grow food in a small space, such as in their home. Accordingly, the system 10 may grow food "hyper-locally".

Other configurations of the gardening system 100 may be possible.

Figure 42:
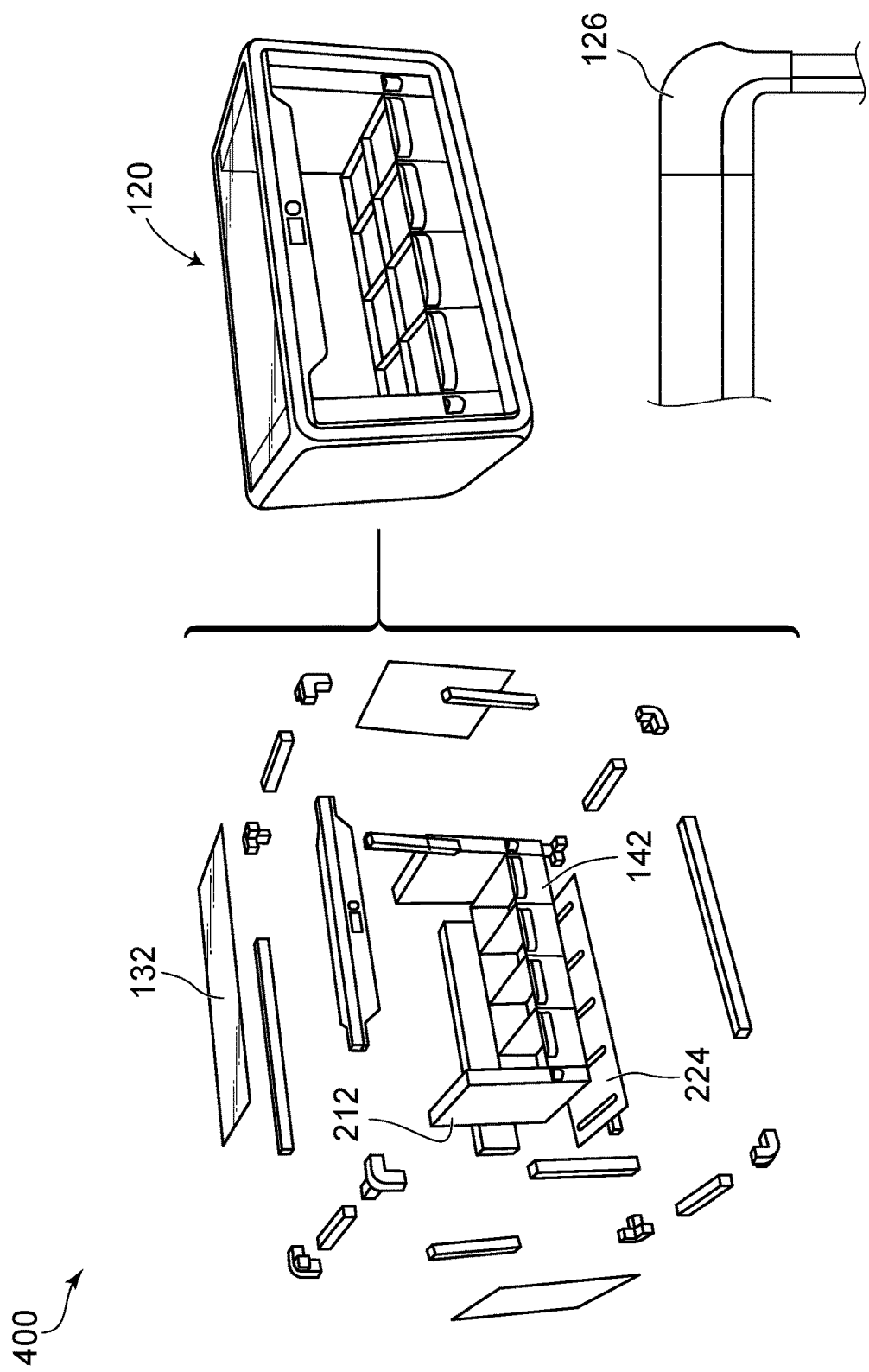
FIG. 42 is a schematic of another gardening system.

FIG. 42 is a schematic of another gardening system 400. The gardening system 400 may be generally similar to the gardening system 100, having a frame 120, a lighting subsystem 154, and a water distribution subsystem 210. However, the gardening system 400 may comprise corner elements 126 that may be cast in metal or made using metal. The other components of the frame 120 may be extruded, such as extruded members. The water distribution tray 224, tray 142, and water reservoirs 212 may be injection moulded. The side panels 130 and top panel 132 may be cut and fit to the frame 120.

As depicted in FIG. 42, the top panel 132 may be made of a material that may allow additional external light to illuminate the housing 136 of the gardening system 400, such as glass.

Figure 43:
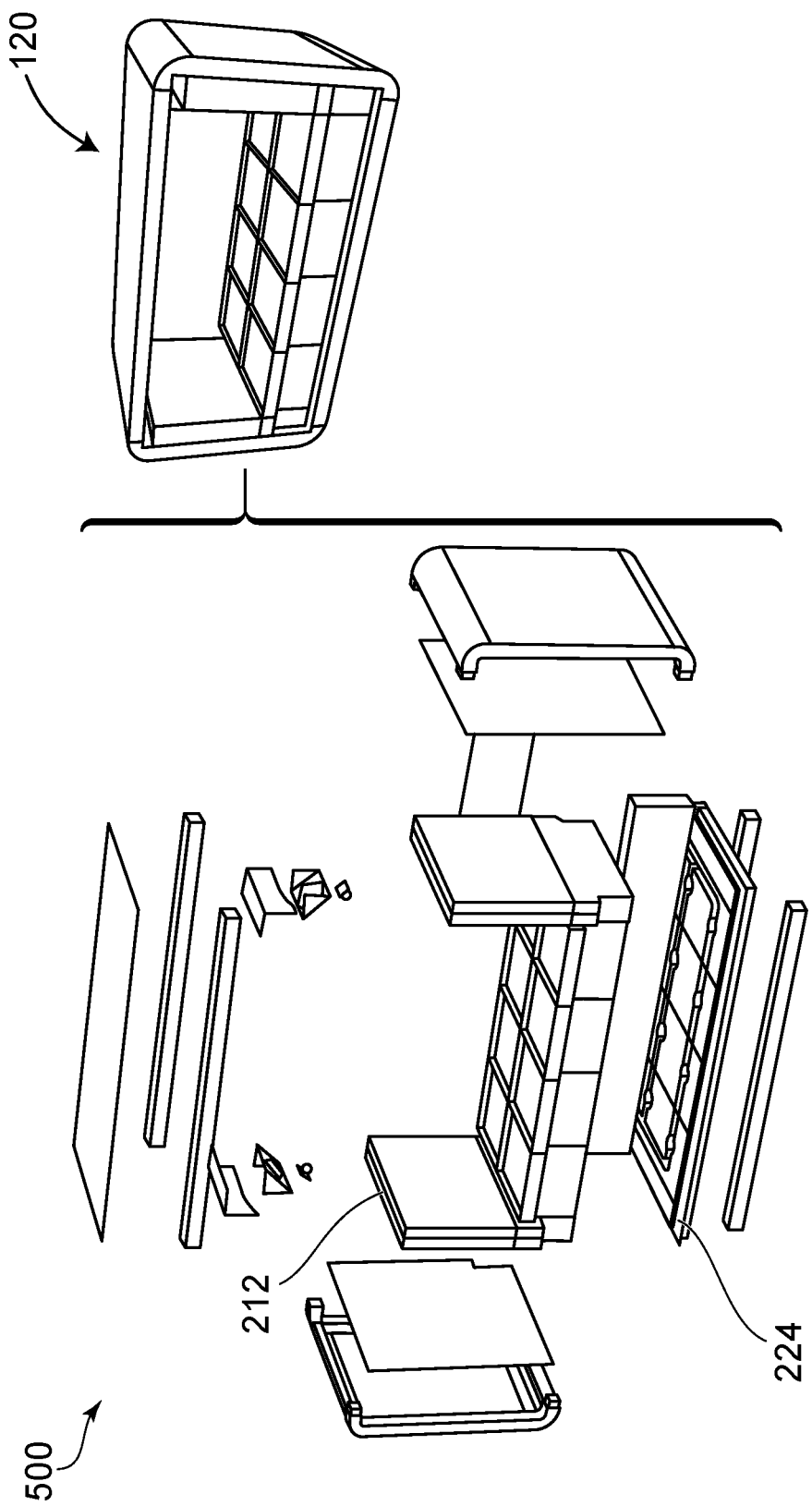
FIG. 43 is a schematic of another gardening system.

FIG. 43 is a schematic of another gardening system 500. The gardening system 500 may be generally similar to the gardening system 100, having a frame 120, a lighting subsystem 154, and a water distribution subsystem 210. However, the components of the frame 120 may be extruded, such as extruded members. The water distribution tray 224, tray 142, and water reservoirs 212 may be injection moulded.

As depicted in FIG. 43, the channels 228 of the water distribution tray 224 may be in fluid communication with each other. That is, the water distribution tray 224 may define one channel 228 for receiving water from the water reservoir 212.

Figure 44:
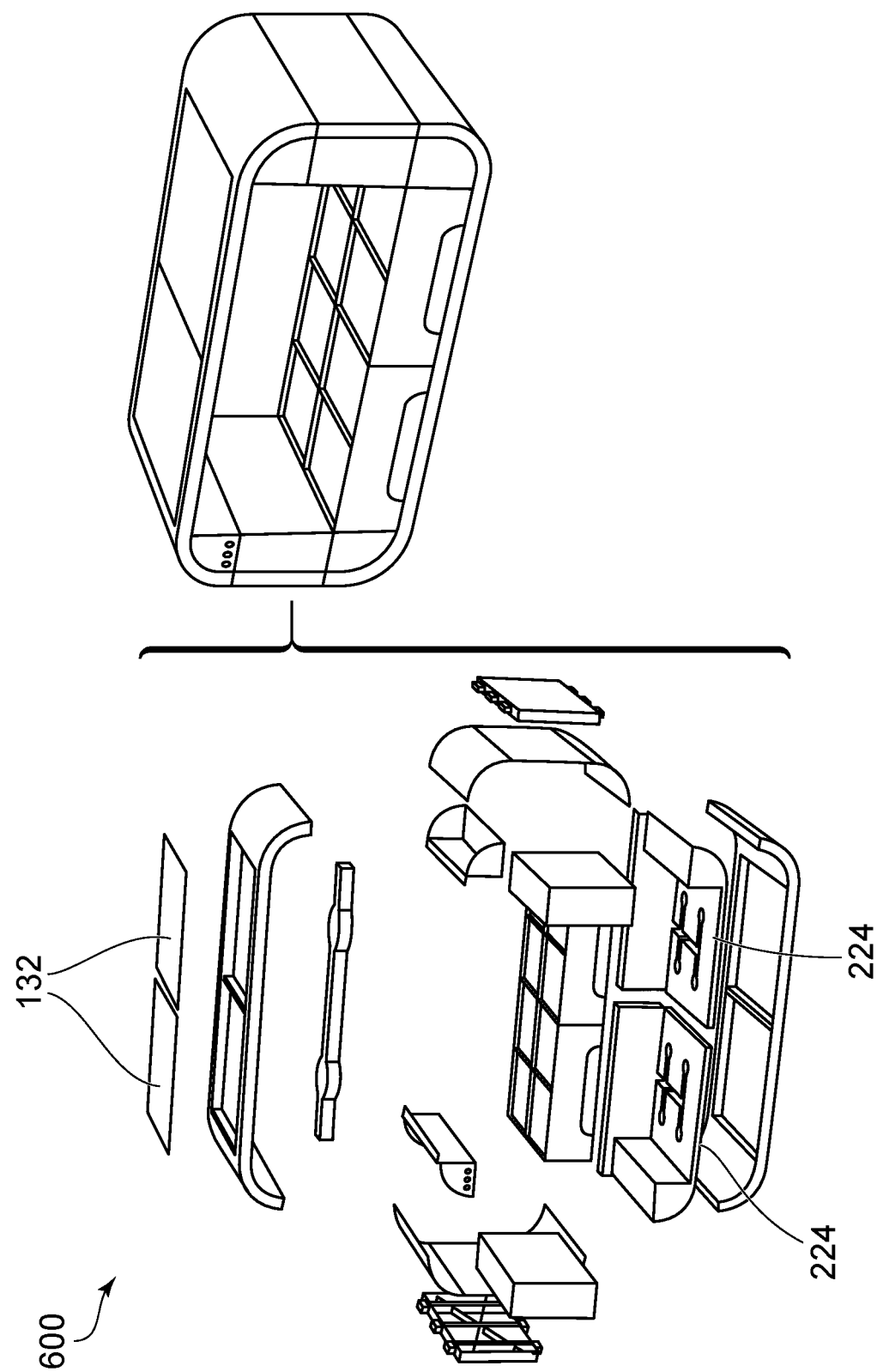
FIG. 44 is a schematic of another gardening system.

FIG. 44 is a schematic of another gardening system 600. The gardening system 600 may be generally similar to the gardening system 100, having a frame 120, a lighting subsystem 154, and a water distribution subsystem 210. However, the water distribution tray 224, tray 142, and water reservoirs 212 may be injection moulded.

As depicted in FIG. 44, the top panel 132 and the water distribution tray 224 may be defined as two segments, a left and a right segment. One or more segments of the top panel 132 and the water distribution tray 224 may be removed for stacking a gardening system 600 on top of another gardening system 600.

In some embodiments, with respect to gardening systems 400, 500, and 600, the gardening system 400 may have the highest part cost, followed by gardening system 600, followed by gardening system 500 with the lowest part cost, and the gardening system 600 may have the highest tool cost, followed by gardening system 500, followed by gardening system 400 with the lowest tool cost.

Figure 45:
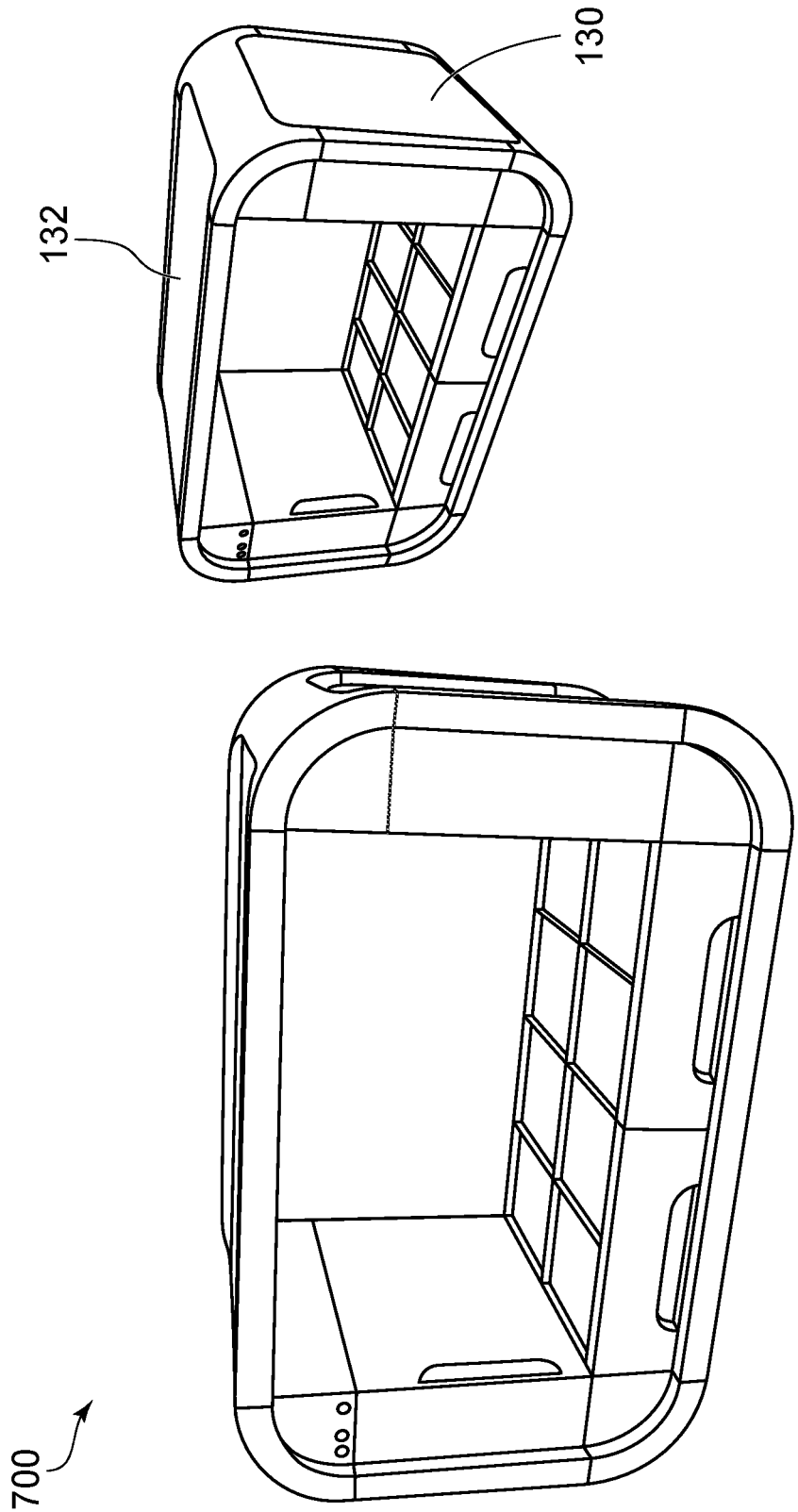
FIG. 45 is a schematic of another gardening system.

FIG. 45 is a schematic of another gardening system 700. The gardening system 700 may be generally similar to the gardening system 100, except the side panels 130, top panel 134, and lighting panel 134 may be made with wood.

The appearance of the gardening system 700 may be generally similar to the gardening system 100. The light emitted by the lighting subsystem 154 may be shared with all plants growing in the gardening system 700. Also, the shape of the trays 142 may be generally simple. Also, the gardening system 700 may comprise a frame 120, side panels 130, and a top panel 132, which may cost less for manufacturing.

As the gardening system 700 may be modular, the components or segments of the components of the gardening system 700 may be assembled to form the gardening system 700. One or more of the components, or one or more of the segments of the components, may comprise electrical components (e.g. electrical couplings, electrical connectors, wires, etc.) for assembling the gardening system 700. The gardening system 700 may comprise one or more corner elements 126, one or more corner caps 128, or one or more rails 214 for providing a rectangular shape of the gardening system 700 with rounded corners.

Figure 46:
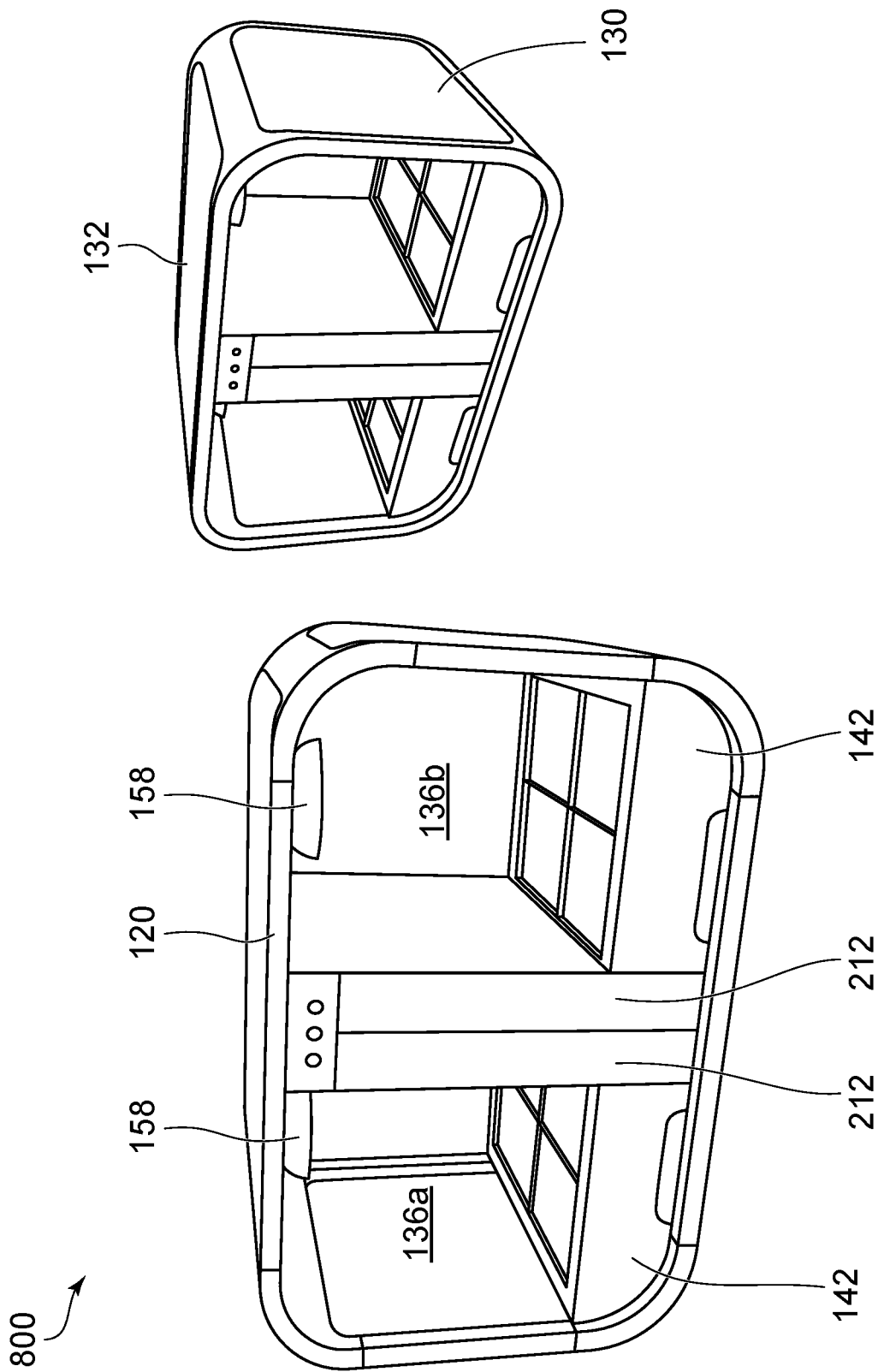
FIG. 46 is a schematic of another gardening system.

FIG. 46 is a schematic of another gardening system 800. The gardening system 800 may be generally similar to the gardening system 100, except the water reservoirs 212 are mounted generally in the middle of the gardening system 800 rather on the sides of the frame 120. As depicted in FIG. 46, when the water reservoirs 212 are mounted generally in the middle of the gardening system, the housing 136 may be separated by the water reservoirs 212 into a housing 136a and a housing 136b.

In some embodiments, as depicted in FIG. 46, the gardening system 800 may have an integrally formed frame 120. In some embodiments, as depicted in FIG. 46, the side panels 130 and top panel 132 may be approximately flush with the frame 120 and may not be recessed in the frame 120. In some embodiments, portions of the frame 120, the side panels 130, or the top panel 132 may be curved to provide the appearance of rounded corners.

The gardening system 800 may be assembled easily, and the electrical connections of the gardening system 800 may be easier to configure. The water, electronics, fan, lighting subsystem 154, and sensor component 192 may be centrally located at a central hub. As depicted in FIG. 46, the gardening system 800 may not comprise rails 214 at the corners of the gardening system 800 for guiding the water reservoirs 212 into and out of the gardening system 800, which may increase the size of the housing 136a and the housing 136b for growing plants.

As depicted in FIG. 46, as there are no rails 214 positioned at the corners of the gardening system 800, the trays 142 may be designed or manufactured to have a rounded corner for fitting into the housing 136a and housing 136b of the gardening system 800, and for providing the gardening system 800 with the appearance of rounded corners. In addition, with the water reservoirs 212 positioned in the housing 136 to define the housing 136a and the housing 136b, the light emitted by the lighting subsystem 154 may not be shared by all plants growing in the gardening system 800. A first light source 158 of the lighting subsystem 154 may emit light in the housing 136a, and a second light source 158 of the lighting subsystem 154 may emit light in the housing 136b. In some embodiments, portions of the frame 120, the side panels 130, or the top panel 132 may be curved to provide the appearance of rounded corners.

Figure 47:
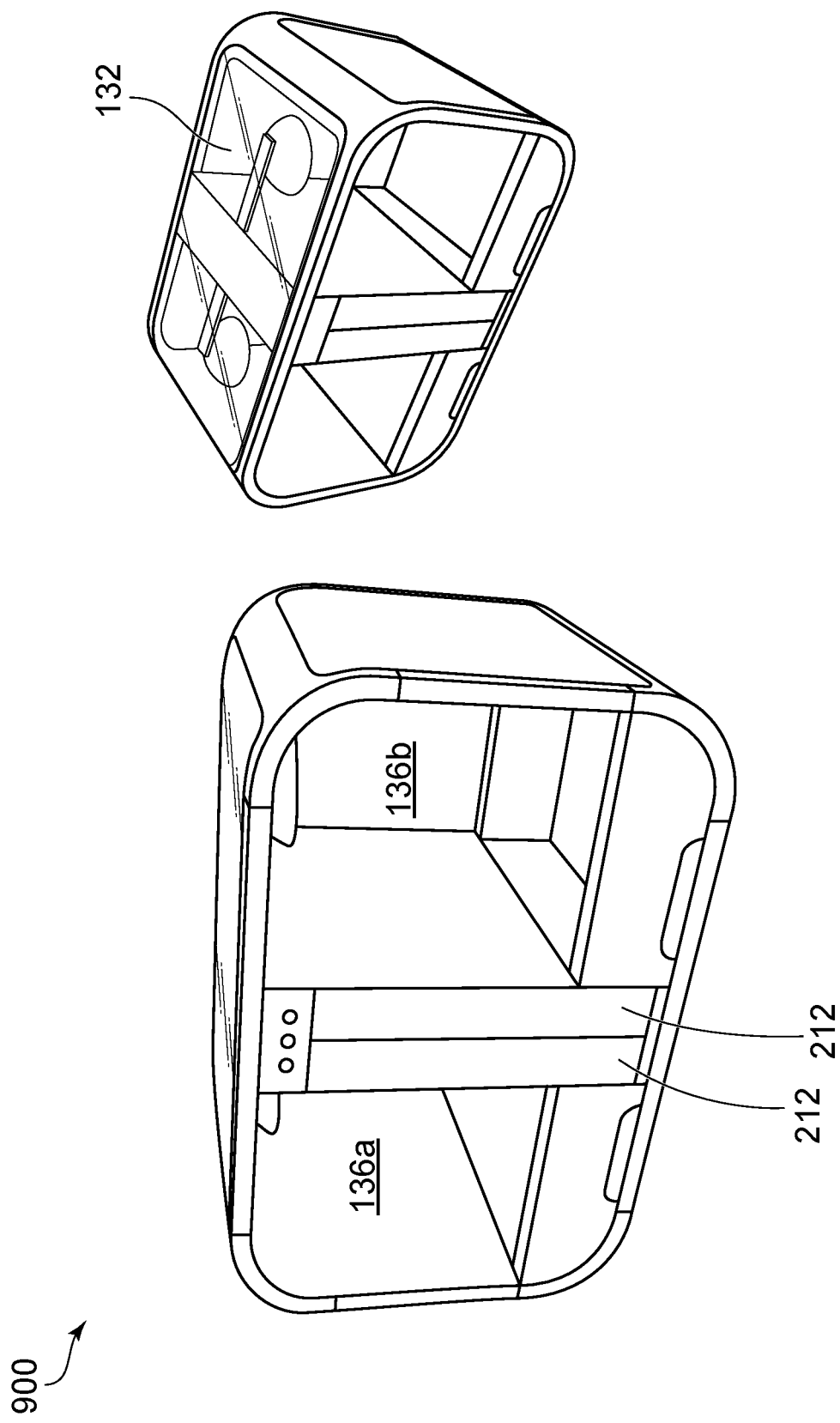
FIG. 47 is a schematic of another gardening system.

FIG. 47 is a schematic of another gardening system 900. The gardening system 900 may be generally similar to the gardening system 800, except the top panel 132 may be made of a material that may allow additional external light to illuminate the housing 136a and the housing 136b of the gardening system 900, such as glass.

FIG. 48 is a schematic of another gardening system 1000. The gardening system 1000 may be generally similar to the gardening system 800 and gardening system 900, except the frame 120 may be made of metal, and the side panels 130 and the top panel 132 may be made of wood.

Figure 49:
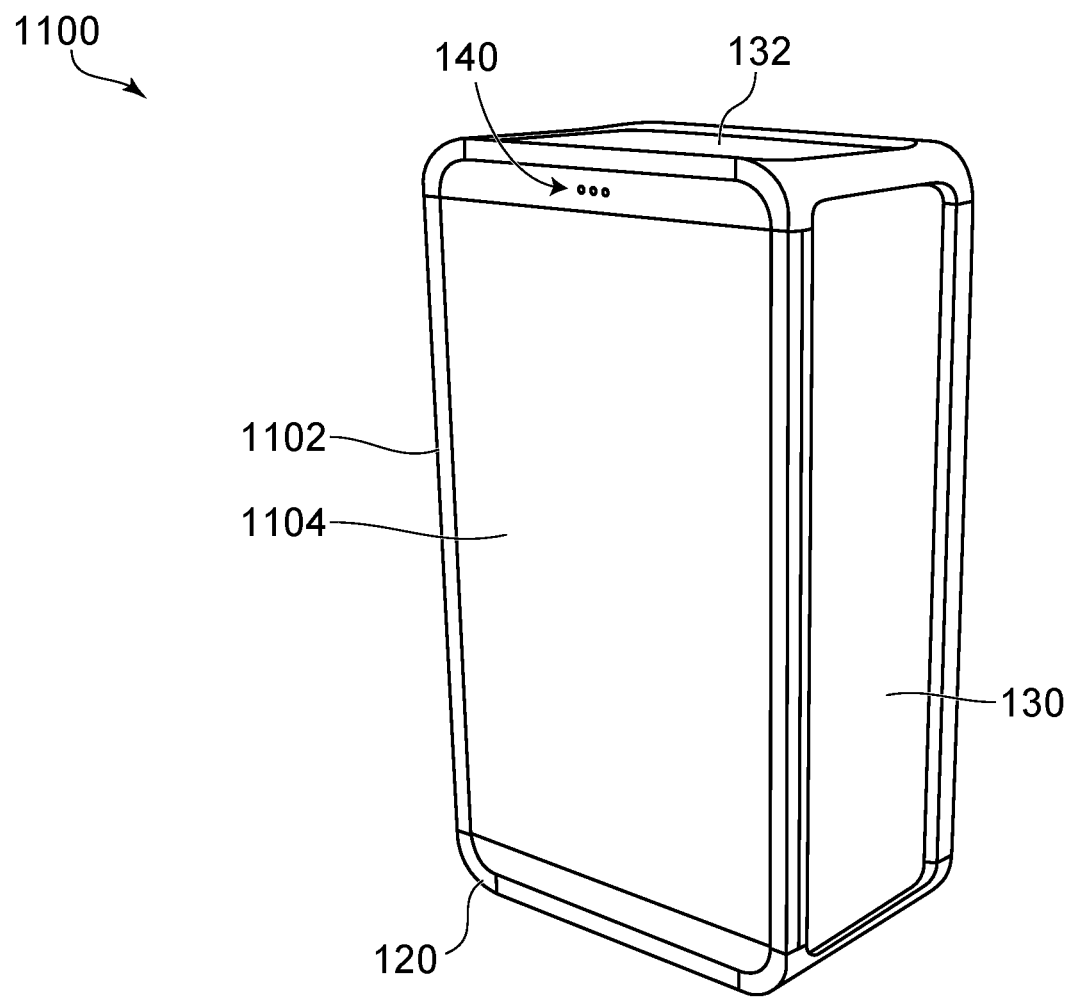
Figure 50:
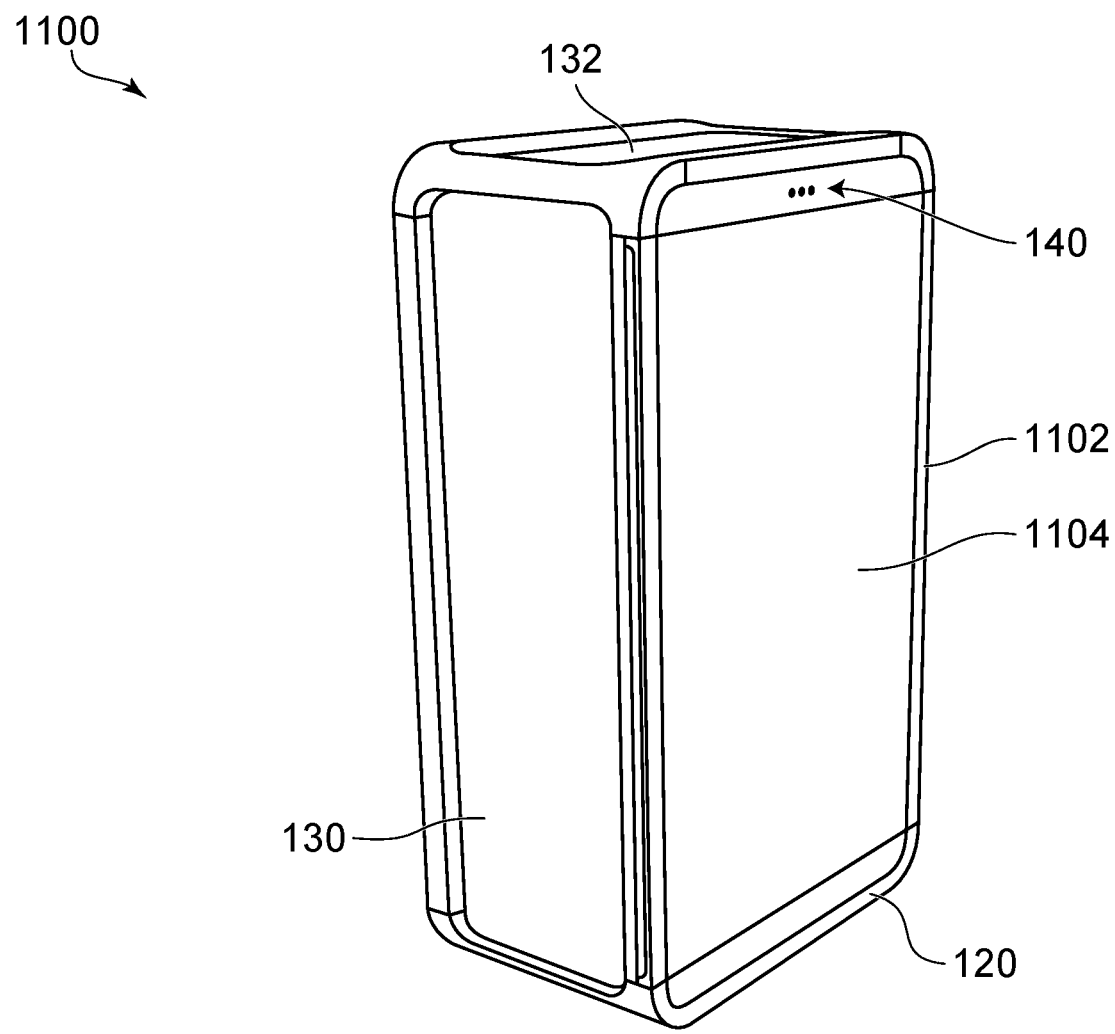

FIGS. 49-62 are schematics of another gardening system 1100. As depicted in FIG. 49 and FIG. 50, the gardening system 1100 may be generally similar to the gardening system 100, with a frame 120, side panels 130 and top panel 132, and control panel 140, lighting subsystem 154, and water subsystem 210. However, as depicted in FIG. 49, while both the gardening system 1100 and gardening system 100 have a rectangular shape with round corners, the height of the gardening system 1100 as depicted in FIG. 49 may be larger than its length, while the height of the gardening system 100 depicted in FIG. 3 may be smaller than its length. While the gardening system 100 may be an open system (i.e. the gardening system 100 having an open front end and an open back end, such that the housing 136 of the gardening system 100 may be exposed to the external environment), the gardening system 1100 may be a closed system with doors 1102 on the front end and the back end, such that the housing 136 of the gardening system 1100 may not be exposed to the external environment. The doors 1102 may improve the control of the conditions in the housing 136 of the gardening system 1100. For example, with the doors 1102 closed, the temperature and humidity of the housing 136 may be controlled. The door 1102 may be a transparent or translucent door. In some embodiments, the door 1102 may be a glass door that comprises glass 1104. The glass 1104 may be opaque, translucent, or transparent. The glass 1104 may be tint-able glass. The user may send a control command using a user device 114 to tint the glass 1104.

In some embodiments, the lighting subsystem 154 of the gardening system 1100 may be more powerful than the lighting subsystem 154 of the gardening system 100.

As depicted in FIG. 49 and FIG. 50, the control panel 140 may comprise one or more buttons and lights as described herein. For example, there may be a button corresponding to turning the gardening system 100 on or off, a button corresponding to turning the lighting system 154 on or off, or a button for turning the Wi-Fi or Bluetooth compatibility on or off. There may be a logo or a light corresponding to whether the water level in the water reservoir 212 is low. The light may be turned on by the controller 102 when the controller 102 determines that the water level in the water reservoir 212 is low. There may be a logo or a light corresponding to whether the gardening system 100 is connected to Wi-Fi or Bluetooth.

Figure 51:
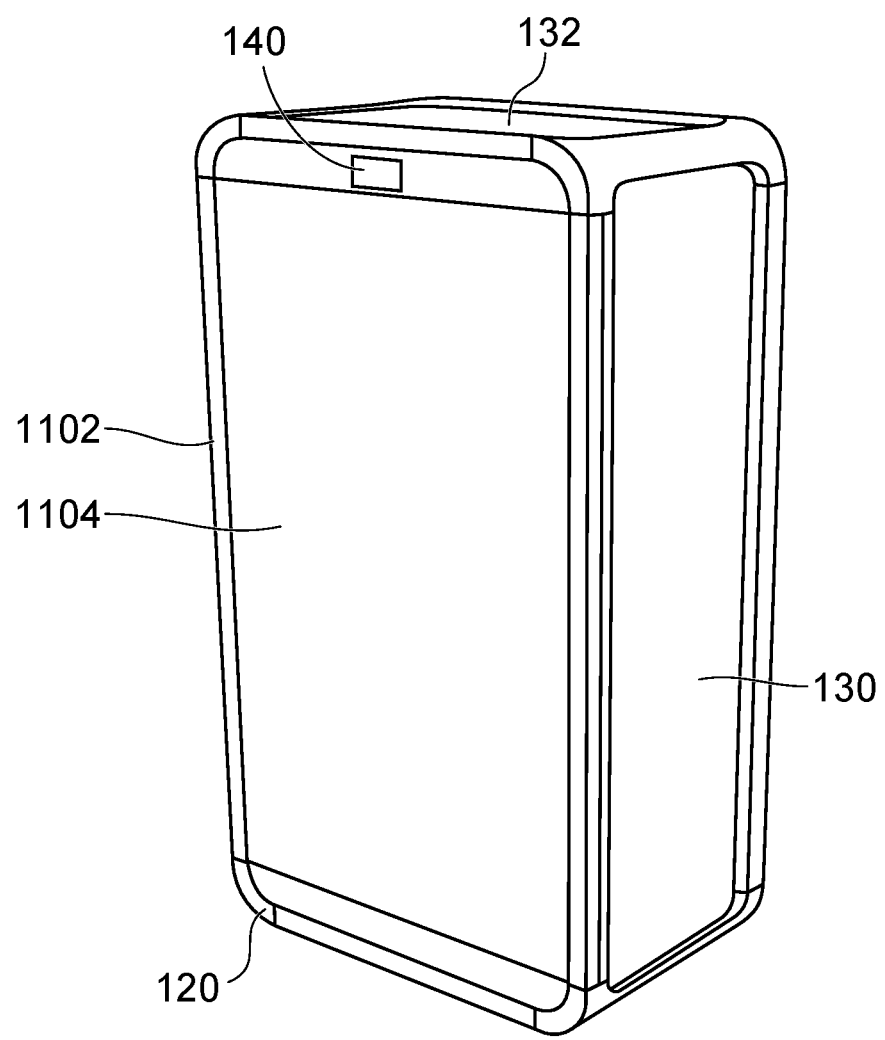

FIG. 51 is a schematic of the gardening system 1100. In some embodiments, the control panel 140 of the gardening system 1100 may comprise a screen as described herein. The controller 102 may send a control command for displaying buttons, lights, or menu options on the screen. There may be a knob, switch, or buttons for scrolling through the screen. In some embodiments, the screen may be a touch screen. The user may use the control panel 140 to send a control command to the controller 102 for changing the conditions of the gardening system 100.

Figure 52:
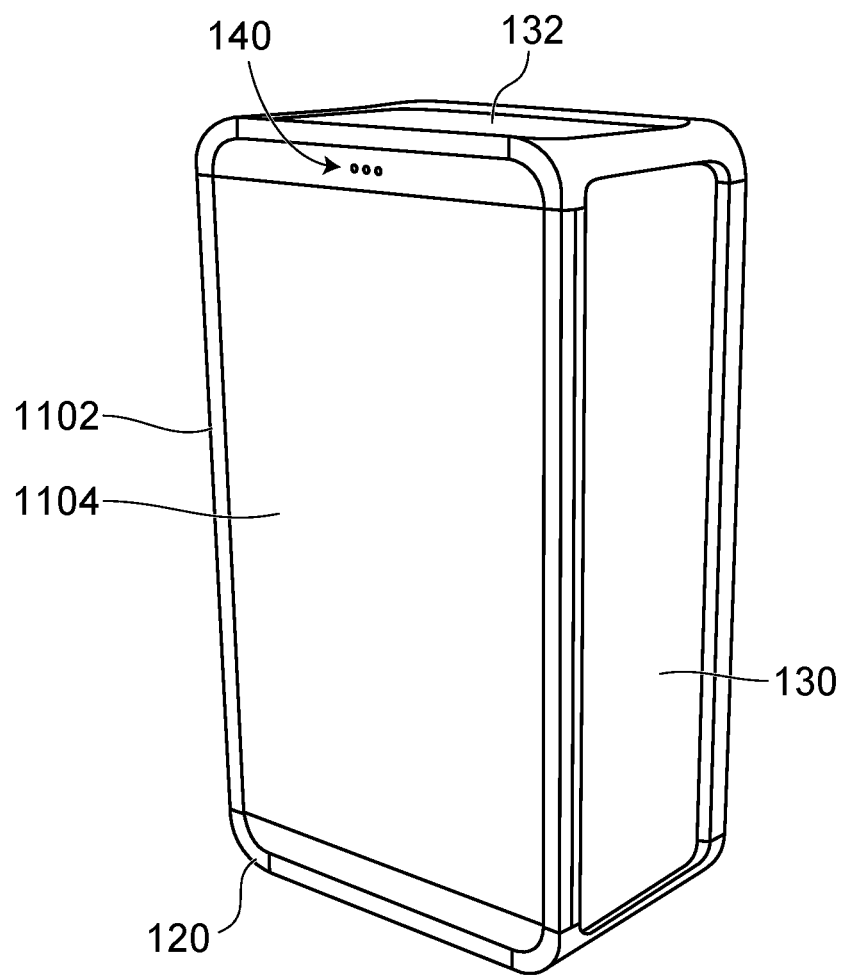
Figure 53:
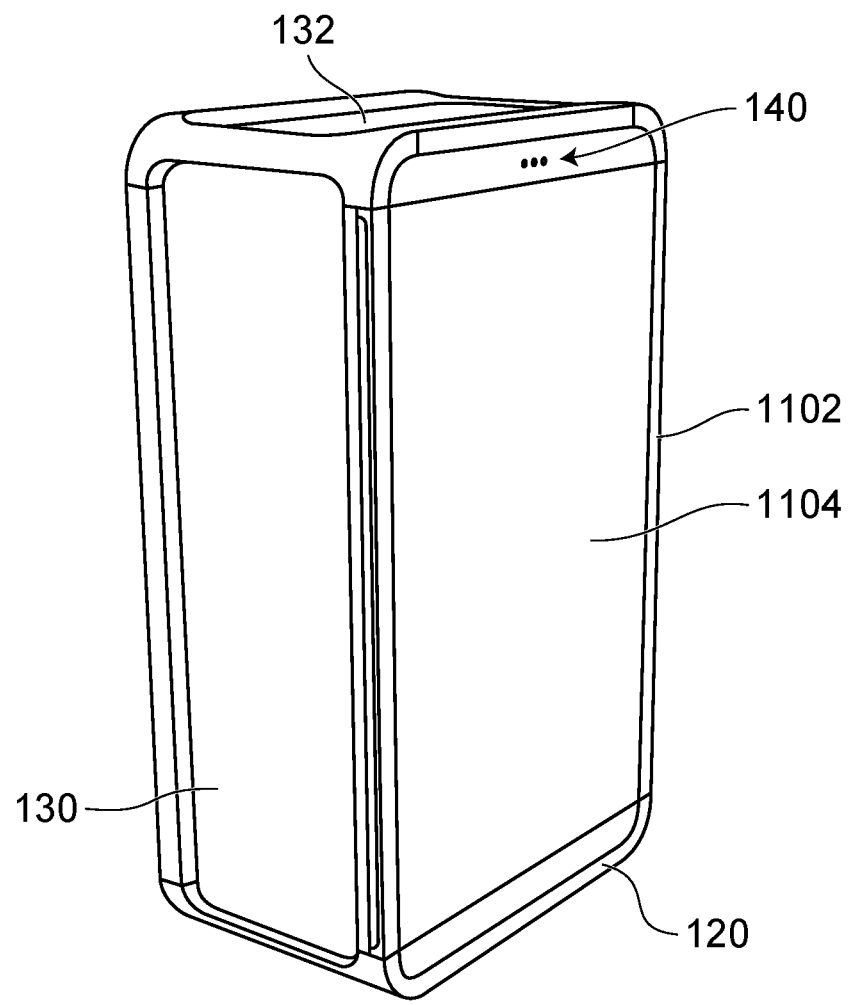

FIG. 52 and FIG. 53 are schematics of the gardening system 1100. As depicted in FIG. 52 and FIG. 53, the glass 1104 of the door 1102 may be tinted. In some embodiments, the tint of the glass 1104 may be toggled on or off, or a degree of tint may be set. In some embodiments, a user device 114 may set the amount of tint of the glass 1104. In some embodiments, the amount of tint of the glass may be set at the control panel 140.

Figure 54:
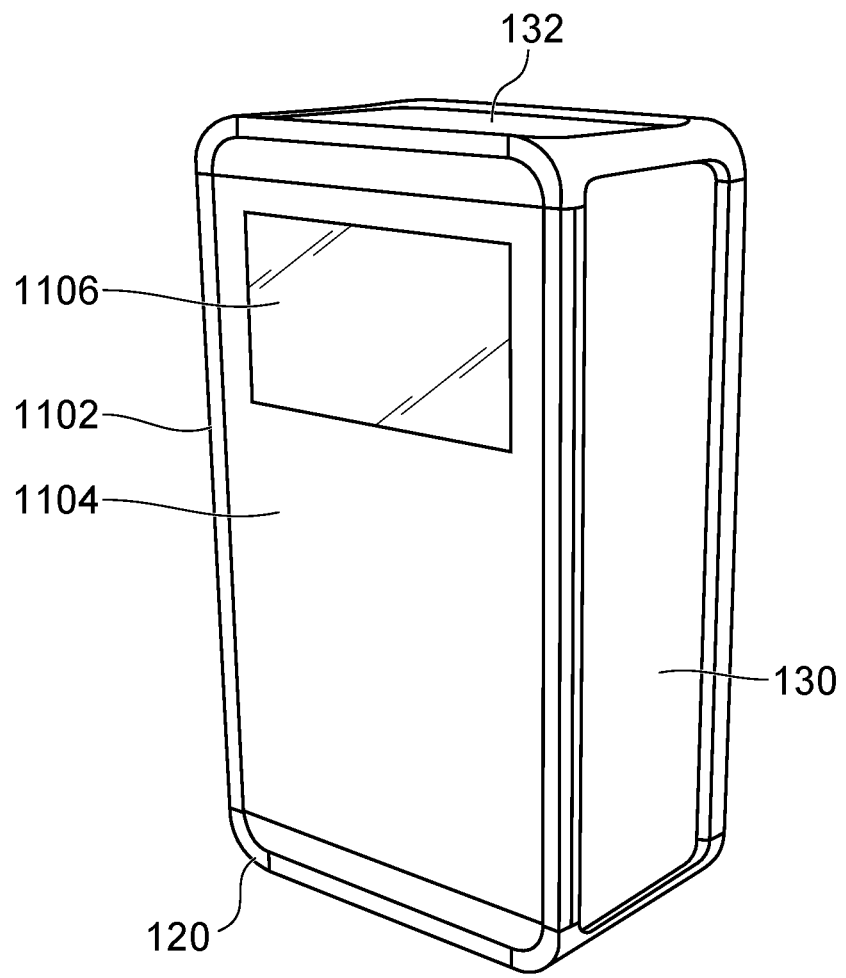

FIG. 54 is a schematic of the gardening system 1100. As depicted in FIG. 54, the gardening system 1100 may comprise a screen 1106. The controller 102 may send a control command for graphical effects to be rendered on the screen 1106. The graphical effects rendered on the screen 1106 may correspond to previously captured video data, real time video data, or near real time video data of the plants growing in the housing 136, conditions of the gardening system 1100 (e.g. water level in water reservoirs 212, temperature of the housing 136, the amount of light detected by a light sensor 160, etc.). In some embodiments, the graphical effects rendered on the screen 1106 may correspond to data captured by the sensor component 192 and imaging component 190 of the gardening system 1100, or may be data processed by the controller 102 or server of the system 10.

In some embodiments, the screen may be a touch screen 1106. In some embodiments, the screen 1106 may function as the control panel 140. The graphical effects rendered on the screen 1106 may correspond to menu items, and the user may press on the screen 1106 to control the gardening system 1100.

In some embodiments, the screen 1106 may be generally transparent or translucent, such that the screen 1106 may be used to look into the housing 136 of the gardening system 1100. In some embodiments, video or image data corresponding to the plants growing in the housing 136 may be rendered on the screen 1106. The rendering of the video or image data may be done intermittently. The controller 102 may send a control command for graphical effects to be rendered on the screen 1106, which may correspond to, for example, conditions of the gardening system 1100 (e.g. water level in water reservoirs 212, temperature of the housing 136, the amount of light detected by a light sensor 160, etc.). A user may look through the screen 1106 to view the plants growing in the gardening system 1100, and may look on the screen 1106 to view data related to the conditions of the gardening system 1100. Where the screen 1106 functions as a control panel, the user may interact with the screen 1106, such as pressing a portion of the screen on which a button or switch has been rendered, to control the gardening system 1100.

In some embodiments, graphical renderings corresponding to conditions of the gardening system 1100 may be rendered on the screen 1106, and graphical renderings corresponding to video data of the plant may be rendered as a background to the graphical renderings corresponding to conditions of the gardening system 1100.

In some embodiments, as depicted in FIG. 54, the door 1102 may be an opaque door, and the glass 1104 of the door 1102 may be opaque.

Figure 55:
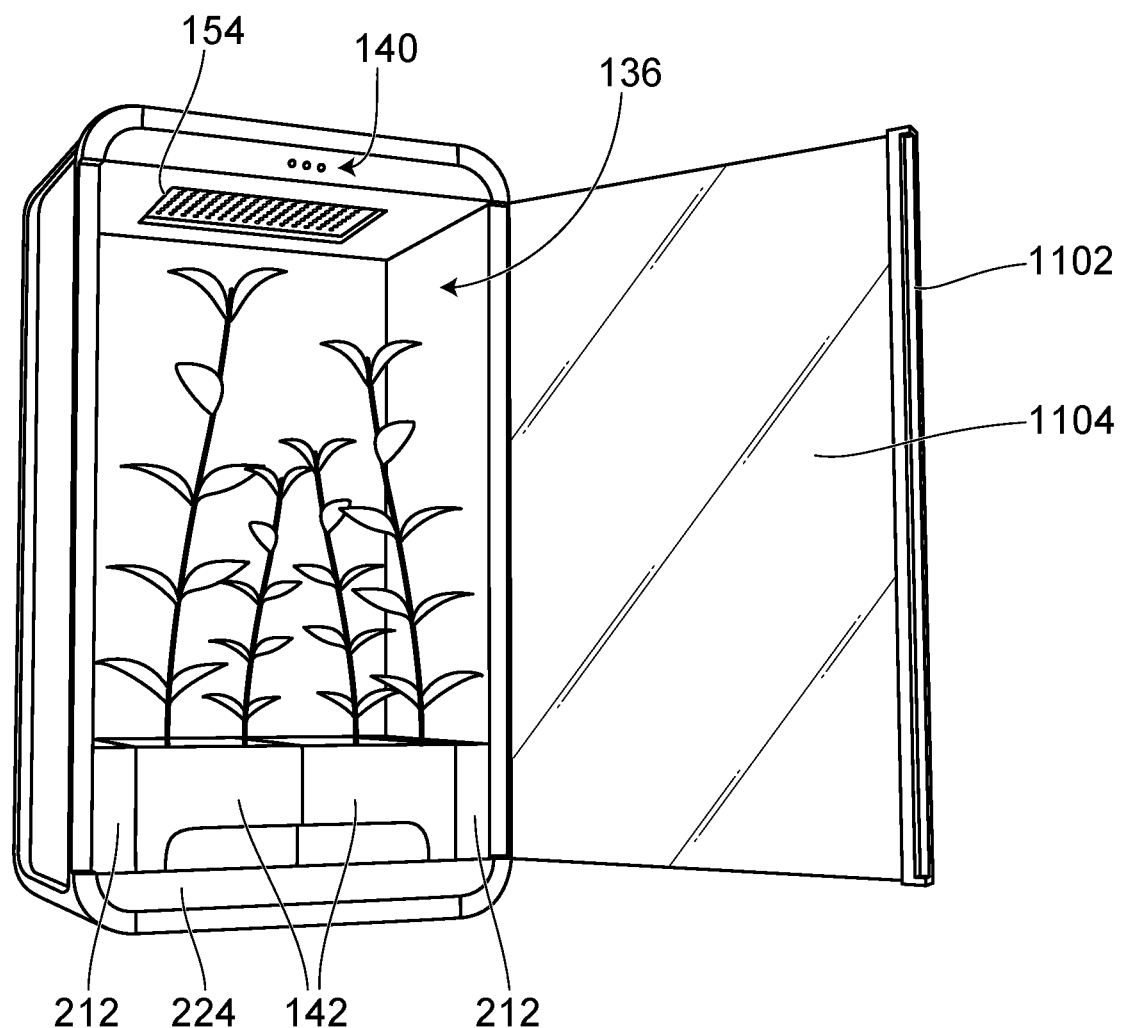
Figure 56:
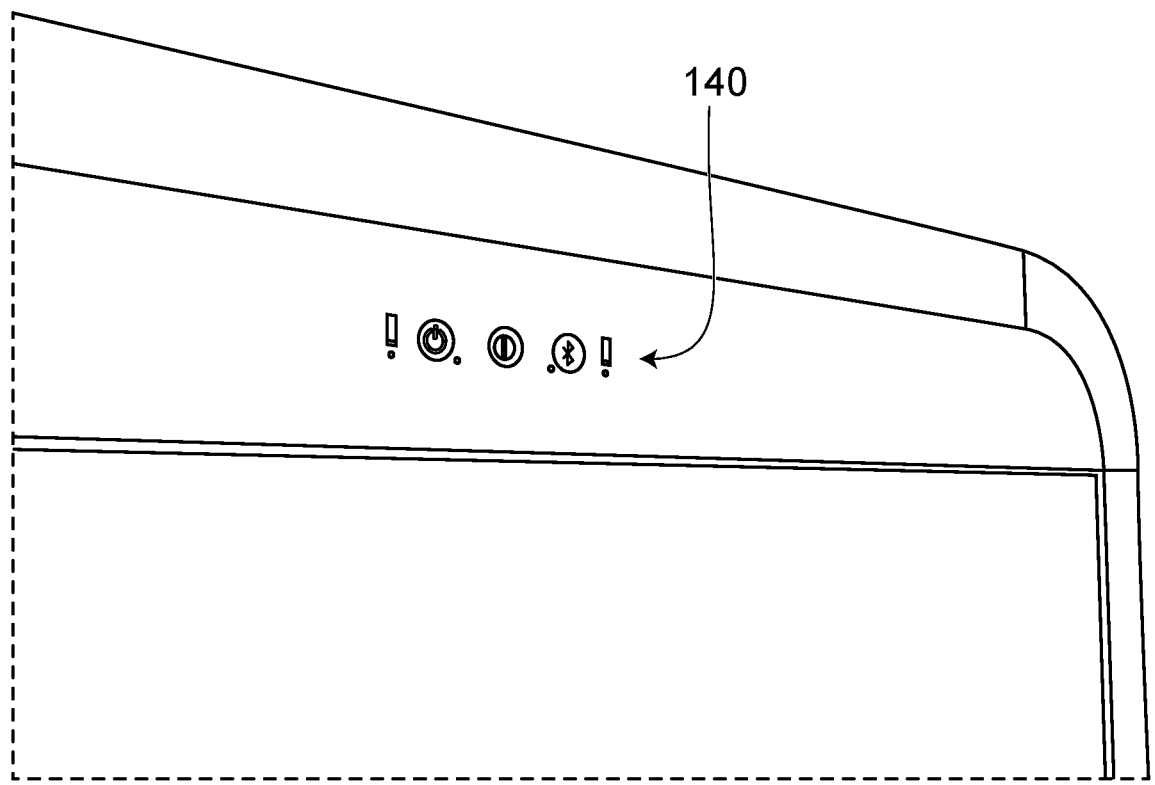

FIG. 55 is a schematic of the gardening system 1100. FIG. 56 depicts the gardening system 1100 with the door 1102 open. As depicted in FIG. 56, the gardening system 1100 comprises the control panel 140, the water reservoirs 212, and the water distribution tray 224. FIG. 56 depicts two trays 142 in the housing 136 of the gardening system 1100.

FIG. 56 is a schematic of the control panel 140 of the gardening system 1100. The control panel 140 may comprise one or more buttons and lights, as described herein. For example, there may be a button corresponding to turning the gardening system 100 on or off, a button corresponding to turning the lighting system 154 on or off, or a button for turning the Wi-Fi or Bluetooth compatibility on or off. There may be a logo or a light corresponding to whether the water level in the water reservoir 212 is low. The light may be turned on by the controller 102 when the controller 102 determines that the water level in the water reservoir 212 is low. There may be a logo or a light corresponding to whether the gardening system 100 is connected to Wi-Fi or Bluetooth.

Figure 57:
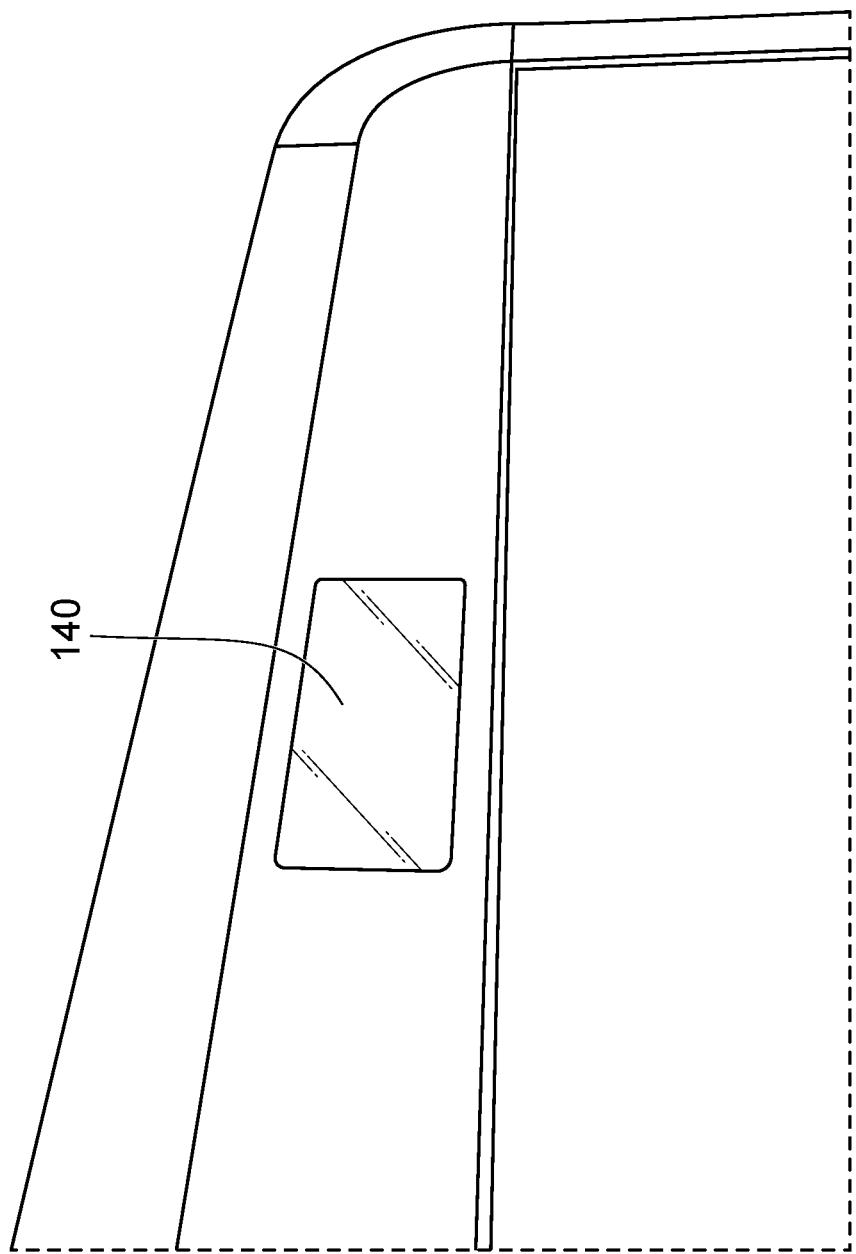

FIG. 57 is a schematic of the control panel 140 of the gardening system 1100. The control panel 140 of the gardening system 1100 may comprise a screen, as described herein. The controller 102 may send a control command for displaying buttons, lights, or menu options on the screen. There may be a knob, switch, or buttons for scrolling through the screen. In some embodiments, the screen may be a touch screen. The user may use the control panel 140 to send a control command to the controller 102 for changing the conditions of the gardening system 100.

Figure 58:
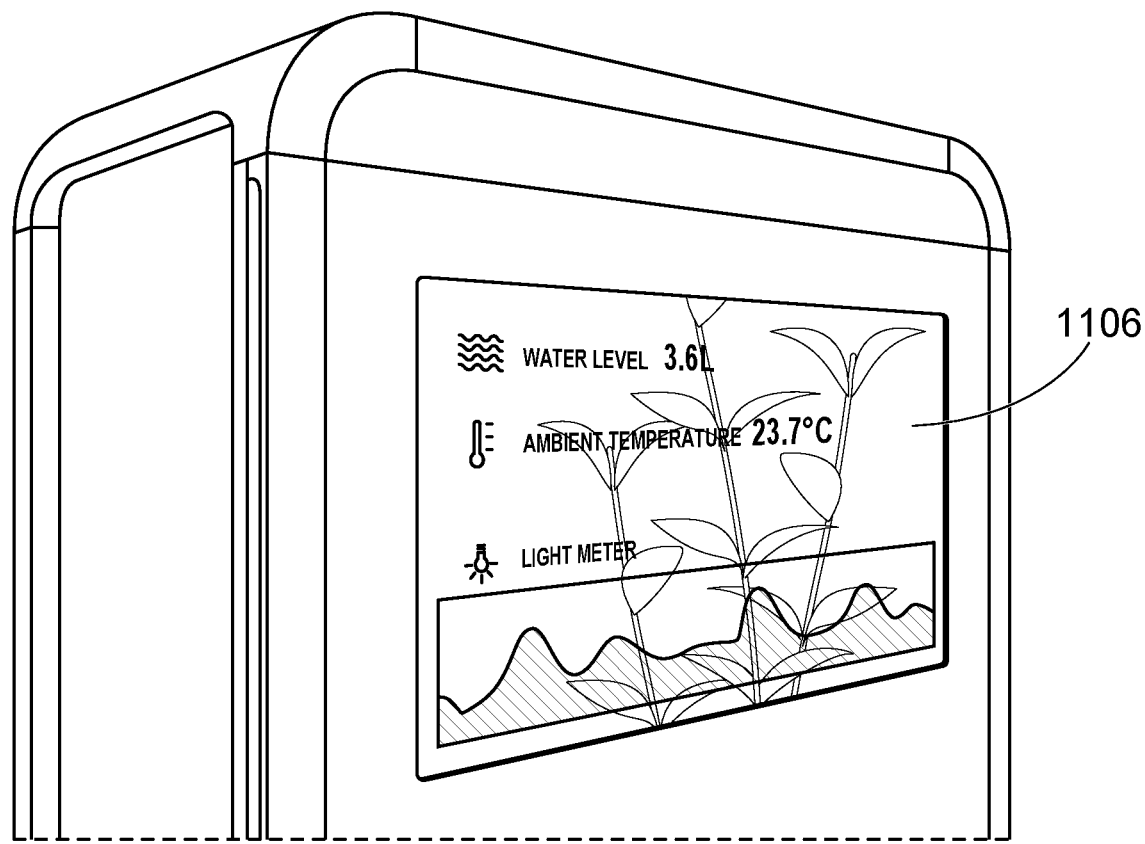

FIG. 58 is a schematic of the screen 1106 of the gardening system 1100.

Figure 59:
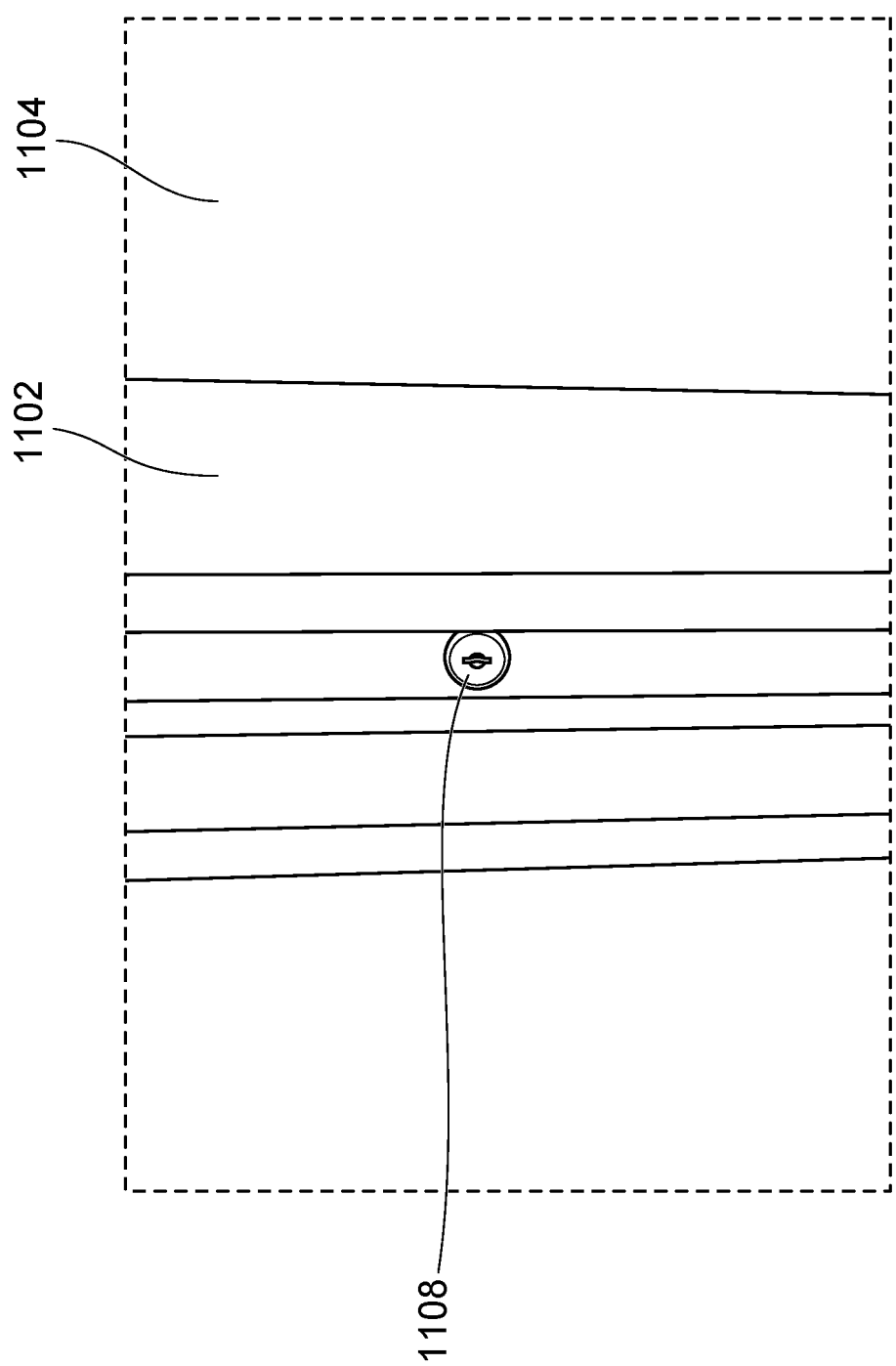

FIG. 59 is a schematic of the gardening system 1100. In some embodiments, the door 1102 may comprise a lock 1108. As depicted in FIG. 59, the lock 1108 may be locked and unlocked with a key. In some embodiments, the lock 1108 may comprise a keypad, and a user may have to input a password to unlock the lock 1108. In some embodiments, the lock 1108 may comprise a magnetic sensor, and a key card may be swiped against the sensor to unlock the lock 1108. In some embodiments, other varieties of locks 1108 may be used to lock and unlock the door 1102.

Figure 60:
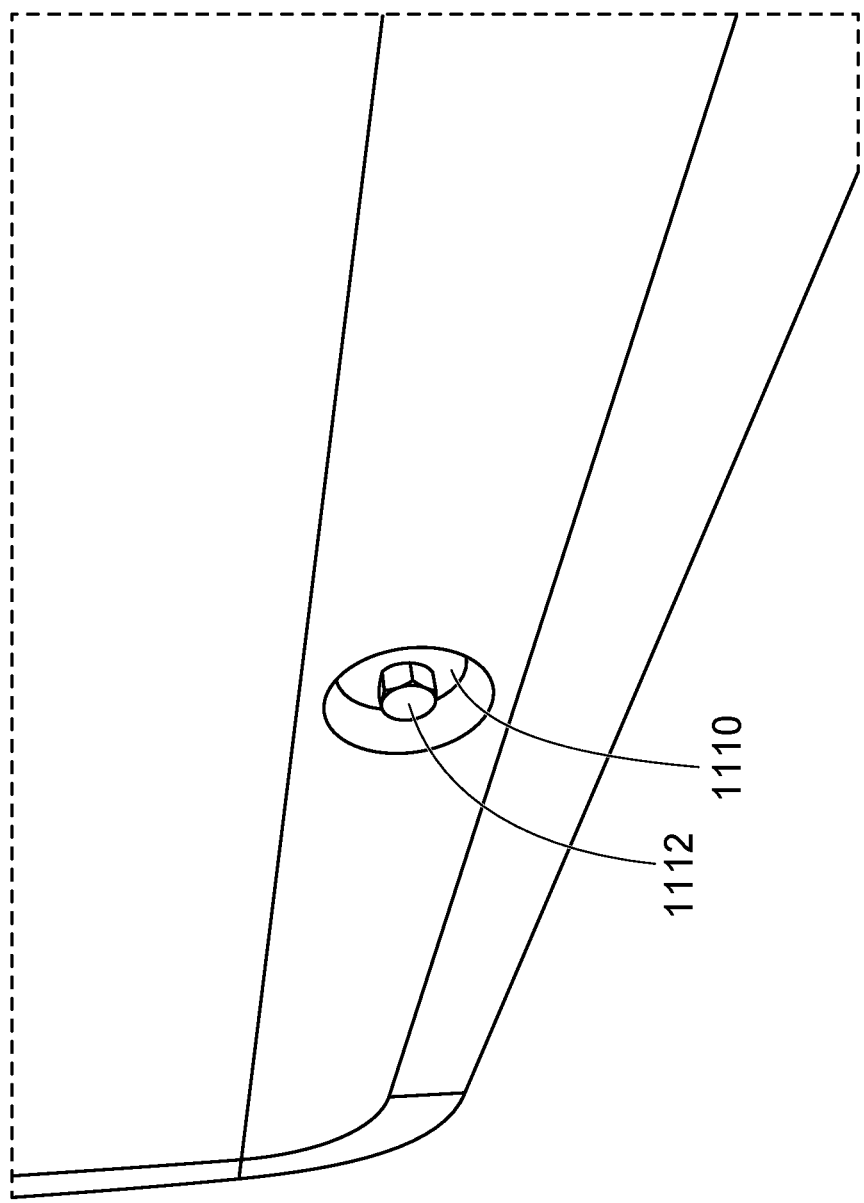

FIG. 60 is a schematic of the gardening system 1100. The gardening system 1100 may be connected to an external water source for filling up the water reservoirs 212, such that the water reservoirs 212 do not have to be removed from the gardening system 1100 each time they are to be refilled. The gardening system 1100 may comprise a water connection 1110, as depicted in FIG. 60. Using the water connection 1110, the gardening system 1100 may be connected to an external water source. The water subsystem 210 of the gardening system 1100 may comprise a pump for pumping the water from the external water source to the water reservoirs 212. For example, the gardening system 1100 may be connected to the water supply of a house or apartment using the water connection 1110, and the pump may be controlled by the controller 102 to pump water to the water reservoirs 212 when the controller 102 determines that the water level in the water reservoirs 212 may be low. As depicted in FIG. 60, the water connection 1110 may be closed or sealed using a nut 1112.

Figure 61:
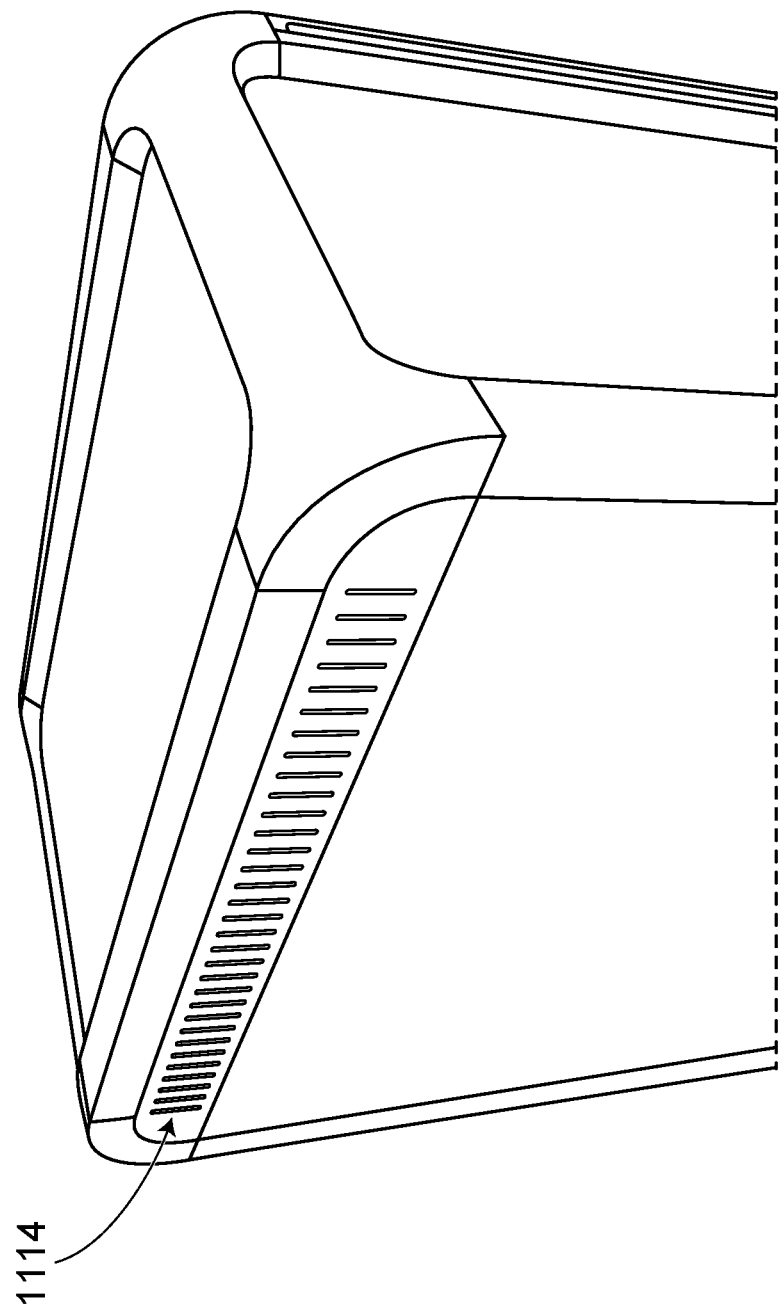

FIG. 61 is a schematic of the gardening system 1100. The gardening system 1100 may comprise a ventilation system 1114 for controlling the conditions of the housing 136 of the gardening system 1100, such as the temperature or humidity of the housing 136. The sensor component 192 of the gardening system 1100 may capture data corresponding to the temperature and humidity of the housing 136. The controller 102 or server 104 may process that data and determine the temperature and humidity of the housing 136. Based on the optimal plant growing thresholds for the plants being grown in the gardening system 1100, the controller 102 or server 104 may send a control command to the ventilation system 1114 to open or close, to circulate external air into the housing 136, or to blow air out of the housing 136 to change the temperature or humidity of the housing 136.

In some embodiments, the sensor component 192 and imaging component 190 may capture data corresponding to the atmosphere conditions in the housing 136 of the gardening system 1100. The controller 102 or server 104 may process the captured data and determine that one or more impurities are in the atmosphere (e.g. pathogen, debris, unexpected gases, etc.). The controller 102 or server 104 may send a control command to the ventilation system 1114 to open or close, to circulate external air into the housing 136, or to blow air out of the housing 136 to reduce the amount of pathogens in the housing 136 or remove the pathogens from the housing 136. In some embodiments, the gardening system 1100 may have a hydrogen peroxide emitter, and if the controller 102 or server 104 determines that there is a pathogen in the housing 136, the controller 102 or server 104 may send a control command to the hydrogen peroxide emitter to emit hydrogen peroxide to remove the pathogen.

FIG. 62 is a schematic of the gardening system 1100. FIG. 62 depicts the lighting subsystem 154 as described herein. The lighting subsystem 154 may comprise light sources 158, which may be LED lights. As depicted in FIG. 62, the lighting subsystem 154 may be recessed in the gardening system 100.

In some embodiments, the gardening system 1100 may be used to grow marijuana and monitor the growth of the marijuana.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The system 10 described herein may grow plants and monitor the growth of plants to increase the nutritional value of the plants and the bioavailability of those nutrients for absorption into the human body. Based on captured data corresponding to the conditions of the gardening system 100, the system 10 may determine the optimal plant growing thresholds and may send alerts to a user device to prompt a change in the conditions of the gardening system 100, or may automatically or dynamically change the conditions of the gardening system 100.

Various example embodiments are described herein. Although each embodiment represents a single combination of inventive elements, all suitable combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The examples described above and illustrated are intended to be examples only.

What is claimed is:

1. A gardening system for growing plants and monitoring growth of the plants, comprising:
    a frame defining a housing for receiving a tray of plants;
    a lighting subsystem mounted to the frame for illuminating the housing;
    a water subsystem, comprising:
        a first water reservoir and a second water reservoir mounted to the frame;
    a water distribution tray fluidly communicable with the first water reservoir and the second water reservoir, the water distribution tray defining one or more channels for receiving water from the water reservoir, said one or more channels including a first channel for receiving water from the first water reservoir and a second channel for receiving water from the second reservoir;
    one or more sensors for capturing data corresponding to conditions of the housing; and
    a controller for selectively activating the lighting subsystem based on sensed lighting conditions of the housing.

2. The gardening system of claim 1, wherein the controller is configured to, based on the sensor data, generate a control command and transmit the control command to a user device.

3. The gardening system of claim 1, wherein one or more wicking coils is received in the one or more channels for fluidly communicating the one or more channels with the housing.

4. The gardening system of claim 1, wherein the first water reservoir and the second fluid reservoir are mounted on opposing sides of the frame.

5. The gardening system of claim 1, wherein the lighting subsystem is configured to emit light ranging from ultraviolet light to infrared light.

6. The gardening system of claim 1, wherein the controller is configured to, based on the sensor data, generate a control command corresponding to a spectrum of light and transmitting the control command to the lighting subsystem to change the light emitted by the lighting subsystem.

7. The gardening system of claim 1, wherein the frame is modular.

8. The gardening system of claim 1, wherein the one or more sensors comprise oxygen sensors and carbon dioxide sensors, the gardening system comprising an oxygen and carbon dioxide emitter that is selectively activated by a control command transmitted from the controller to the oxygen and carbon dioxide emitter based on data captured by the oxygen sensors and carbon dioxide sensors.

9. The gardening system of claim 1, comprising:
    an imaging component mounted to the frame and configured to capture image data corresponding to plants in the housing; and
    at least one network interface configured to transmit the captured image data.

10. The gardening system of claim 9, wherein the imaging component comprises an infrared radiation sensitive camera.

11. The gardening system of claim 9, wherein the imaging component comprises a visible light sensitive camera.

12. The gardening system of claim 9, comprising:
    a server;
    the at least one network interface;
    wherein the server comprises at least one processor and at least one memory storing instructions which when executed by the at least one processor configure the at least one processor to:
        receive sensor data from a vertical gardening system;
        based on the sensor data, determine optimal plant growing thresholds;
        receive additional data from the vertical gardening system;
        compare the additional data with the optimal plant growing thresholds; and
        based on the comparing, generate a control command corresponding to an optimization recommendation and transmitting the control command to a user device.

13. The gardening system of claim 1, comprising:
    a soil unit positioned in the housing to:
        receive water from the water distribution tray; and
        receive light from the lighting subsystem.

14. The gardening system of claim 13, comprising:
    at least one tray placed in the housing, each of the at least one tray comprising one or more guiding ridges or rails along an inner service of the respective tray for receiving the at least one soil unit into the respective tray.

15. The gardening system of claim 13, wherein the one or more sensors comprise soil saturation sensors to determine the saturation of soil in the soil unit.

16. The gardening system of claim 15, wherein the controller is configured to, based on the saturation of the soil, generate a moisture control command corresponding to a desired saturation and transmit the moisture control command to the water subsystem to cause the water distribution tray to dispense water to the soil unit.

17. The gardening system of claim 13, wherein the soil units comprise microbial-rich soil.

18. A method of growing plants and monitoring growth of the plants, the method comprising
    providing a frame defining a housing for receiving a tray of plants;
    mounting a lighting subsystem to the frame for illuminating the housing;
    mounting a first water reservoir and a second water reservoir to the frame;
    providing a water distribution tray fluidly communicable with the first water reservoir and the second water reservoir, the water distribution tray defining one or more channels for receiving water from the water reservoir, said one or more channels including a first channel for receiving water from the first water reservoir and a second channel for receiving water from the second water reservoir;

capturing, by one or more sensors, data corresponding to conditions of the housing; and selectively activating, by a controller, the lighting subsystem based on sensed lighting conditions of the housing.

19. The method of claim 18, further comprising:

mounting an imaging component to the frame;

capturing image data corresponding to plants in the housing; and transmitting, by at least one network interface, the captured image data.

20. The method of claim 19, further comprising:

receiving, by at least one processor, sensor data from a vertical gardening system comprising said housing;

determining, based the at least one processor, optimal plant growing thresholds based on the sensor data;

receiving, by the at least one processor, additional data from the vertical gardening system;

comparing, by the at least one processor, the additional data with the optimal plant growing thresholds;

generating, by the at least one processor, a control command corresponding to an optimization recommendation based on the comparing; and transmitting the control command to a user device.

\* \* \* \* \*